(12) United States Patent
Yamada

(10) Patent No.: US 9,188,432 B2
(45) Date of Patent: Nov. 17, 2015

(54) PROFILE MEASURING APPARATUS, STRUCTURE MANUFACTURING SYSTEM, METHOD FOR MEASURING PROFILE, METHOD FOR MANUFACTURING STRUCTURE, AND NON-TRANSITORY COMPUTER READABLE MEDIUM

(71) Applicant: NIKON CORPORATION, Chiyoda-ku, Tokyo (JP)

(72) Inventor: Tomoaki Yamada, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 416 days.

(21) Appl. No.: 13/665,021

(22) Filed: Oct. 31, 2012

(65) Prior Publication Data
US 2013/0107032 A1   May 2, 2013

(30) Foreign Application Priority Data
Nov. 1, 2011   (JP) .................................. 2011-240470

(51) Int. Cl.
| | |
|---|---|
| G01B 11/24 | (2006.01) |
| H04N 7/18 | (2006.01) |
| G01B 11/25 | (2006.01) |
| G01B 21/04 | (2006.01) |
| B25J 11/00 | (2006.01) |

(52) U.S. Cl.
CPC .................. *G01B 11/25* (2013.01); *B25J 11/00* (2013.01); *G01B 21/045* (2013.01)

(58) Field of Classification Search
USPC ............. 356/601–626; 702/94; 382/276, 154; 348/86
See application file for complete search history.

(56) References Cited

U.S. PATENT DOCUMENTS

| | | | | |
|---|---|---|---|---|
| 4,993,835 A | * | 2/1991 | Inoue et al. ................... | 356/607 |
| 5,506,683 A | * | 4/1996 | Yang et al. .................... | 356/606 |
| 5,509,090 A | * | 4/1996 | Maruyama et al. ........... | 382/276 |
| 6,909,779 B1 | | 6/2005 | Rauba | |
| 8,514,389 B2 | * | 8/2013 | Aoki .......................... | 356/237.2 |
| 2003/0067613 A1 | | 4/2003 | Ishikawa et al. | |
| 2007/0146682 A1 | * | 6/2007 | Tachino et al. .............. | 356/4.01 |

(Continued)

FOREIGN PATENT DOCUMENTS

| | | |
|---|---|---|
| JP | 3819275 | 6/2006 |
| JP | 2008-111821 A | 5/2008 |

OTHER PUBLICATIONS

International Search Report from European Patent Office in International Application No. PCT/JP2012/078558, mailed Feb. 2, 2013.

(Continued)

*Primary Examiner* — Sang Nguyen
(74) *Attorney, Agent, or Firm* — Finnegan, Henderson, Farabow, Garrett & Dunner LLP

(57) ABSTRACT

A profile measuring apparatus includes: a light source device from which a projection light is irradiated, the projection light having a light amount changing with lapse of time in a first period and a predetermined spatial distribution; an imaging element; a second period setting section which sets a second period including at least a part of the first period; and a profile information obtaining section which obtains an information of the profile of the object based on an image data taken by the imaging element in the second period. The second period setting section sets the second period based on a light amount of a light which comes into the imaging element at the time of an imaging performed before one imaging performed in the second period; and a light amount change pattern of the projection light changing with lapse of time in the first period.

28 Claims, 30 Drawing Sheets

(56) References Cited

U.S. PATENT DOCUMENTS

| | | | |
|---|---|---|---|
| 2008/0094643 A1 | 4/2008 | Nishio et al. | |
| 2008/0144000 A1* | 6/2008 | Thun et al. | 356/5.05 |
| 2009/0022367 A1 | 1/2009 | Sasaki | |
| 2010/0149550 A1 | 6/2010 | Diefenbacher et al. | |
| 2011/0270562 A1* | 11/2011 | Ito et al. | 702/94 |
| 2012/0050716 A1* | 3/2012 | Murakami et al. | 356/4.01 |

OTHER PUBLICATIONS

Written Opinion of the International Search Authority related to International Application No. PCT/JP2012/078558, mailed Feb. 15, 2013, for Nikon Corporation.

Notice of Reasons for Rejection dated Apr. 28, 2015 in corresponding Japanese Patent Application No. 2014-538079.

* cited by examiner

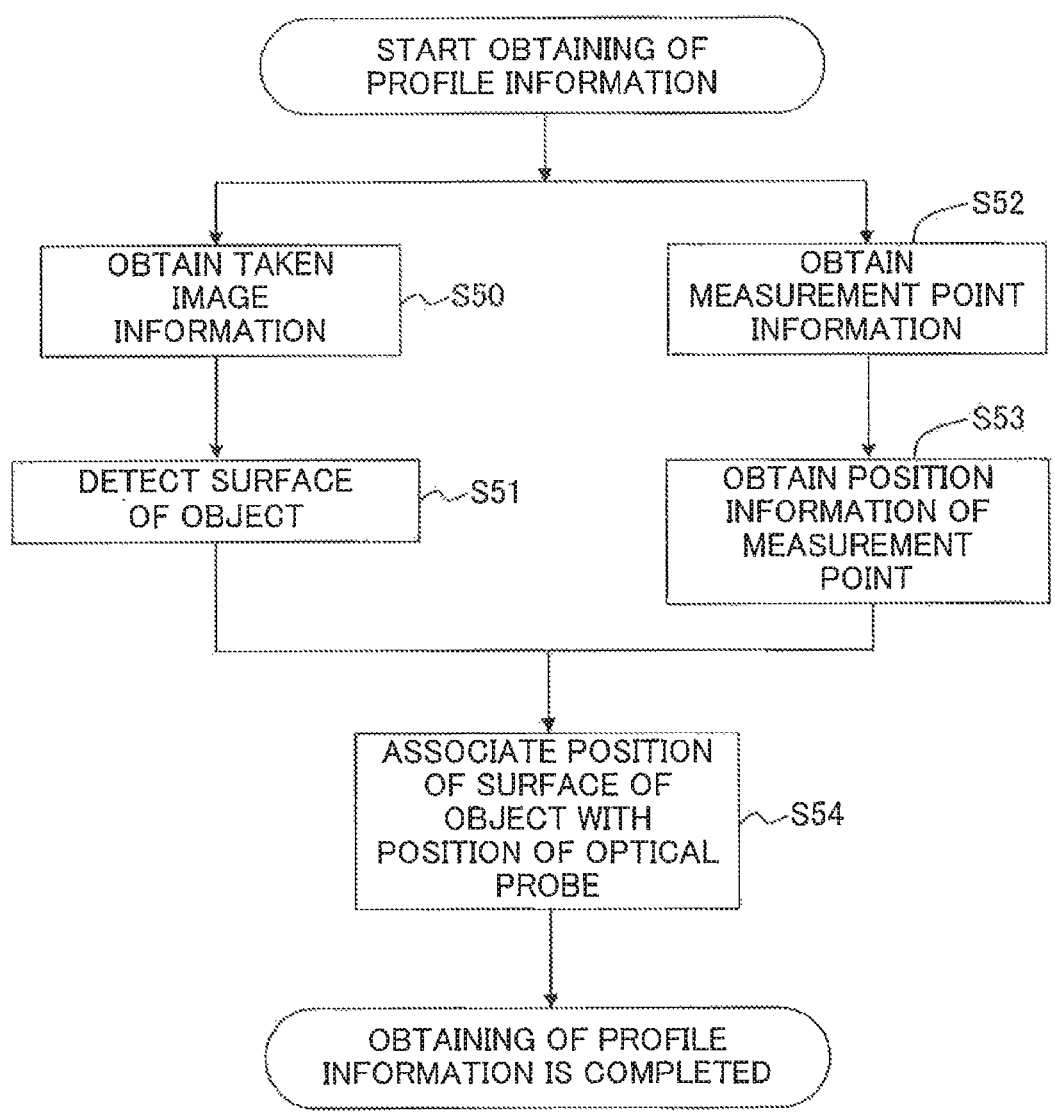

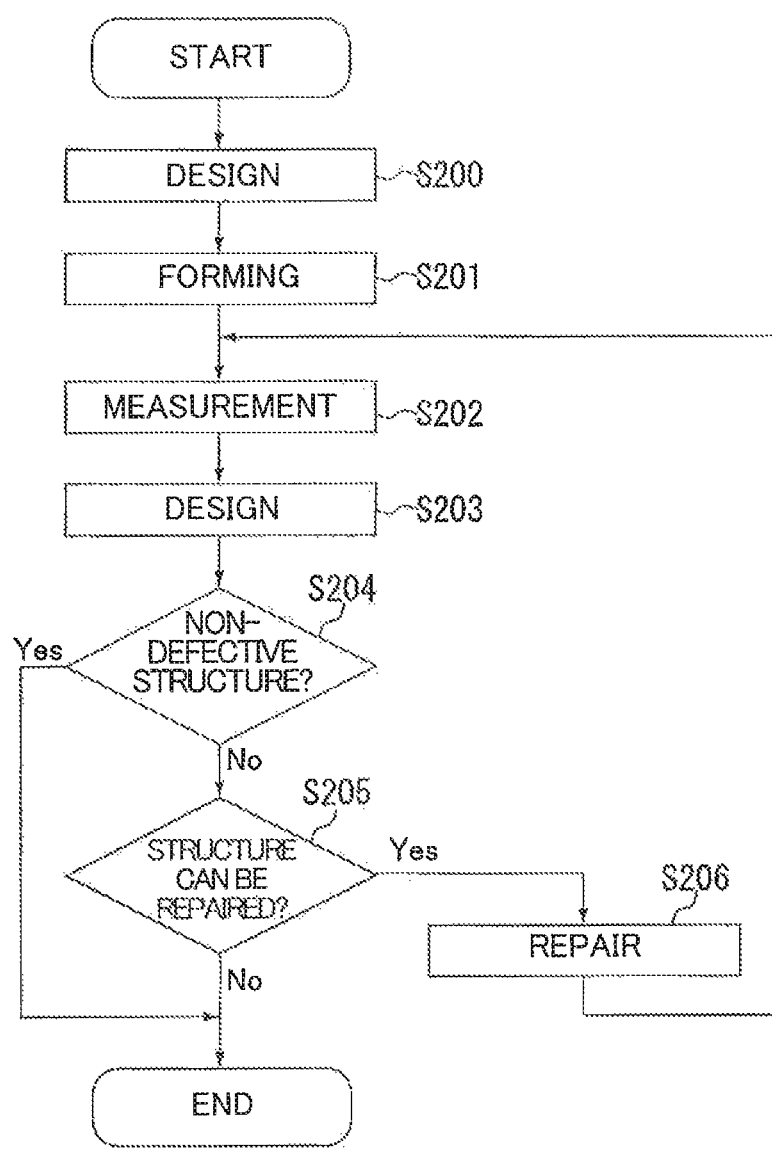

PROFILE MEASURING APPARATUS, STRUCTURE MANUFACTURING SYSTEM, METHOD FOR MEASURING PROFILE, METHOD FOR MANUFACTURING STRUCTURE, AND NON-TRANSITORY COMPUTER READABLE MEDIUM

CROSS-REFERENCE TO RELATED APPLICATIONS

The present application claims priority from Japanese Patent Application No. 2011-240470, filed on Nov. 1, 2011, the disclosure of which is incorporated herein by reference in its entirety.

BACKGROUND

1. Field of the Invention

The present invention relates to a profile measuring apparatus, a structure manufacturing system, a method for measuring a profile, a method for manufacturing a structure, and a non-transitory computer readable medium.

2. Description of the Related Art

A profile measuring technique using an optical cutting method etc. is used, for example, for measuring a profile of an object such as an industrial product. The profile measuring technique relates, for example, to a technique in which an image of a surface of the object to which light is irradiated is taken by an imaging element and the profile of the object is measured based on the result (see, for example, Japanese Patent No. 3,819,275).

In the profile measuring technique, in a case that brightness of the image taken by the imaging element is insufficient or excessive, measurement accuracy is more likely to be decreased. In view of this, in Patent Literature 1, an exposure time with respect to the imaging element is adjusted depending on change of the object to adjust a light amount of the light which comes into the imaging element during an exposure period. Accordingly, the brightness of the image taken by the imaging element is adjusted.

The exposure time of the imaging element is adjustable, for example, by controlling an electronic shutter. As an example, the exposure time of the imaging element is adjustable within a range of about 10 microseconds to about 50 milliseconds. In this case, when it is assumed that the brightness of the image which is set to be the darkest is 1, the brightness of the image taken by the imaging element is adjustable in an adjustable range (dynamic range) of about 1 to 5000.

SUMMARY

According to an aspect or the present teaching, there is provided a profile measuring apparatus which measures a profile of an object, including:

a light source device configured to irradiate a projection light to the object, the projection light having a light amount changing with lapse of time in a first period and having a predetermined spatial distribution;

an imaging element configured to take an image of the object to which the projection light is irradiated;

a second period setting section configured to set a second period including at least a part of the first period; and a profile information obtaining section configured to obtain an information with respect to the profile of the object based on an image data taken by the imaging element, in the second period;

wherein the second period setting section is configured to set the second period based on a light amount of a light which comes into the imaging element at the time of an imaging performed before the imaging performed in the second period, and based on a light amount change pattern of the projection light changing with lapse of time in the first period.

BRIEF DESCRIPTION OF THE DRAWINGS

FIG. 15 is a flowchart showing a method for obtaining profile information according to the first embodiment.

FIG. 31 is a flowchart showing a method for manufacturing a structure according to this embodiment.

DESCRIPTION OF THE EMBODIMENTS

First Embodiment

Figure 1:
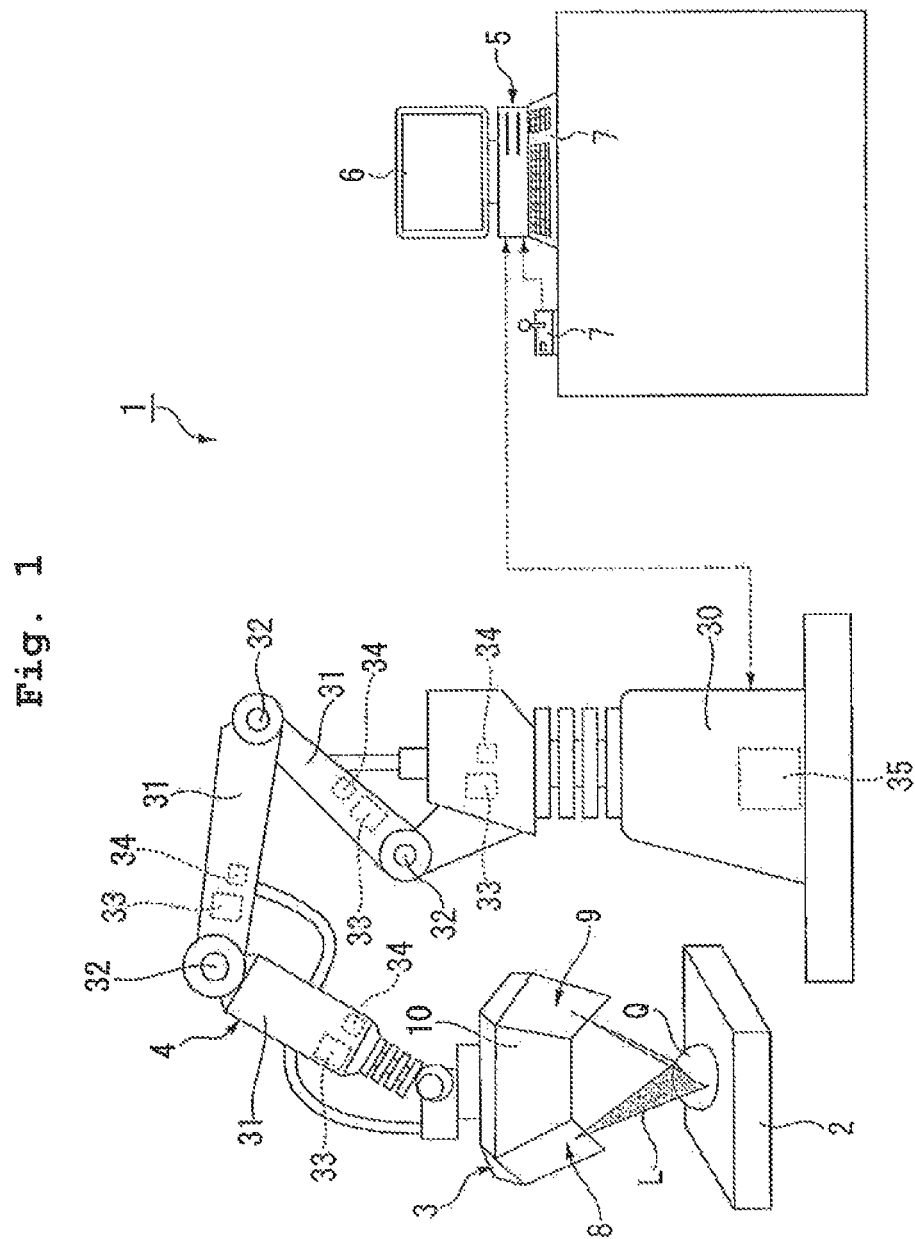
FIG. 1 schematically shows a profile measuring apparatus of the first embodiment.
Figure 2:
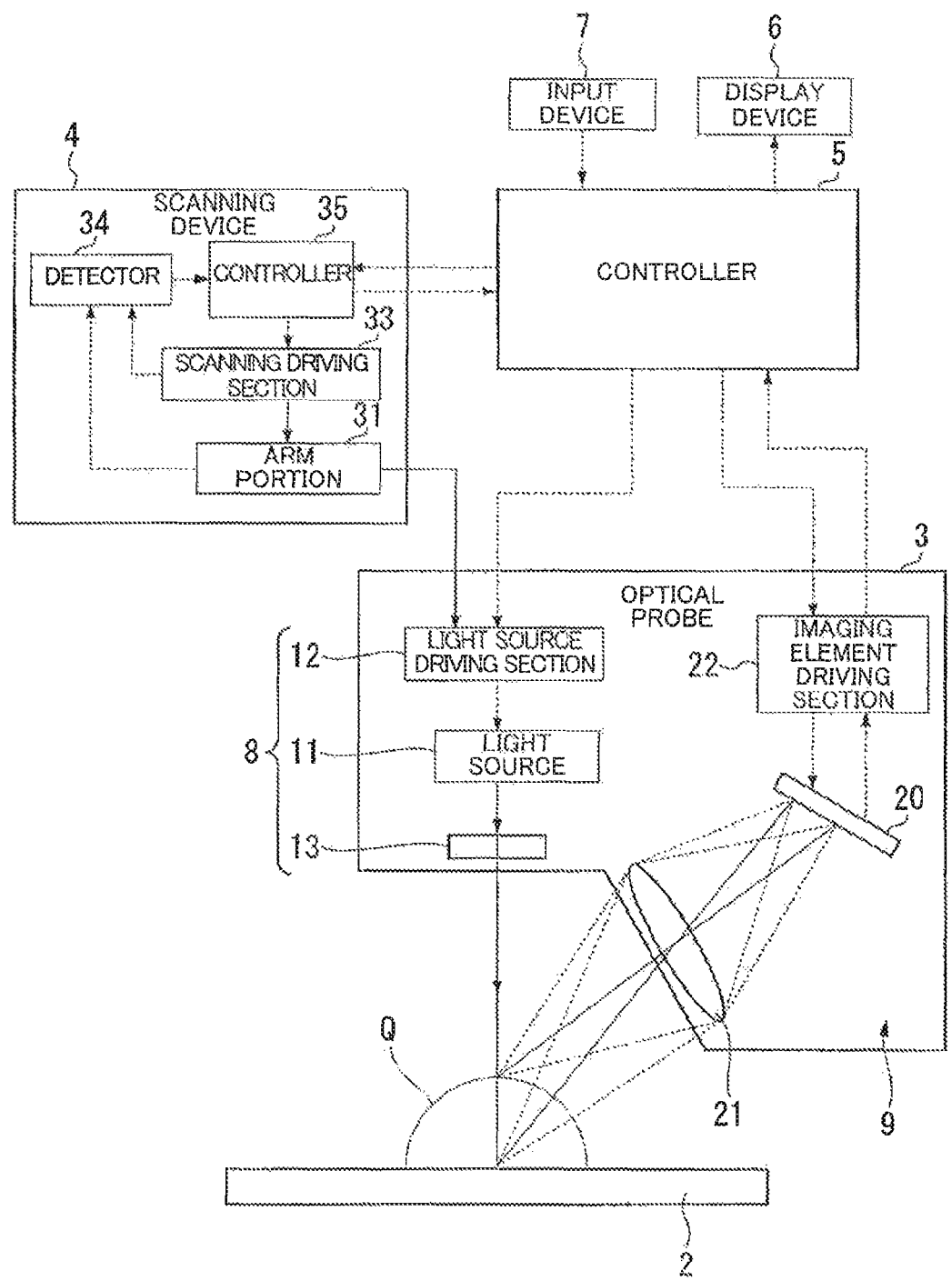
FIG. 2 shows a construction of the profile measuring apparatus of the first embodiment.

An explanation will be made about a schematic construction of a profile measuring apparatus according to the first embodiment. FIG. 1 schematically shows the profile measuring apparatus of the first embodiment. FIG. 2 shows a construction of the profile measuring apparatus of the first embodiment.

A profile measuring apparatus (profile measuring system) 1 as shown in FIG. 1 is provided with a stage device 2, an optical probe 3, a scanning device 4, a controller 5, a display device 6, and an input device 7. The profile measuring apparatus 1 of this embodiment is capable of measuring a profile of an object Q, like a Coordinate Measuring Machine (CMM), an image measurement microscope, etc. The profile measuring apparatus 1 of this embodiment is capable of measuring a three-dimensional profile of the object Q arranged on the stage device 2 by an optical cutting method. The profile measuring apparatus 1 of this embodiment repeatedly performs unit measurements, in which a part of the surface of the object Q is subjected to the measurement, while moving an area to be subjected to the measurement. The profile measuring apparatus 1 is capable of obtaining a measurement result of an area, which is larger than each area measured in each unit measurement, by combining results of the unit measurements performed a plurality of times while the area to be subjected to the measurement is moved.

The stage device 2 retains the object Q so that the object Q does not move with respect to the stage device 2. The stage device 2 of this embodiment is fixed to a setting area of the profile measuring apparatus 1. The stage device 2 can be movable with respect to the optical probe 3 while retaining the object Q. The stage device 2 can be an external device of the profile measuring apparatus 1. For example, the profile measuring apparatus 1 can perform the measurement with respect to the object Q transported on a manufacturing line of a manufacturing system of the object Q (structure). Further, the profile measuring apparatus 1 can perform the measurement with respect to the object Q placed, for example, on the ground and a desk. In this case, the stage device 2 can be omitted.

The optical probe 3 includes a light source device 8 and an imaging device 9. The light source device 8 is controlled by the controller 5 to emit the light to illuminate a part of the surface of the object Q disposed on the stage device 2. The imaging device 9 is controlled by the controller 5 to carry out an imaging process in which an linage of the surface of the object Q illuminated with the light is taken. The imaging device 9 carries out at least one imaging process in one unit measurement. In this embodiment, a support 10 supports both of the light source device 8 and the imaging device 9. Each of the light source device 8 and the imaging device 9 is exchangeably attached to the support 10.

As shown in FIG. 2, the light source device 8 of this embodiment includes a light source 11, a light source driving section 12, and an illumination optical system 13. The light source device 8 irradiates the light, which is emitted from the light source 11 by driving the light source 11 by the light source driving section 12, to illuminate the object Q via the illumination optical system 13.

The light source 11 of this embodiment includes a laser diode. The light source 11 can include a solid light source, such as a light-emitting diode (LED), other than the laser diode. The light source 11 can include other type of light source such as a gas light source, as appropriate. The light source driving section 12 is controlled by the controller 5 to supply electronic power, which is required for emitting the light by the light source 11 to the light source 11. By doing so, the controller 5 is capable of controlling: timing of light emission from the light source 11; and a light amount or light intensity (hereinafter "light amount"), of the light emitted from the light source 11 (hereinafter referred to as "illumination light"), per unit time so that the light amount is temporally changed.

The illumination optical system 13 adjusts a spatial light-intensity distribution of the light emitted from the light source 11. The illumination optical system 13 of this embodiment includes a cylindrical lens. The illumination optical system 13 can be formed of one optical element or can include a plurality of optical elements. The light emitted from the light source 11 is outputted from the light source device 8 in a state that the spot is broadened in a direction in which the cylindrical lens has a positive power. As shown in FIG. 1, projection light (hereinbelow referred to as line light L), which is outputted from the light source device 8 to be projected to the object Q, becomes a projection pattern in which a profile of the spot in a plane perpendicular to the output direction of the light from the light source device 8 is elongated in one direction. In the following description, this one direction is referred to as a longitudinal direction of the line light L.

The illumination optical system 13 can include a diffraction optical element such as a Computer Generated Hologram (a Computed Graphic Hologram). In this case, it is possible to adjust the spatial light-intensity distribution of the light emitted from the light source 11 by the diffraction optical element. Further, in this embodiment, the projection light in which the spatial light-intensity distribution is adjusted is sometimes referred to as pattern light. The line light L is an example of the pattern light.

The imaging device 9 of this embodiment is provided with an imaging element 20, an imaging optical system 21, and an imaging element driving section 22. The light, which is radiated to the object Q from the light source device 8, is reflected and scattered on the surface of the object Q; and at least a part of the light comes into the imaging optical system 21. In the imaging device 9, the imaging element 20, which is driven by the imaging element driving section 22, detects the light which is allowed to come into the imaging optical system 21 from the light source device 8 via the surface of the object Q.

The imaging optical system 21 forms, on the light-receiving surface of the imaging element 20, a plane which is conjugate with an object plane on a plane which includes an output direction of the light from the light source device 8 and the longitudinal direction of the profile of the light spot. The plane which includes the output direction of the light from the light source device 8 and the longitudinal direction of the profile of the light spot is substantially parallel to a propagation direction of the line light L. As described above, the imaging optical system 21 forms, on the light-receiving surface of the imaging element 20, a pattern image which is drawn on the object Q by the light irradiated from the light source device 8 to the object Q.

The light, which is radiated from the light source device 8 to be reflected and scattered at one point on the object Q, passes through the imaging optical system 21 to be collected at substantially one point on the light-receiving surface of the imaging element 20. That is, each oil the points of the image formed on the imaging element 20 corresponds to one of the points on lines on which the object plane of the imaging optical system 21 intersects with the object Q. Accordingly, information indicating an imaging result of the imaging device 9 includes information indicating the position of each of the points on the surface of the object Q.

The scanning device (scanning section) 4 shown in FIG. 1 is capable of changing a relative position of the stage device 2 to the optical probe 3. In other words, the scanning device 4 is capable of changing a relative position of the object Q on the stage device 2 to the optical probe 3. The scanning device 4 of this embodiment exchangeably retains the optical probe 3 and is capable of moving the optical probe 3 with respect to the stage device 2 fixed to the setting area of the profile measuring apparatus 1. In a case that the scanning device 4 moves the optical probe 3, the light radiated from the light source device 8 of the optical probe 3 scans the surface of the object Q.

The scanning device 4 of this embodiment includes a base 30, a plurality of arm portions 31, a plurality of joint portions (connecting portions) 32, a plurality of scanning driving sections 33, a plurality of detectors 34, and a controller 35.

The base 30 of this embodiment is fixed to the setting area of the profile measuring apparatus 1; and a relative position of the base 30 to the stage device 2 is fixed. The plurality of arm portions 31 are connected to each other via the joint portions 32. The arm portions 31 connected to each other are connected to the base 30 on a side of one end (proximal end portion); and are connected to the optical probe 3 on a side of the other end (front-end portion).

The scanning driving sections 33 are attached, for example, inside or outside the arm portions 31. Each of the scanning driving sections 33 includes an actuator such as an electric motor. Each of the scanning driving sections 33 is capable of changing a relative position of a pair of arm portions 31 connected to each other by one of the joint portions 32. Each of the detectors 34 is, for example, an encoder; and detects a shift amount of each of the arm portions 31 by each of the scanning driving sections 33.

The controller 35 of the scanning device 4 is accommodated, for example, in the base 30. As shown in FIG. 2, the controller 35 controls at least one of the position and the posture of the optical probe 3 by controlling the scanning driving section 33. The controller 35 of this embodiment controls a driving amount of the scanning driving section 33, and thereby controlling the shift amount of the arm portion 31 by the scanning driving section 33. The shift amount of the arm portion 31 indicates, for example, at least one of a changing amount of the position of the arm portion 31 and a changing amount of the posture of the arm portion 31. The controller 35 obtains, from the detectors 34, driving information indicating the driving amount of the scanning driving section 33, moving information indicating the shift amount of the arm portion 31 by the scanning driving section 33, and the like. The controller 35 controls the scanning driving section 33 based on the information obtained from the detectors 34.

The scanning device 4 of this embodiment is controlled by the controller 5. The controller 5 controls at least one of the position and the posture of the optical probe 3 by controlling the controller 35 of the scanning device 4. Further, the controller 5 obtains position information of the optical probe 3 from the controller 35 of the scanning device 4. The position information of the optical probe 3 includes at least one of information indicating the position of the optical probe 3 and information indicating the posture of the optical probe 3. The profile measuring apparatus 1 can include a measuring unit (for example, laser interferometer) to measure at least one of the position and the posture of the optical probe 3. The controller 5 can obtain the position information of the optical probe 3 from the measuring unit.

The input device 7 is constructed of various input devices including, for example, a keyboard, a mouse, a joystick, a trackball, and a touchpad. The input device 7 receives input of variety kinds of information to the controller 5. The variety kinds of information includes, for example, command information indicating a command to start the measurement by the profile measuring apparatus 1, setting information with respect to the measurement by the profile measuring apparatus 1, and operation information to operate at least a part of the profile measuring apparatus 1 on manual.

The display device 6 includes, for example, a liquid crystal display device and an organic electroluminescence display device. The display device 6 displays measurement information with respect to the measurement of the profile measuring apparatus 1. The measurement information includes, for example, setting information indicating the setting with respect to the measurement, process information indicating the process of the measurement, and profile information indicating the result of the measurement. In the display device 6 of this embodiment, image data indicating the measurement information is supplied from the controller 5, and the image indicating the measurement information is displayed in accordance with the image data.

An explanation will be schematically made about control for each of the sections of the profile measuring device 1 by the controller 5 of this embodiment. The controller 5 controls the timing at which the light is emitted from the light source 11 of the light source device 8; and controls the light source device 8 so that a light amount of the illumination light per unit, time is temporally changed. The controller 5 controls the light source device 8 so that the temporal change of the light amount is performed repeatedly for each frame which is taken by the imaging element 20. The controller 5 controls the scanning device 4 so that the light emitted from the light source device 8 scans the surface of the object Q. The controller 5 controls the imaging device 9 to take images of a plurality of frames during a period of time in which a portion, of the surface of the object Q, to which the light is emitted from the light source device 8, is temporally changed due to the scanning. The controller 5 controls timings to start and complete the exposure with respect to the imaging element 20 at the time of imaging of each of the frames. The controller 5 obtains the imaging result (image data) by the imaging device 9 and then obtains information with respect to the profile of the object Q based on the imaging result. The controller 5 of this embodiment supplies the image data indicating the measurement information of the profile measuring apparatus 1 to the display device 6 and controls the display device 6 to display the image indicating the measurement information. For example, the controller 5 visualizes the measurement result (profile information) with respect to the profile of the object Q and controls the display device 6 to display the image indicating the measurement result.

In a general profile measuring apparatus, the light amount of the light (hereinafter referred to as measuring light), which comes into the imaging element from the object, changes in some cases depending on material and/or profile of the portion of the object to which the illumination light is radiated. For example, in a case that the material of the object varies depending on each portion of the object, the reflectance with respect to the illumination light changes according to each portion of the object. Therefore, the light amount of the measuring light, which is reflected at a portion of the object having relatively high reflectance to come into the imaging element, is relatively increased as compared with the light amount of the measuring light which is reflected at a portion, other than the portion of the object having the relatively high reflectance, to come into the imaging element. Further, for example, in a case that the profile of the object varies depending on each portion of the object, an incidence angle of the illumination light with respect to each portion of the object changes. Thus, the light amount of the measuring light, of the light reflected by the object, which is directed toward the imaging element, changes.

As described above, in a case that the light amount of the measuring light changes according to difference in each portion of the object, signal intensity of the image of the measuring light when the measuring light is projected on the object (hereinafter referred to as imaging intensity) outputted from the imaging element changes depending on the light amount of the measuring light. In the general profile measuring apparatus, the following problem can be considered. In a case that the exposure amount is set at a level in which the imaging intensity having a condition that the light amount of the measuring light is relatively low is capable of detecting the signal, there is a possibility that the imaging intensity is saturated under the condition that the light amount of the measuring light is relatively high. On the other hand, in a case that the exposure amount is set so that the imaging intensity having a condition that the light amount of the measuring light is relatively high is not saturated, there is a possibility that the imaging intensity is insufficient relative to a detectable level under the condition that the light amount of the measuring light is relatively low.

The profile measuring apparatus 1 of this embodiment is capable of suppressing occurrence of saturation or insufficiency of the imaging intensity by adjusting the exposure amount with respect to the imaging element 20 depending on each portion of the object Q. Further, in the profile measuring apparatus 1 of this embodiment, it is possible to expand an adjustable range of the exposure amount by temporally changing the light amount of the illumination light, which is radiated to the object Q from the light source device 8 per unit time, and by adjusting the exposure period with respect to the imaging element 20.

Figure 3:
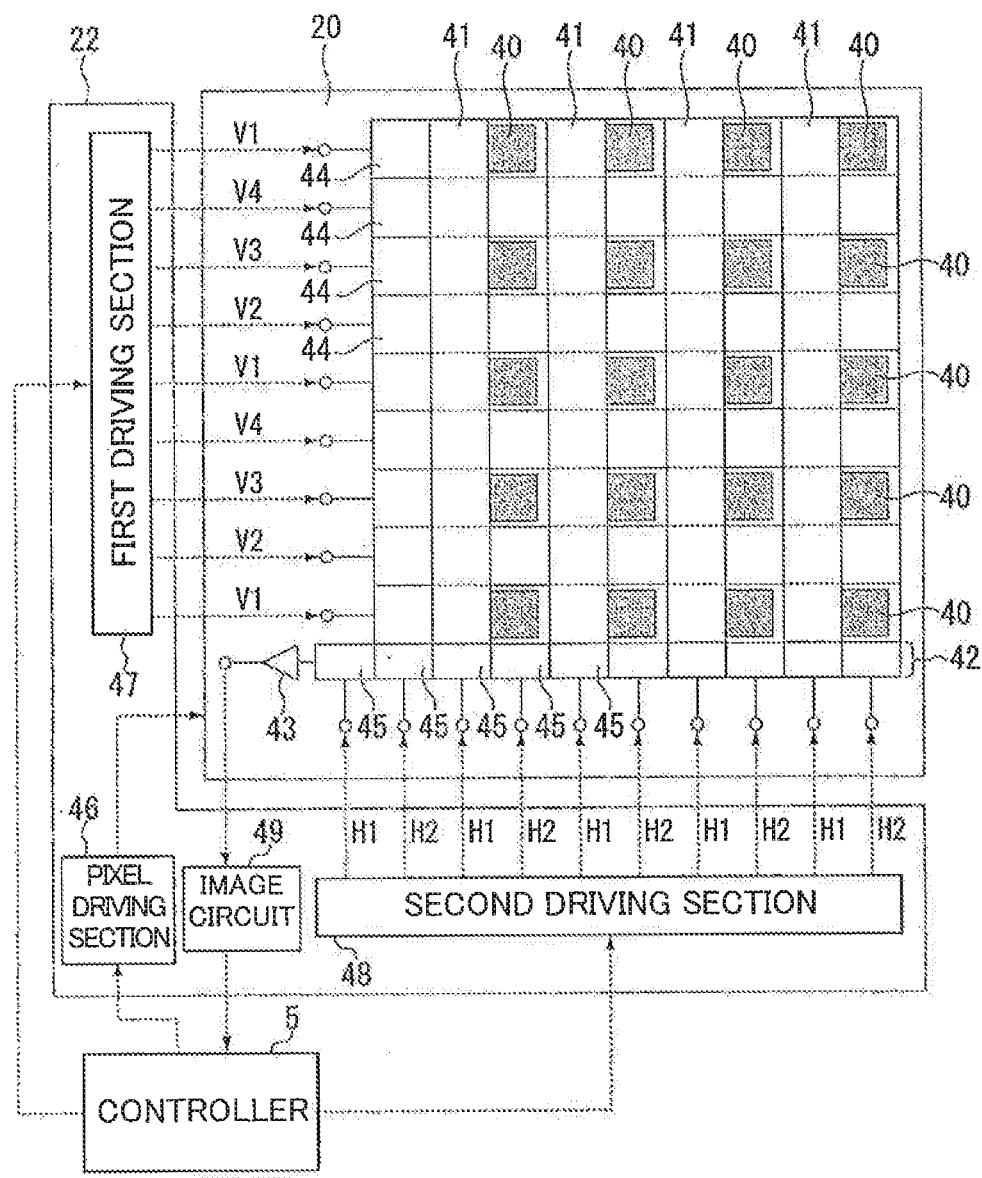
FIG. 3 shows a construction of an imaging device of the first embodiment.
Figure 4:
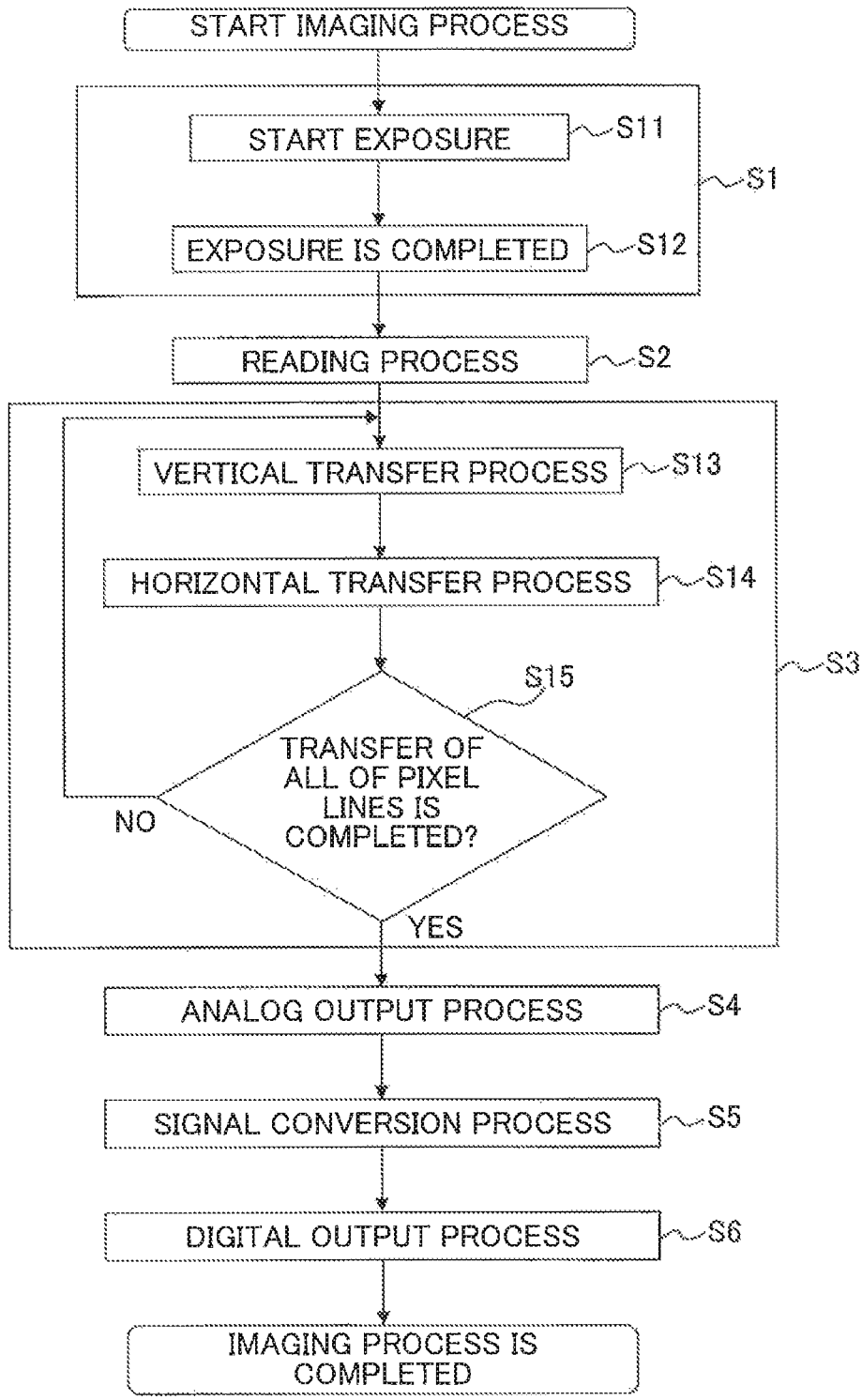
FIG. 4 is a flowchart showing an operation of the imaging device of the first embodiment.
Figure 5:
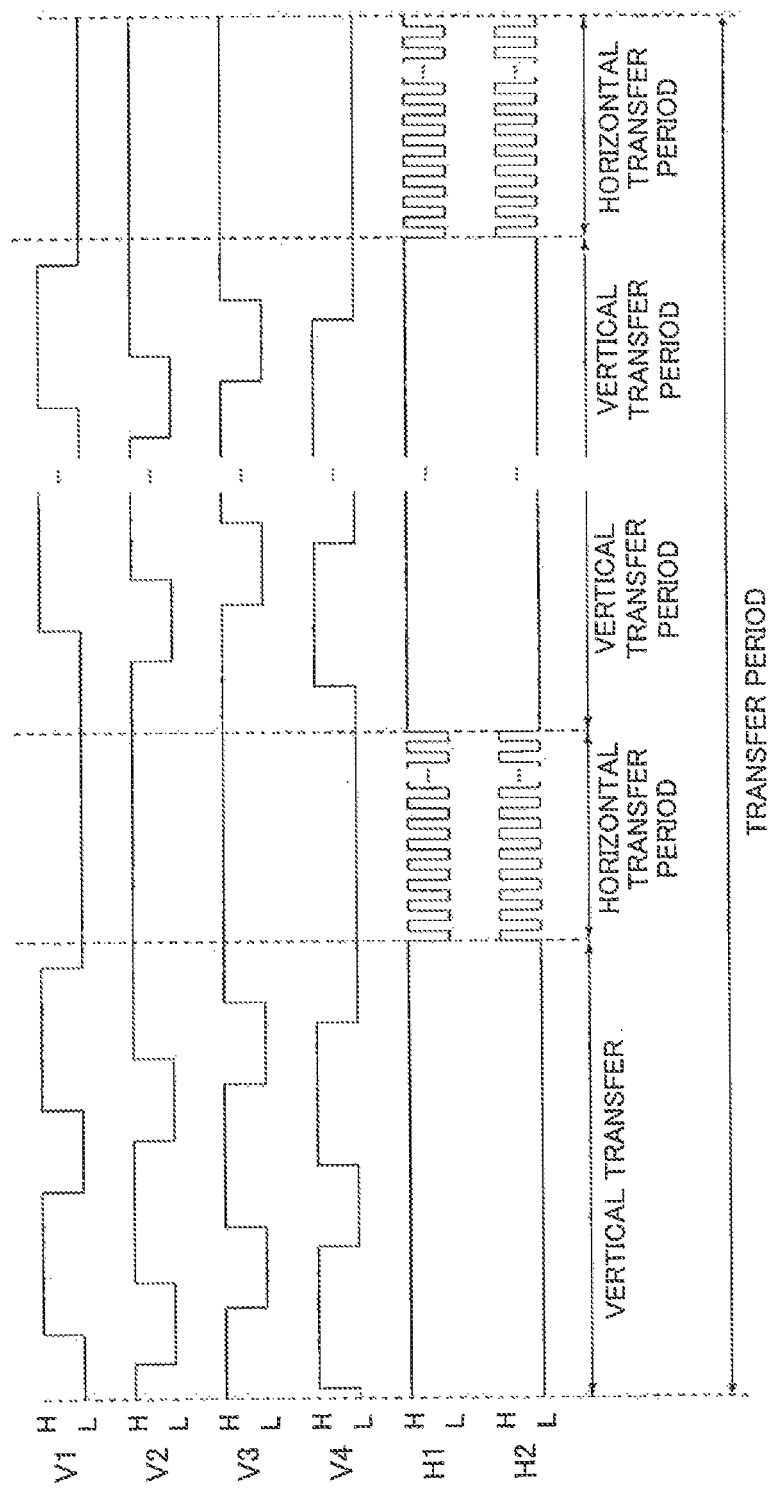
FIG. 5 shows an example of a timing chart of transfer pulses in the imaging device of the first embodiment.

Next, an explanation will be made in detail about each of the sections of the profile measuring device 1. FIG. 3 shows a construction of the imaging device of the first embodiment. FIG. 4 is a flowchart showing an operation of the imaging device of the first embodiment. FIG. 5 shows an example of a transfer pulse in the imaging device of the first embodiment.

The imaging element 20 of this embodiment includes a CCD image sensor which transfers an electric charge generated in a photodiode by a CCD. The imaging element 20 of this embodiment includes a plurality of pixels 40, which are aligned in two directions intersecting with each other. In this embodiment, for convenience of explanation, one direction of the alignment directions of the plurality of pixels 40 is referred to as a vertical scanning direction and the other direction is referred to as a horizontal scanning direction. Each of the pixels 40 is provided wish the photodiode (an example of a light-receiving element) and a capacitor connected to the photodiode via the first switching element. The photodiode of each pixel 40 generates the electric charge in an amount depending on the light amount of the light which comes into the photodiode. The capacitor of each pixel 40 accumulates the electric charge generated in the photodiode connected to the capacitor. The first switching element switches on and off states with respect to accumulation in the capacitor.

The imaging element 20 can include a reset circuit which resets or discharges the electric charge accumulated in the capacitor of each pixel 40. In this case, it is possible to define timing, at which the accumulation of the electric charge is started, by the reset circuit. Further, in a case that the imaging element 20 includes the reset circuit, the first switching element as described above can be omitted.

The imaging element 20 of this embodiment includes first transfer resistors 41, the second transfer resistor 42, and an output section 43. The imaging element 20 of this embodiment is capable of reading out the electric charge accumulated in each pixel 40 in an interline transfer system. After the electrical charge accumulated in each pixel 40 is read out to each first transfer resistor 41, the electric charge is transferred to the second transfer resistor 42 by each first transfer resistor 41. Then, the electric charge transferred to the second transfer resistor 42 is transferred to the output section 43 by the second transfer resistor 42, and then is outputted to the imaging element driving section 22 from the output section 43.

The first transfer resistor 41 is, for example, a vertical transfer resistor and includes the CCD. The first transfer resistor 41 is formed along the plurality of pixels 40 aligned in the vertical scanning direction (hereinafter referred to as a pixel array); and is connected to the capacitor of each of the pixels 40 belonging to the pixel array. The first transfer resistor 41 and the pixel array are arranged alternately and repeatedly in the horizontal scanning direction. The first transfer resistor 41 includes a plurality of first transfer electrodes 44 which are periodically aligned in the vertical scanning direction. Each of the first transfer electrodes 44 is formed in an area which is adjacent to each of the pixels 40 in the horizontal scanning direction; and in an area which is positioned between the pixels 40 adjacent to each other in the vertical scanning direction. Each of the pixels 40 includes the second switching element which switches a conducting state and a non-conducting state between each of the first transfer resistors 41 and the capacitor of each pixel 40.

The second transfer resistor 42 is, for example, a horizontal transfer resistor and includes the CCD. The second transfer resistor 42 is connected with a cell, of one of the first transfer resistors 41 aligned in the horizontal scanning direction, which is disposed on an end position in the vertical scanning direction. The second transfer resistor 42 extends in the horizontal scanning direction. The second transfer resistor 42 is provided with a plurality of second transfer electrodes 45 which are periodically aligned in the horizontal scanning direction. Each of the second transfer electrodes 45 is formed in an area which is adjacent to each of the first transfer resistors 41 in the vertical scanning direction; and in an area which is positioned between the first transfer resistors 41 adjacent to each other in the horizontal scanning direction. A cell, of the second transfer resistor 42, which is disposed on an end position in the horizontal scanning direction, is connected to the output section 43.

The imaging element driving section 22 of this embodiment includes a pixel driving section 46, the first driving section 47, the second driving section 48, and an image circuit 49. In the imaging element driving section 22 of this embodiment, the electric charge accumulated in each pixel 40 of the imaging element 20 is read out to each first transfer resistor 41 by the pixel driving section 46, and then the electric charge is transferred to the output section 43 by the first driving section 47 and the second driving section 48. Further, in the imaging element driving section 22, the electric charge, which is outputted from the output section 43 as an image signal in an analog format, is converted into image data in a digital format by the image circuit 49, and then the converted image data is outputted to the controller 5.

In this embodiment, the electric charge, generated in the photodiode of each pixel 40, which is read out from each pixel 40 to each first transfer resistor 41 to be transferred to the output section 43, is sometimes referred to as a signal charge. Further, in this embodiment, the second period, in which the exposure to accumulate, in each pixel 40, the electric charge for generating the signal which forms the image data, used in the profile measurement is performed, is sometimes referred to as the exposure period. The light amount of the light which comes into each pixel during the exposure period is sometimes referred to as the exposure amount.

The image driving section 46 is controlled by the controller 5 to drive the first switching element which switches the conducting state and the non-conducting state between the photodiode and the capacitor in each pixel 40. The controller 5 controls the image driving section 46 to control driving of the first switching element, and thereby controlling the timing at which the conducting state and the non-conducting state between the photodiode and the capacitor are switched. That is, the controller 5 controls timings to start and complete accumulation of the signal charge in the capacitor of each pixel 40. In a case that the exposure to accumulate the signal charge in each pixel 40 is performed, the image driving section 46 resets the electric charge of the capacitor of each pixel 40 as needed. Further, the image driving section 46 drives the second switching element which switches the conducting state and the non-conducting state between the first transfer resistor 41 and the capacitor in each pixel 40. Accordingly, the signal charge accumulated in the capacitor of each pixel 40 is read out to the first transfer resistor 41. In a case that the electric charge is generated in the photodiode during the period in which the signal charge accumulated in the capacitor of each pixel 40 is read out, at least a part of the electric charge can be read out to the first transfer resistor 41 as the signal charge.

The first driving section 47 is connected with each of the first transfer electrodes 44 to drive each of the first transfer resistors 41. The first driving section 47 transfers the signal charge retained in each cell of the first transfer resistor 41 to the cell disposed adjacent to said each cell in the vertical scanning direction. The first driving section 47 supplies the same transfer pulse to the plurality of the first transfer electrodes 44 aligned in the horizontal scanning direction. By doing so, the signal charge retained in each of the cells aligned in the horizontal scanning direction, that is, the signal charge accumulated in each of the pixels 40 aligned in the horizontal scanning direction (the pixels 40 aligned in the horizontal scanning direction are hereinafter referred to as a pixel line) is transferred in the vertical scanning direction at substantially the same timing. The signal charge retained in the cell, of each of the first transfer resistors 41, which is arranged at the end position in the vertical scanning direction, is transferred to the second transfer resistor 42.

The second driving section 48 is connected to each of the second transfer electrodes 45 to drive the second transfer resistor 42. The second driving section 48 of this embodiment successively transfers the single charge retained in each cell of the second transfer resistor 42 to the cell disposed adjacent to said each cell in the horizontal scanning direction. The single charge retained in the cell, of the second transfer resistor 42, which is disposed on the end position in the horizontal scanning direction is transferred to the output section 43. The output section 43 outputs the signal charge transferred from the second driving section 48 to the image circuit 49 as the image signal in the analog format.

The image circuit 40 includes a current-voltage converter (IV converter), an analog-digital converter (AD converter), an amplifier, etc. The image circuit 49 converts the image signal in the analog format outputted from the output section 43 into the image signal in the digital format to generate the image data indicating an image of one frame which includes output results of the plurality of pixels. The image data generated by the image circuit 49 is outputted to the controller 5. At least a part of the image circuit 49 can be included in the imaging element 20.

As shown in FIG. 4, in an imaging process (one imaging process) in which the image of one frame is taken, the imaging device 9 of this embodiment executes an exposure process (step S1), a reading process (step S2), a transfer process (step S3), an analog output process (step S4), a signal conversion process (step S5), and a digital output process (step S6).

The imaging device 9 of this embodiment is controlled by the controller 5 to execute the exposure process. The imaging element driving section 22 of this embodiment drives the first switching element of each pixel 40 at a timing, which is defined in the control signal from the controller 5, to switch on and off states in relation to accumulation of the signal charge in each pixel 40. That is, the controller 5 controls timing to start the exposure with respect to the imaging element 20 (step 11) and timing to complete the exposure with respect to the imaging element 20 (step S12).

The imaging device 9 of this embodiment executes the reading process after completion of one exposure process. In the reading process, the signal charge, which is accumulated in each pixel 40 during one exposure process, is read out to each of the first transfer resistors 41 by the imaging device 9. In the image driving section 46 of the imaging device 9 of this embodiment, the electric charge accumulated in each pixel 40 is read out to each of the first transfer resistors 41 by driving the second switching element of the imaging element 20.

The imaging device 9 of this embodiment executes the transfer process after completion of the reading process. The imaging device 9 transfers the signal charge, which is read out to each of the first transfer resistors 41 in the reading process, to the output section 43 in the transfer process. The imaging device 9 transfers the signal charge retained in each of the first transfer resistors 41 in the vertical scanning direction in a vertical transfer process (step S13) of the transfer process. Further, the imaging device 9 transfers the signal charge retained in the second transfer resistor 42 in the horizontal scanning direction in a horizontal transfer process of the transfer process.

In this embodiment, the first driving section 47 of the imaging element driving section 22 executes the vertical transfer process. As shown in FIGS. 3 and 5, the first driving section 47 of this embodiment supplies four-phase transfer pulses V1 to V4 to each of the first transfer electrodes 44 to drive each of the first transfer resisters 41. As one example, it is assumed that alignment sequence of the first transfer electrodes 44 aligned in the end position in the vertical scanning direction is the first alignment, the first driving section 47 supplies the transfer pulse V1 to each of the first transfer electrodes 44 aligned in (4N+1)-th alignment, the first driving section 47 supplies the transfer pulse V2 to each of the first transfer electrodes 44 aligned in (4N+2)-th alignment, the first driving section 47 supplies the transfer pulse V3 to each of the first transfer electrodes 44 aligned in (4N+3)-th alignment, and the first driving section 47 supplies she transfer pulse V4 to each of the first transfer electrodes 44 aligned in 4N-th alignment. Here, "N" means an integer of not less than 0. The signal charge retained in each cell of each first transfer resistor 41 is transferred to the cell disposed adjacent to said each cell in the vertical scanning direction during a period in which the first driving section 47 applies the four-phase transfer pulses V1 to V4. As described above, the imaging device 9 transfers the signal charge retained in each of the first transfer resistors 41 in the vertical transfer process so that the signal charge is transferred by one cell for each pixel line. The signal charge retained in the cell, of each of the first transfer resistors 41, which is disposed at the end position in the vertical scanning direction, is transferred to the second transfer resistor 42 in the vertical transfer process.

In this embodiment, the second driving section 48 of the imaging element driving section 22 executes the horizontal transfer process (step S14) after completion of one vertical transfer process. As shown in FIGS. 3 and 5, the second driving section 48 of this embodiment supplies two-phase transfer pulses to each of the second transfer electrodes 45 to transfer the signal charge of the second transfer resistor 42. As one example, it is assumed that arrangement order of the second transfer electrode 45 arranged in the end position in the horizontal scanning direction is the first arrangement, the second driving section 48 supplies a transfer pulse H1 to each of the second transfer electrodes 45 arranged in (2M+1)-th arrangement, and the second driving section 48 supplies a transfer pulse H2 to each of the second transfer electrodes 45 arranged in 2M-th arrangement. Here, "M" means an integer of not less than 0. The signal charge retained in each sell of the second transfer resistor 42 is transferred to the cell disposed adjacent to said each cell in the horizontal scanning direction every time when rising and falling of the transfer pulses H1, H2 are switched. That is, the second driving section 48 transfers the signal charge of one pixel line to the output section 43 so that the rising and falling of the transfer pulses H1, H2 are switched by an amount equal to the number of pixels in the horizontal scanning direction.

The imaging element driving section 22 of this embodiment judges as to whether or not transfer of all of the pixel lines is completed after completion of the horizontal transfer process (step S15). In a case that the imaging element, driving section 22 judges in the step S15 that the transfer of all of the pixel lines is completed (step S15: Yes), the transfer process is completed. In a case that the imaging element driving section 22 judges in the step S15 that the transfer of all of the pixel lines is not yet completed (there is a pixel line which is not yet transferred) (step S15: No), the process is returned to the step S13 and the vertical transfer process is re-executed. The imaging element driving section 22 transfers the signal charge corresponding to one image to the output section 43 by repeating the vertical transfer process and the horizontal transfer process alternately by an amount equal to the number of pixel lines.

In FIG. 4, the output section 43 of the imaging device executes the analog output process after the transfer process. The output section 43 of the imaging device 9 outputs the signal charge, which is transferred to the output section 43 in the transfer process, to the image circuit 49 in the analog output process. Then, the image circuit 49 converts the image signal in the analog format, which is outputted from the output section 43 in the analog output process, into the image signal (image data) in the digital format in the signal conversion process. Thereafter, the image circuit 49 of the imaging device 9 executes the digital output process after the signal conversion process. The image circuit 49 outputs the image data generated in the signal conversion process to the controller 5 in the digital output process.

Figure 6:
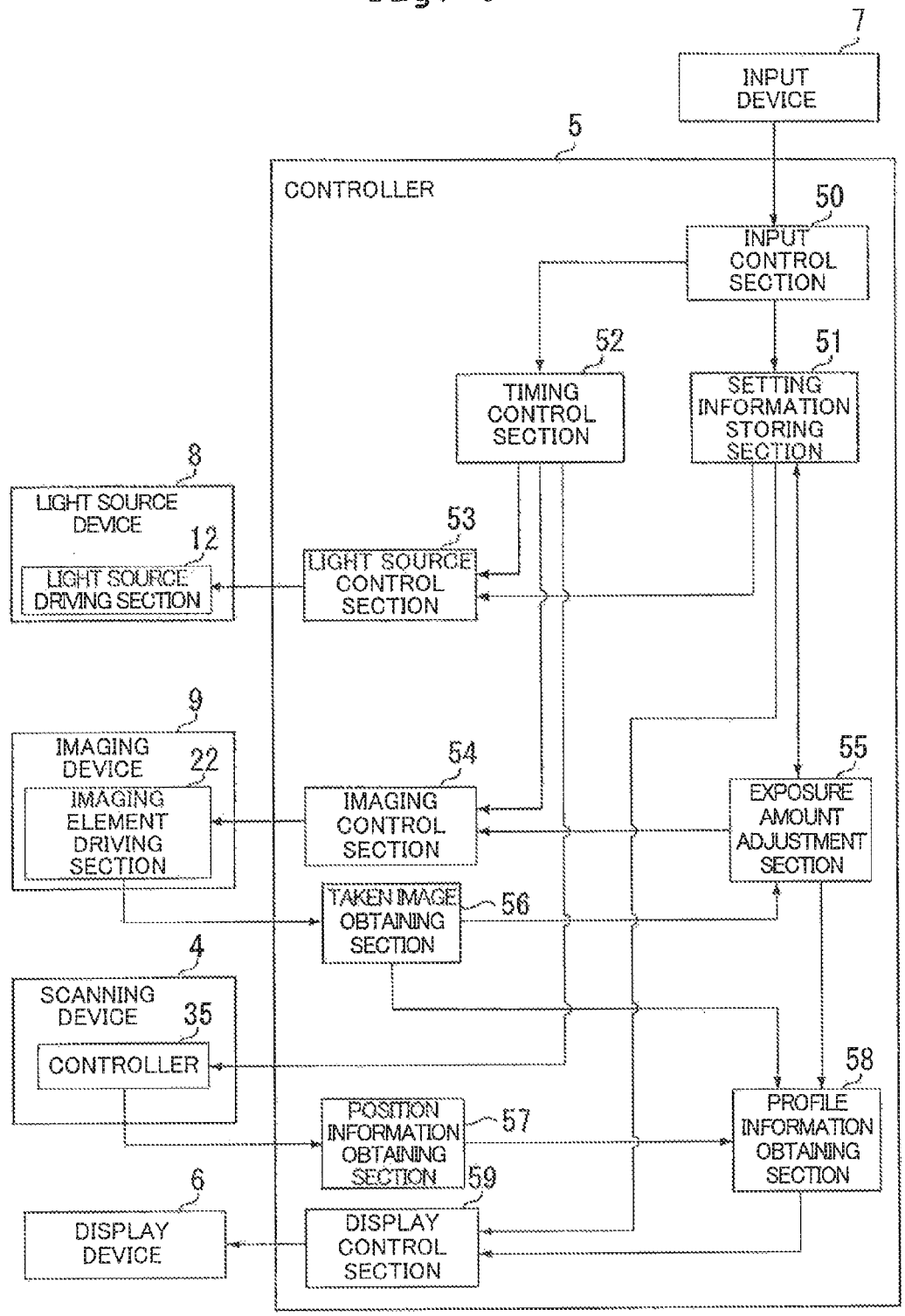
FIG. 6 shows a functional configuration of a controller of the first embodiment.
Figure 7:
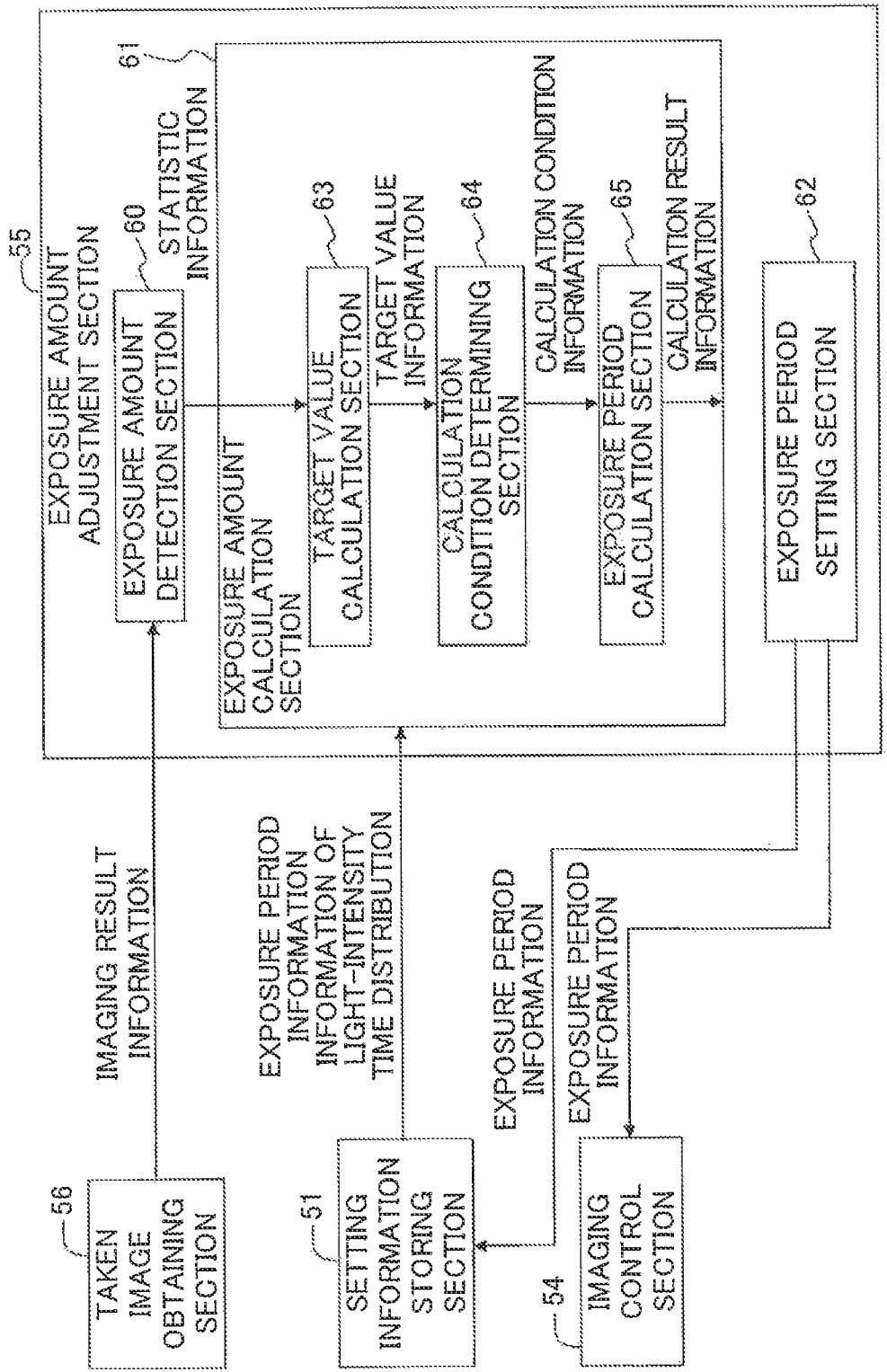
FIG. 7 shows a functional configuration of an exposure amount adjustment section of the first embodiment.
Figure 8:
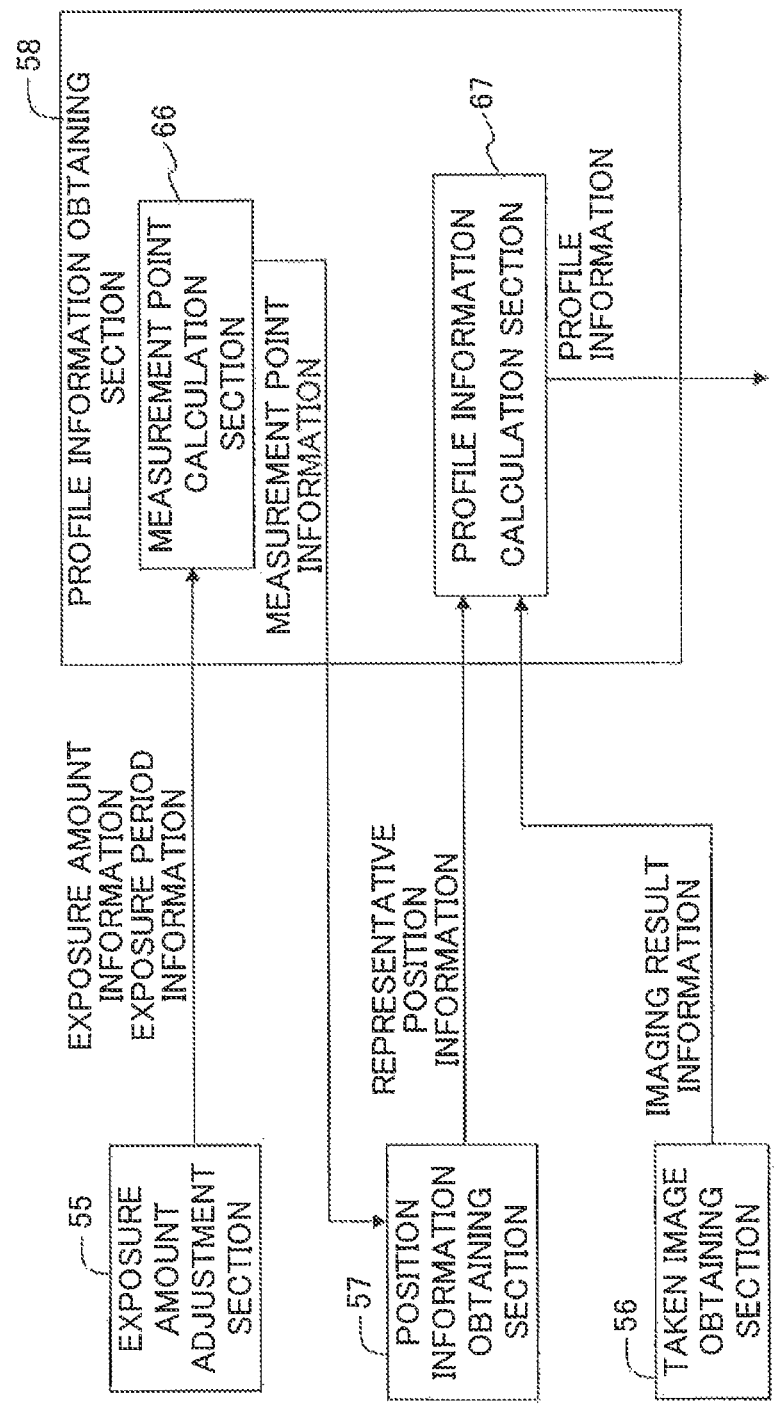
FIG. 8 shows a functional configuration of a profile information obtaining section of the first embodiment.

Next, an explanation will be made about a functional configuration of the controller 5. FIG. 6 shows the functional configuration of the controller of the first embodiment. FIG. 7 shows a functional configuration of an exposure amount adjustment section of the first embodiment. FIG. 8 shows a functional configuration of a profile information obtaining section of the first embodiment.

The controller 5 as shown in FIG. 6 includes functional sections, such as an input control section 50, a setting information storing section 51, a riming control section 52, a light source control section 53, an imaging control section 54, a second period setting section (hereinafter referred to as an exposure amount adjustment section 55), an image obtaining section 56, a position information obtaining section 57, a profile information obtaining section 58, a display control section 59, and the like.

The input control section 50 controls the input, device 7 as shown in FIG. 1. The input control section 50 executes a process according to the type of the input information inputted via the input device 7. As described in the explanation of the input device 7, the input information includes, for example, the command information, the setting information, and the operation information. The setting information includes, for example, light source setting information with respect to setting of the light source device 8, imaging setting information with respect to setting of the imaging device 9, and scanning setting information with respect to setting of the scanning device 4.

In a case that the setting information for each device is inputted via the input device 7, the input control section 50 updates the setting information stored in each information storing section to the inputted setting information. For example, in a case that the light source device 8 is exchanged, the input control section 50 updates the light source setting information with respect to the light source device 8 before the exchange, which is stored in the setting information storing section 51, to the light source setting information with respect to the light source device 8 after the exchange, upon a receipt of the input of the light source setting information with respect to the light source device 8 after the exchange.

In this embodiment, the light source setting information includes, for example, light-intensity time distribution, information indicating the time distribution of the light-intensity of the light radiated to the object Q from the light source device 8 and characteristic information indicating characteristic of the light source device 8, such as rated output. The setting information storing section 51 of this embodiment includes a light-source setting storing section in which the light source setting information is stored.

In this embodiment, the imaging setting information includes, for example, exposure amount information indicating an exposure amount with respect to the imaging element 20 and exposure period information indicating an exposure period during which the exposure with respect, the imaging element 20 is performed. In this embodiment, the exposure period information includes at least two pieces of information of timing information for starting exposure indicating timing to start the exposure; exposure time information indicating an exposure time; and timing information for completing exposure indicating timing to complete the exposure. The imaging setting information is appropriately updated when the setting is changed. For example, in a case that the exposure time is changed, the exposure time information is updated to information which includes information indicating the exposure time after the change. In this embodiment, the exposure time information has data structure in which the information indicating the exposure rime after the change is added at the time at which the exposure time is changed. The exposure time information can be used, for example, as information indicating change history of the exposure time. The setting information storing section 51 of this embodiment includes an imaging setting storing section in which the imaging setting information is stored.

In this embodiment, the scanning setting information includes scanning range information indicating a range of scanning by the scanning device 4 and scanning speed information indicating movement speed of the optical probe 3 during the scanning. The scanning setting information includes, for example, start point information indicating a position at which the optical probe 3 is arranged at the time of starting of the scanning by the scanning device 4 and end point information indicating a position at which the optical probe 3 is arranged at the time of completion of the scanning. Each of the start point information and end point information is set, for example, as information indicating a relative position of the optical probe 3 with respect to the stage device 2. The scanning speed information is, for example, information indicating a relation between a time elapsed after the scanning is started and the movement speed of the optical probe 3.

The movement speed oil the optical probe 3 by the scanning device 4 can be a certain value or a variable value with respect to the time elapsed after the scanning is started. In this embodiment, the controller 35 of the scanning device 4 obtains the scanning range information and the scanning speed information from the setting information storing section 51 to control the position of the optical probe 3 in accordance with the scanning range information and the scanning speed information. The setting information storing section 51 of this embodiment includes a scanning setting storing section in which the scanning setting information is stored.

In a case that a command to start the measurement is supplied from the input device 7, the input control section 50 of this embodiment supplies the command information commanding the start of the measurement to the timing control section 52. The timing control section 52 supplies, based on the command information, timing information indicating timing to execute each process of the measurement to the light source control section 53, the imaging control section 54, and the scanning device 4. The light source control section 53, the imaging control section 54, and the scanning device 4 are mutually synchronized to execute various controls in accordance with the timing information.

The light source control section 53 of this embodiment controls the light source driving section 12 of the light source device 8 so that the light intensity of the illumination light periodically changes in accordance with a pre-set time for each frame which is picked up by the imaging element 22. The light source control section 53 of this embodiment obtains the light-intensity time distribution information from the light source setting information stored in the setting information storing section 51 to control the light source driving section 12 in accordance with the obtained light-intensity time distribution information. The light-intensity time distribution information is, for example, information indicating a relation between a time elapsed after emitting of the light is started and a current value supplied to the light source 11.

The exposure amount adjustment section 55 of this embodiment adjusts the light amount (exposure amount) of the light which comes into the imaging element 20 in each of the plurality of imaging processes. The exposure amount adjustment section 55 of this embodiment adjusts the exposure amount by setting the exposure period in each of the imaging processes.

Here, an explanation will be made in detail about the exposure amount adjustment section 55. As shown in FIG. 7, the exposure amount adjustment section 55 of this embodiment includes an exposure amount detection section 60, an exposure amount calculation section 61, and an exposure period setting section 62. The exposure amount calculation section 61 of this embodiment includes a target value calculation section 63, a calculation condition determining section 64, and an exposure period calculation section 65.

The exposure period setting section 62 obtains the timing information for starting exposure and the exposure time information from the setting information storing section 51 before the first imaging process in the measurement. In this embodiment, each of the timing information for starting exposure and the exposure time information stored in the setting information storing section 51 before the first imaging process is information indicating a pre-set initial value. The exposure period setting section 62 sets the exposure period of the first exposure process based on the setting information described above.

The exposure amount detection section 60 obtains imaging result information indicating the last imaging result from the image obtaining section 56 before the imaging process for the second time and the followings. The exposure amount detection section 60 defects the light amount of each pixel of the last image data obtained from the image obtaining section 56. In particular, the light amount of each pixel is not found directly, but information of each pixel, such as a luminance value or a brightness value, is extracted from the last image data; and statistic information which changes due to the light amount of the image data is outputted based on distribution of information by the luminance value or the brightness value. The exposure amount detection section 60 supplies the statistic information indicating the detecting result of the exposure amount in the last imaging process to the target value calculation section 63 of the exposure amount calculation section 61.

The exposure amount calculation section 61 calculates the exposure period in the present imaging process before the imaging process for the second time and the followings in the measurement, based on the statistic information supplied from the exposure amount detection section 60, reference value information stored in the setting information storing section 51, the exposure period information, the light-intensity time distribution information, etc. In the following, each of the sections of the exposure amount calculation section 61 will be explained.

In this embodiment, the target value calculation section 63 finds a magnitude relation between the statistic indicated by the statistic information supplied from the exposure amount detection section 60 and the reference value which is indicated by the reference value information and which is a value predicted as the optimal exposure amount in the statistic, which is a similar type of the statistic obtained from the exposure detection section 60. Then, the target value calculation section 63 calculates the target value of the present exposure amount based on the magnitude relation between the statistic indicating the last exposure amount and the reference value. Thereafter, the target value calculation section 63 supplies target value information indicating the calculated target value to the calculation condition determining section 64.

In this embodiment, the calculation condition determining section 64 determines an item to be a variable in the calculation of the present exposure period, based on the target value indicated by the target value information supplied from the target value calculation section 63. Noted that the exposure period calculation section 65, as will be described later on, is capable of performing calculation in a case that the following first and second conditions are satisfied. The first condition is that the light-intensity time distribution has already been known. The second condition is that one of the timing for starting exposure, the exposure time, and the timing for completing exposure has already been known. Therefore, the calculation condition determining section 64 sets one of the timing for starting exposure, the exposure time, and the timing for completing exposure, based on the exposure period information of the last imaging process and the target value information supplied from the target value calculation section 63. For example, the calculation condition determining section 64 judges as to whether or not the target exposure amount is obtained by changing the timing for starting exposure and the timing for completing exposure under the condition that the present exposure time is set to be the same as the last exposure time. In a case that the target exposure amount is obtained, the exposure time is set to have the same constant (invariable) as that of the exposure time in the last imaging process; and the timing for starting exposure or the timing for completing exposure is set to be the variable. The calculation condition determining section 64 supplies calculation condition information indicating the determined calculation condition to the exposure period calculation section 65.

In this embodiment, the exposure period calculation section 65 calculates the present exposure period in accordance with the calculation condition indicated by the calculation condition information set in the calculation condition determining section 64 so that a statistical value with respect to the luminance or the brightness of the image data obtained by the present imaging approaches the target value. The exposure amount calculation section 61 supplies calculation result information indicating a calculation result of the present exposure period to the exposure period setting section 62.

In this embodiment, the exposure period setting section 62 sets the present exposure period based on the calculation result information supplied from the exposure amount calculation section 61. The exposure period setting section 62 supplies the exposure period information indicating the exposure period set in the exposure period setting section 62 to the imaging control section 54. Further, the exposure period setting section 62 updates the exposure period information stored in the setting information storing section 51 to information including the exposure period information indicating the exposure period after the setting.

As shown in FIG. 6, the imaging control section 54 of this embodiment controls the imaging element driving section 22. In this embodiment, the imaging control section 54 controls the pixel driving section 46 of the imaging element driving section 22 shown in FIG. 3 based on the exposure period information supplied from the exposure amount adjustment section 55. The imaging control section 54 controls the timing for starting exposure with respect to the imaging element 20 and the Liming for completing exposure with respect to the imaging element 20 by controlling the pixel driving section 46 based on the exposure period information. The imaging control section 54 controls the imaging element driving section 22 in synchronization with the control of the light source driving section 12 by the light source control section 53.

The image obtaining section 56 of this embodiment obtains, from the image circuit 49 of the imaging element driving section 22 shown in FIG. 3, the image data (imaging result information) in the digital format indicating the imaging result of the object Q. The image obtaining section 56 supplies the imaging result information obtained from the image circuit 49 to the profile information obtaining section 58 and the exposure amount adjustment section 55.

The position information obtaining section 57 of this embodiment obtains position information of the optical probe 3. The position information obtaining section 57 of this embodiment obtains the position information from the controller 35 of the scanning device 4. The position information obtaining section 57 retains, based on the obtained position information, position history information indicating history of the position of the optical probe 3 during a scanning period after the scanning by one scanning device 4 is started and before the scanning is completed. In this embodiment, the position history information is information indicating the position of the optical probe 3 with respect to a time elapsed after the scanning is started.

Further, the position information obtaining section 57 supplies, based on the retained position history information, the position information at a point of time defined in measurement time-point information supplied from the exposure amount adjustment section 55 to the profile information obtaining section 58. In this embodiment, the position information at the point of time defined in the measurement time-point information is information indicating a representative position which represents an area to be subjected to the measurement in each unit measurement. A method for finding the representative position will be described later on.

The profile information obtaining section 58 of this embodiment obtains information with respect to the profile of the object Q (profile information) based on the imaging result information of each unit measurement supplied from the taken image obtaining section 56. The profile information of this embodiment includes information indicating coordinates of a plurality of points on the surface of the object Q. The profile information can include information indicating irregularity on the surface of the object Q, information indicating a level difference of the object Q, information indicating degree of roughness of the surface of the object Q, etc. The profile information obtaining section 58 of this embodiment supplies the obtained profile information to the display control section 59.

Here, an explanation will be made in detail about the profile information obtaining section 58. As shown in FIG. 8, the profile information obtaining section 58 of this embodiment includes a measurement time-point calculation section 66 and a profile information calculation section 67.

In this embodiment, the exposure amount information and the exposure period information with respect to the present imaging process are obtained from the measurement time-point calculation section 66 and the exposure amount adjustment section 55. The measurement time-point calculation section 66 regards the point of time between the timing for starting exposure and the timing for completing exposure as a measurement time-point, based on the obtained exposure period information. In this embodiment, the measurement time-point calculation section 66 calculates the measurement time-point based on the exposure amount information and the exposure period information so that a difference between the exposure amount during a period after the timing for starting exposure and before the measurement time-point and the exposure amount during a period after the measurement time-point and before the timing for completing exposure is not less than a predetermined value. The measurement time-point calculation section 66 supplies the measurement time-point information indicating the calculated measurement time-point to the position information obtaining section 57.

In this embodiment, the profile information calculation section 67 finds distribution of points on the surface of the object Q detected by each unit measurement. In this embodiment, the profile information calculation section 67 detects the distribution of the points on the surface of the object Q by detecting an image of a pattern (line light L) on the taken image, based on the imaging result information supplied from the image obtaining section 56. Further, the profile information obtaining section 58 associates the representative position of the area to be subjected to the measurement in the unit measurement with the distribution of the points on the surface of the object Q obtained by the unit measurement, based on position information (representative position information) supplied from the position information obtaining section 57 depending on the measurement time-point information. As described above, the profile information calculation section 67 calculates the profile information of the object Q by finding the distribution of the points on the surface of the object Q detected by the plurality of unit measurements. In this embodiment, the profile information calculation section 67 supplies the calculated profile information to the display control section 59.

As shown in FIG. 6, the display control section 59 of this embodiment generates image data of a measurement result image indicating the measurement result, based on the profile information supplied from the profile information obtaining section 58. The display control section 59 supplies the image data of the measurement result image to the display device 6 and controls the display device 6 to display the measurement result image. Further, the display control section 59 of this embodiment obtains the setting information of the profile measuring apparatus 1 from at least one information storing section of the setting information storing section 51. The display control section 59 generates image data of a setting information image indicating the setting information based on the setting information obtained from the information storing section. The display control section 59 supplies the image data of the setting information image to the display device 6 and controls the display device 6 to display the setting information image.

Next, an explanation will be made about a method for measuring a profile according to the first embodiment. In this embodiment, each process of the method for measuring the profile is executed by each of the sections of the profile measuring apparatus 1 as shown in FIGS. 1 to 8 etc.

Figure 9:
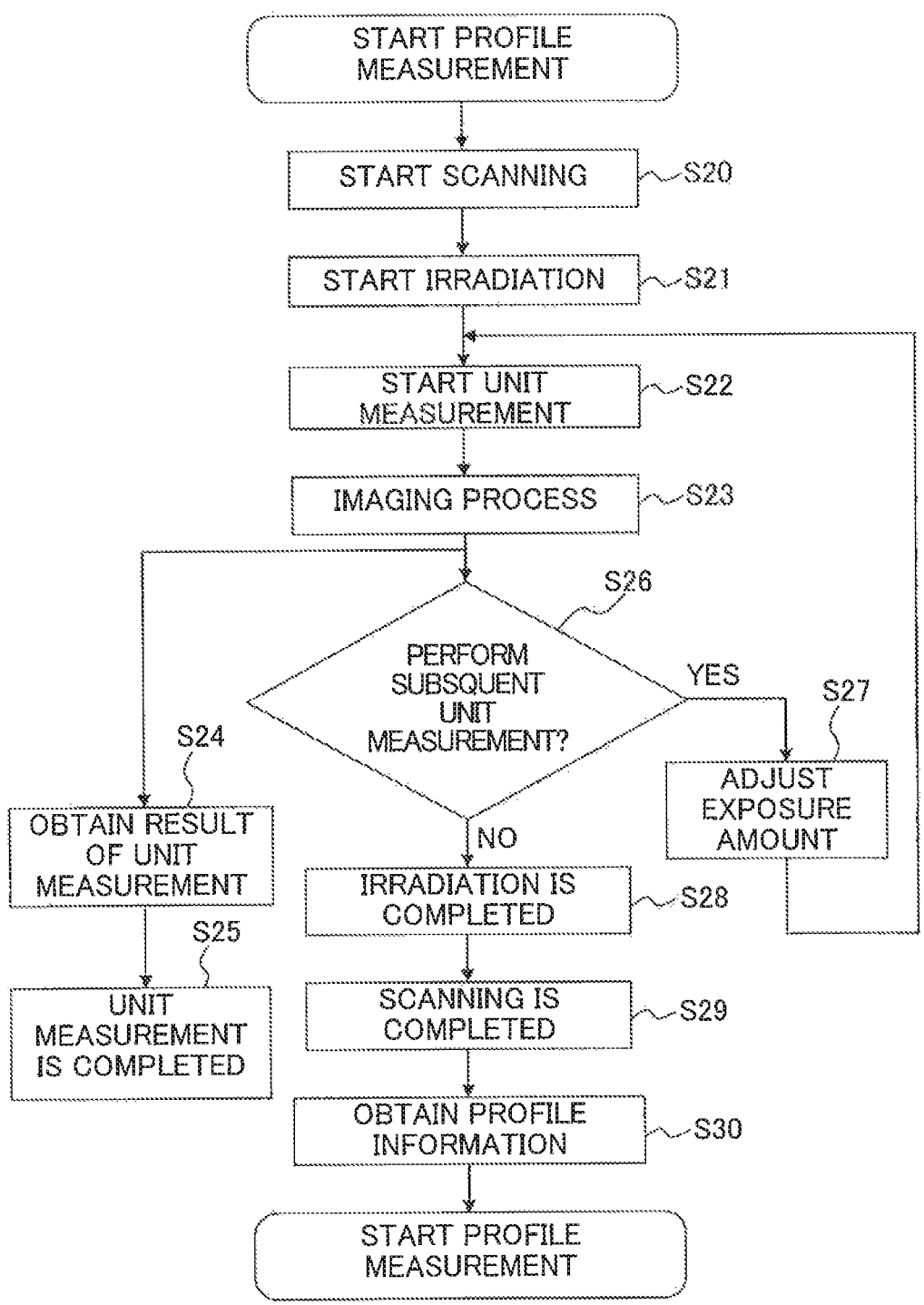
FIG. 9 is a flowchart showing a method for measuring a profile of the first embodiment.

FIG. 9 is a flowchart showing the method for measuring the profile according to the first embodiment. In this embodiment, in a case that the profile measurement is started, the timing control section 52 of the controller 5 supplies timing information indicating timing to execute each process with respect to the measurement to the light source control section 53, the imaging control section 54, and the controller 35 of the scanning device 4.

In this embodiment, the scanning device 4 obtains scanning setting information stored in the setting information storing section 51 upon a receipt of the timing information supplied from the timing control section 52. The scanning device 4 starts a scanning process (step S20) in accordance with the obtained scanning setting information. In the scanning process, the optical probe 3 is arranged by the scanning device 4 at a position defined in the start time-point information included in the scanning range information (hereinafter referred to as a scanning start position). The scanning start position is set, for example, so that the illumination light from the optical probe 3 arranged at the scanning start position comes into the outside of the object Q on the stage device 2. In the scanning process, the scanning device 4 moves the optical probe 3 arranged at the scanning start position at a speed defined in the scanning speed information.

In this embodiment, the light source device 8 obtains the light source setting information stored in the setting information storing section 51 upon a receipt of the timing information supplied from the timing control section 52. The light source device 8 starts an irradiation process (step S21) in accordance with the obtained light source setting information. In this embodiment, the irradiation process is executed after the scanning process is started. Timing to start the irradiation process by the light source device 8 is previously set with respect to timing to start the scanning process by the scanning device 4. That is, the irradiation process is executed in synchronization with the scanning process. Noted that the irradiation process can be started simultaneously with the scanning process; or the irradiation process can be started before the scanning process is started.

Figure 10:
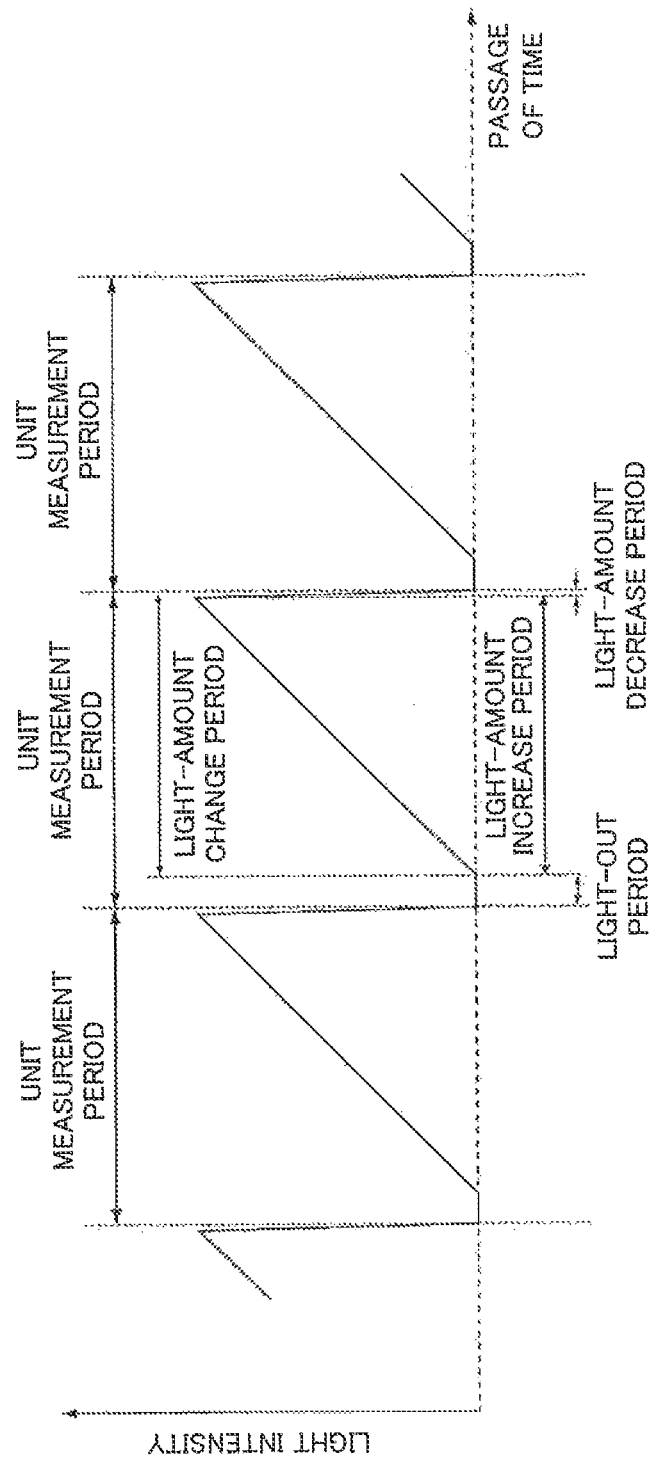
FIG. 10 shows an example of light-intensity time distribution according to the first embodiment.

Here, an example of the irradiation process will be explained. FIG. 10 shows light-intensity time distribution according to this embodiment. As shown in FIG. 10, the light intensity of the illumination light in this embodiment periodically changes. In this embodiment, the light amount of the illumination light per unit time temporally changes depending on the temporal change of the light intensity of the illumination light. In this embodiment, the period during which the light intensity of the illumination light changes is substantially the same as length of a unit measurement period during which the unit measurement is executed. In other words, in this embodiment, each of the unit measurements has the same distribution with respect to the light-intensity time distribution of the illumination light.

The length of the unit measurement period can be, for example, a reciprocal of sampling frequency. In this embodiment, information indicating the length of the unit measurement period is stored in the setting information storing section 51. The length of the unit measurement period is set, for example, within a range of not less than 5 milliseconds to not more than 10 milliseconds. Noted that the length of the unit measurement period can be set as a range of not less than 10 milliseconds; or the length of the unit measurement period can be set as a range of not more than 5 milliseconds. For example, the length of the unit measurement period can be set within a range of not less than 2 milliseconds to not more than 5 milliseconds.

The unit measurement period of this embodiment includes a light-amount increase period during which the light intensity of the illumination light is increased monotonically; a light-out period, after the light-amount increase period, during which the light source 11 of the light source device 8 is turned off; and a light-amount decrease period, after the light-amount increase period is completed and before the light-out period is started, during which the light intensity is decreased. In this embodiment, the light-amount decrease period is a period after supply of current to the light source 11 is stopped and before emitting of the light is stopped. Length of the light-amount decrease period of this embodiment is substantially equal to a relaxation time during which an electron excited in a light-emitting state (exciting state) of the light source 11 returns to a ground state; the length of the light-amount decrease period is, for example, about a few nanoseconds. As described above, in this embodiment, a period (the first period), of the unit measurement period, during which the light amount per unit time changes, is substantially equal to the light-amount increase period.

As shown in FIG. 9, the unit measurement is started after the scanning process and the irradiation process are started (step S22). In this embodiment, the imaging device 9 executes the imaging process after the unit measurement is started (step S23). The imaging device 9 is controlled by the imaging control section 54 of the controller 5 no execute the imaging process. The imaging control section 54 controls the imaging device 9 based on the exposure period information supplied from the exposure amount adjustment section 55 to make the imaging device 9 execute the imaging process. The controller 5 obtains a result of the unit measurement after completion of the imaging process (step S24). The unit measurement is completed after the controller 5 obtains the result of the unit measurement (step S25).

Further, in this embodiment, the timing control section 52 judges as to whether or not the subsequent unit measurement is performed after the completion of the imaging process in the step S23 (step S26). After the completion of the imaging process, the timing control section 52 of this embodiment judges as to whether or not a completion condition is satisfied (hereinafter referred to as a completion judgment process). In a case that the completion condition is satisfied, it is judged that the subsequent unit measurement is not performed (step S26: No). In a case that the timing control section 52 of this embodiment judges in the step S26 that the completion condition is not satisfied, it is judged that the subsequent unit measurement is performed (step S26: YES).

In this embodiment, the completion condition is a condition such that the subsequent imaging process is not completed by the time the scanning in a scanning range defined in the scanning range information is completed. In a case that the subsequent imaging process is completed by the time the scanning in the scanning range defined in the scanning range information is completed, the timing control section 52 judges that the completion condition of the second process is not satisfied. For example, the timing control section 52 obtains the position information from the position information obtaining section 57, obtains the scanning setting information from the setting information storing section 51, and obtains the information indicating the length of the unit measurement period from the setting information storing section 51. The timing control section 52 executes the completion judgment process, for example, by comparing a position at the time of completion of the scanning calculated from the position information and the scanning speed with a position at the time of completion of the subsequent imaging process calculated from the information indicating the length of the unit measurement period.

The completion judgment process can be executed by any functional section other than the timing control section 52. Further, the completion condition can be set as any condition other than the condition described above. The completion condition can be, for example, a condition in which a number of times of imaging processes executed during a period of time after the measurement is started and before the completion judgment process is executed reaches a pre-set number of times.

In this embodiment, in a case that the timing control section 52 judges in the step S26 that the subsequent unit measurement is performed (step S26: Yes), the exposure amount adjustment section 55 adjusts the exposure amount of the subsequent imaging process based on the imaging result of the present imaging process (step S27). In this embodiment, the exposure amount adjustment section 55 supplies the exposure period information indicating the exposure period of the subsequent imaging process to the imaging control section 54 to adjust the exposure amount in the subsequent imaging process. After completion of the step S27, the subsequent unit measurement is started; and the imaging control section 54 executes the subsequent imaging process based on the exposure period information supplied from the exposure amount adjustment section 55. The controller 5 repeatedly executes, in a similar manner, the imaging process (step S23) and the exposure amount adjustment process (step S27) until the completion condition is satisfied. In this embodiment, information indicating the result of the unit measurement is supplied to the controller 5 every time when the unit measurement is performed.

In this embodiment, in a case that the timing control section 52 judges in the step S26 that the subsequent unit measurement is not performed (step S26; NO), timing information indicating completion of the measurement is supplied to each of the sections of the profile measuring apparatus 1. In this embodiment, the light source control section 53 controls the light source device 8 to complete the irradiation process upon supply of the timing information (step S28). In this embodiment, the scanning device 4 completes the scanning process after the completion of the step S28 upon the supply of the timing information (step S29). Note that the process to complete the scanning can be started simultaneously with the process to complete the irradiation; or the process to complete the scanning can be started before the process to complete the irradiation.

In this embodiment, the controller 5 obtains the profile information after completion of the step S29 (step S30). Further, the controller 5 executes, based on the obtained profile information, control etc., in which an image indicating the profile information is displayed on the display device 6. The controller 5 can obtain the profile information before the completion of the step S29; or the controller 5 can obtain the profile information concurrently with the unit measurement.

Figure 11:
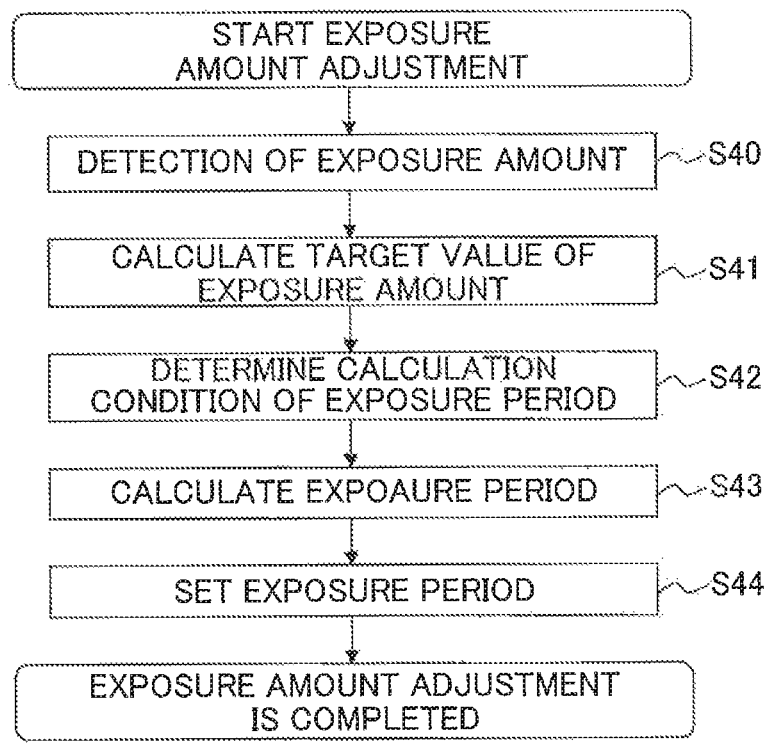
FIG. 11 is a flowchart showing a method for adjusting an exposure amount of the first embodiment.
Figure 12:
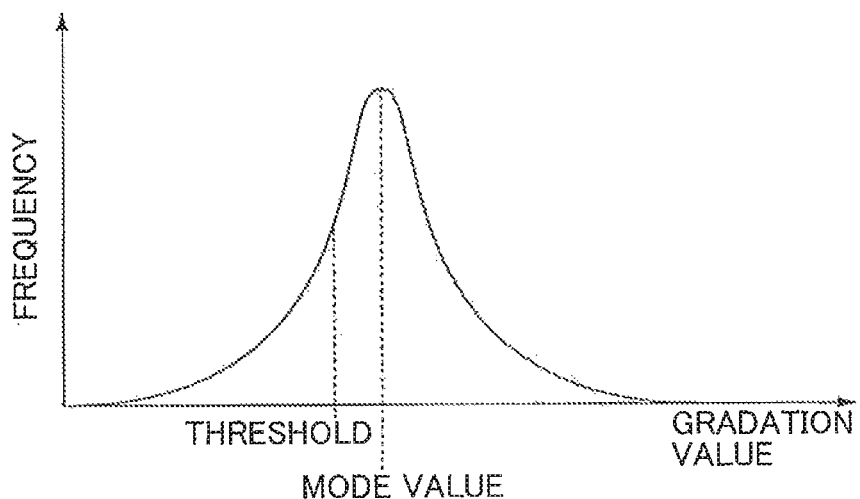
FIG. 12 shows an example of a method for comparing a statistic and a reference value of an exposure amount.
Figure 14:
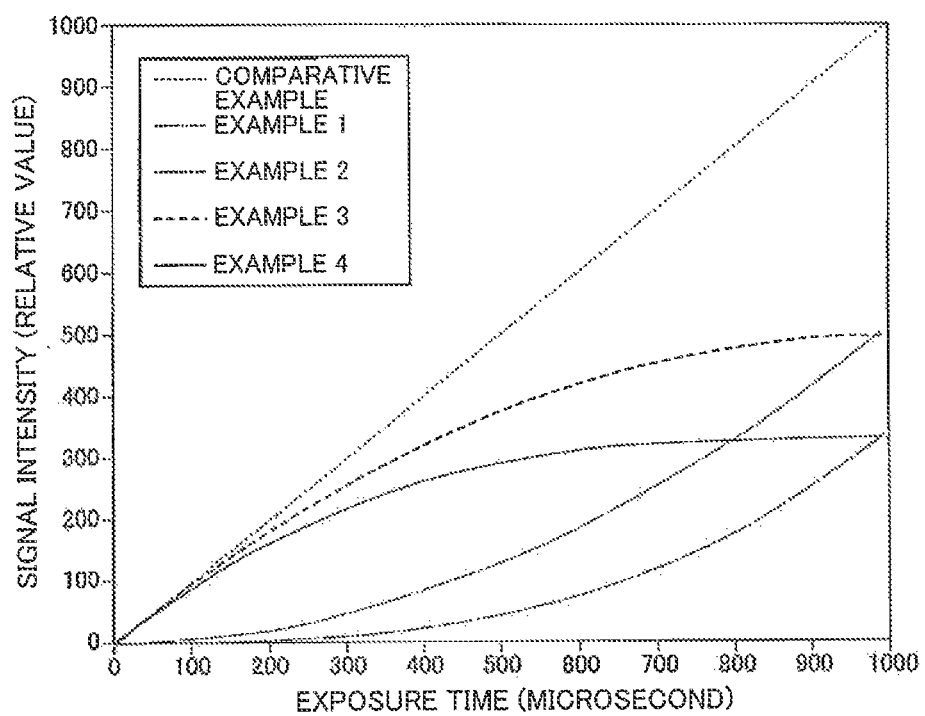
FIG. 14 is a diagram showing signal intensity with respect to an exposure time.

Next, an explanation will be made about a method for adjusting an exposure amount according to this embodiment. FIG. 11 is a flowchart showing the method for adjusting the exposure amount according to the first embodiment. FIG. 12 shows an example of a method for comparing a statistic and a reference value of the exposure amount. FIG. 14 is a diagram showing signal intensity with respect to the exposure time.

In this embodiment, each of the processes in the method for adjusting the exposure amount as shown in FIG. 11 is executed by each of the sections of the exposure amount adjustment section 55 as shown in FIG. 8.

In this embodiment, after the exposure amount adjustment process is started, the exposure amount detection section 60 detects the exposure amount of the present imaging process based or the imaging result information obtained by the present imaging process (step S40). In the step S40, the exposure amount detection section 60 of this embodiment calculates frequency distribution with respect to brightness of pixels for the image taken by the present imaging process. The brightness of each pixel is a value corresponding to an output value from each pixel 40 of the imaging element 20; and is indicated, for example, by a gradation value of 8 bits (256 gradations). In this embodiment, the image taken by the present imaging process is sometimes referred to as a present taken image; and the image taken by the subsequent imaging process is sometimes referred to as a subsequent taken image. In this embodiment, the exposure amount detection section 60 detects the present exposure amount by finding the statistic with respect to the exposure amount of the present taken image (hereinafter referred to as a statistic calculation process).

In this embodiment, the exposure amount detection section 60 creates a histogram as shown in FIG. 12, which indicates frequency with respect to the gradation value of each pixel, based on the imaging result information (image data in the digital format) obtained from the image obtaining section 56 (hereinbelow, referred to as a frequency distribution calculation process). The histogram shows the number of pixels indicating each gradation value for each of the pixels included in the present taken image. In this embodiment, the exposure amount detection section 60 creates the histogram by using gradation values of all of the pixels included in the present taken image. In this embodiment, the exposure amount detection section 60 calculates a gradation value to be a mode value as the statistic based or the created histogram.

With respect to the gradation values of the pixels included in the present taken image, the statistic can be one or two or more of an average value, a maximum value, a minimum value, an average value of the maximum value and the minimum value, the number of pixels (frequency) indicating the gradation value in a partial range between the maximum value and the minimum value, and summation (total amount of light). Further, the statistic can be calculated by using the gradation value of each pixel, in a partial area, which is included in the present taken image. For example, the exposure amount detection section 60 can calculate the statistic by using the gradation value of each of the pixels arranged to interpose one or two or more of pixels therebetween in the pixel array. Further, for example, the exposure amount detection section 60 can calculate the statistic by using the gradation values of the plurality of pixels, which are obtained such that at least a part of the pixels disposed on an area in which the pattern image is not formed on the imaging element 20 is excluded from all of the pixels. Furthermore, for example, the exposure amount detection section 60 can calculate the statistic by using the gradation values of the plurality of pixels which are selected at random from all of the pixels. For example, in a case that the exposure amount detection section 60 calculates the statistic by using the gradation values of a part of the pixels, a load generated when the statistic is calculated is decreased.

The exposure amount detection section 60 can calculate the statistic, such as the summation of the gradation values, without creating the histogram. As described above, the frequency distribution calculation process is appropriately omitted depending on, for example, the kind of the statistic. In a case that the frequency distribution calculation, process is omitted, the statistic calculation process can be, for example, a process in which the statistic is calculated from the image data of the image taken by the present imaging process.

In this embodiment, the exposure amount calculation section 61 calculates the exposure period so that the subsequent exposure amount approaches the target value based on the statistic calculated by the exposure amount detection section 60 and a pre-set reference value (hereinbelow referred to as an exposure amount reference value). In this embodiment, the exposure amount reference value is a value, the dimension of which is the same as the statistic (mode value of the gradation values). In this embodiment, the exposure amount reference value is a light amount, by which the center position of the line light in a shore direction can be found easily based on the light amount, which comes into the imaging element 20 at a sensitivity setting value during an imaging period. The light amount distribution, such as an optical spot, usually has distribution like normal distribution (gaussian distribution), in a case chat the position is taken as the horizontal axis. In a case that the number of gradations between the peak of the distribution (position as the maximum light amount) and the end of the distribution (position as the detectable minimum light amount) is sufficient, if is possible to find the peak position of the light amount distribution accurately. However, in a case that the number of gradations is insufficient (in other words, in a case that a difference between the gradation value of the maximum light amount and the gradation value of the detectable minimum light amount is small) or that the maximum light amount is saturated, the peak position of the light amount distribution can not be obtained. Thus, the center position of the spot light or the line light can not be found accurately. In view of this, in the present teaching, one frequency distribution of the gradation value of each pixel obtained by the imaging element 20 is found, and then it is judged as to whether or not the frequency distribution indicates distribution close to the ideal distribution. Accordingly, it can be judged as to whether or not the center of the line light or the spot light can be found accurately. In this embodiment, an evaluation is performed based on a modal gradation value in the histogram in order to estimate a distribution condition.

The reference value can be a unique value as described above or values which include a range and indicate outer borders of the range. In a case that the reference values are indicated by the range, the exposure period can foe calculated so that the image data from the imaging element 20 corresponds to the condition indicated by the range.

In this embodiment, the imaging setting information stored in the setting information storing section 51 includes the reference value information indicating the exposure amount reference value. The exposure amount calculation section 61 obtains the reference value information from the setting information storing section 51; and obtains, from the exposure amount detection section 60, the statistic information indicating the mode value (statistic) in the gradation values of the present taken image. The exposure amount calculation section 61 finds a magnitude relation between the mode value and the exposure amount reference value based on the obtained statistic information and the reference value information. Then, the exposure amount calculation section 61 calculates the exposure period based on the magnitude relation. Noted that, in an example shown in FIG. 12, there is shown that the mode value is a value larger than the reference value; and the present exposure amount is excessive. In this case, the exposure amount calculation section 61 calculates the exposure period so that the subsequent exposure amount is smaller than the present exposure amount.

In this embodiment, the target value calculation section 63 calculates a ratio of the mode value to the exposure amount reference value as information indicating the magnitude relation between the mode value and the exposure amount reference value. The information indicating the magnitude relation between the mode value and the exposure amount reference value can include, for example, information indicating a difference between the mode value and the exposure amount reference value.

Figure 13A:
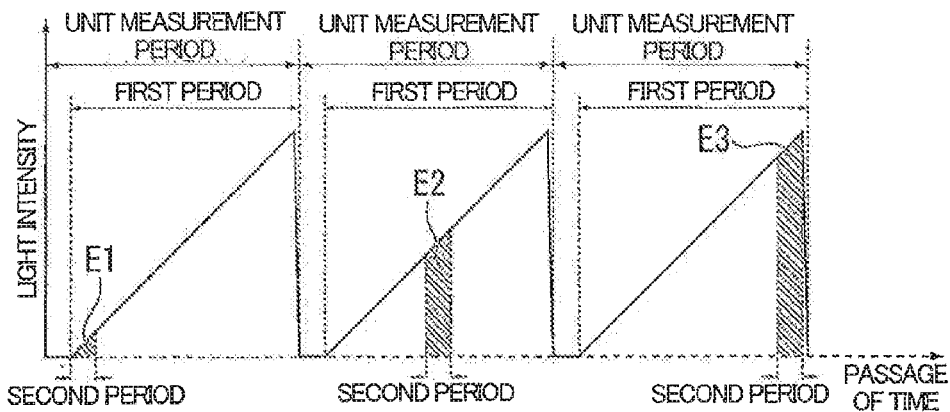
FIGS. 13A to 13C are diagrams each showing a relation between an exposure period and the exposure amount.

Here, an explanation will be made about a relation among the light-intensity time distribution, the exposure period, and the exposure amount. FIGS. 13A and 13C are diagrams each showing the relation among the light-intensity time distribution, the exposure period, and the exposure amount. The unit measurement periods for three cycles are shown in each of FIGS. 13A and 13C.

In FIG. 13A, with respect to the second period (exposure period) of the first period (light-amount change period) of the unit measurement period, the exposure time is uniform in the three cycles; and timing for starting exposure period (timing for starting exposure) varies among the three cycles. In this embodiment, the timing for starting exposure is indicated by a time elapsed after the unit measurement period is started and before the exposure period is started. In FIG. 13A, the timing for starting exposure of the second-cycle unit measurement period is set at a later timing than the timing for starting exposure of the first-cycle unit measurement period. Further, the timing for starting exposure of the third-cycle unit measurement period is set at a later timing than the timing for starting exposure of the second-cycle unit measurement period. The exposure amount in the exposure period is an amount corresponding to a value obtained so that the light-intensity time distribution is integrated in relation to the exposure period. In the first period of each of the unit measurement periods as shown in FIG. 13A, the light-intensity time distribution increases monotonically with respect to lapse of time. Thus, an exposure amount E2 in the second-cycle unit measurement period is larger than an exposure amount E1 in the first-cycle unit measurement period. Similarly, an exposure amount E3 in the third-cycle unit measurement period is larger than the exposure amount E2 in the second-cycle unit measurement period.

Figure 13B:
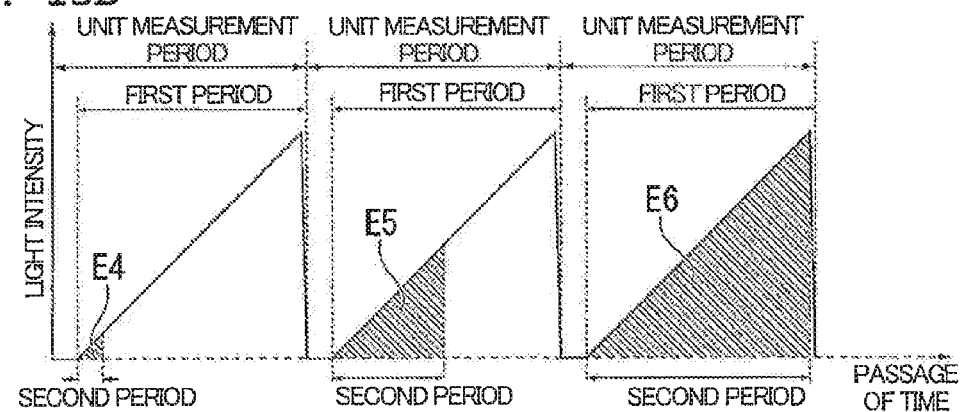
Figure 13C:
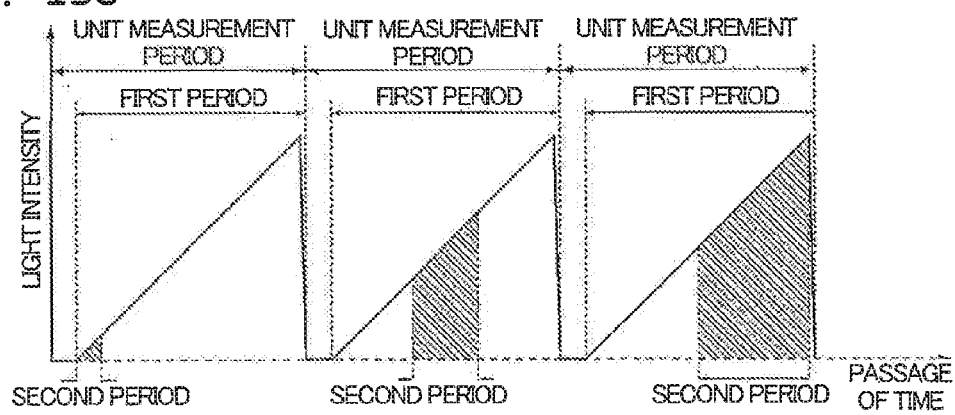

In FIG. 13B, with respect to the second period of the first period of the unit measurement period, the timing for starting exposure is the same in the three cycles; and a length of the exposure period varies among the three cycles. In FIG. 13B, the exposure time in the second-cycle unit measurement period is set to be longer than the exposure time in the first-cycle unit measurement period. Further, the exposure time in the third-cycle unit measurement period is set to be longer than the exposure time in the second-cycle unit measurement period. In the first period of each of the unit measurement periods as shown in FIG. 13B, the light-intensity time distribution increases monotonically with respect to lapse of time. Thus, an exposure amount E5 in the second-cycle unit measurement period is larger than an exposure amount E4 in the first-cycle unit measurement period. Similarly, an exposure amount E6 in the third-cycle unit measurement period is larger than the exposure amount E5 in the second-cycle unit measurement period.

In FIG. 13C, with respect to the second period of the first period of the unit measurement period, the timing for starting exposure and the length of the exposure period vary among the three cycles. As described above, in the method for adjusting the exposure amount of this embodiment, the exposure amount is adjusted as follows. That is, the light amount of the illumination light per unit time is temporally changed in the first period and at least one of the timing for starting exposure and the exposure time is adjusted.

FIG. 14 is a graph showing a relation between the signal intensity and the exposure time. In the graph of FIG. 14, the horizontal axis indicates the exposure time and the vertical axis indicates the intensity (amplitude) of the signal outputted from the imaging element 20. A comparative example in FIG. 14 indicates the signal intensity generated when the exposure time is changed under the condition that the light amount of the illumination light per unit time is constant. As shown in FIG. 14, the signal intensity of the comparative example is proportional to the exposure time. For example, it is assumed that the exposure amount is adjusted by adjusting the exposure time within a range of not less than 10 microseconds to not more than 50 milliseconds in the comparative example. In this case, the exposure amount in which the exposure time is adjusted as 50 milliseconds is 5000 times the exposure amount in which the exposure time is adjusted as 10 microseconds. That is, in the comparative example, the exposure amount is adjustable within a range (dynamic range) of not less than one time to not more than 5000 times of the minimum value.

In FIG. 14, each of the examples 1 and 3 shows the signal intensity generated when the exposure time is changed under the condition that the light amount of the illumination light per unit time increases in a form of linear function with respect to the time. In the example 1, like the first-cycle unit measurement period of FIG. 13A, the timing for starting exposure is set as a point of time at which the increase of the light amount of the illumination light is started. In the example 3, like the third-cycle unit measurement period of FIG. 13A, the timing for completing exposure is set as a point of time at which the increase of the light amount of the illumination light is completed. It is assumed that the exposure time is adjustable within the range of not less than 10 microseconds to not more than 50 milliseconds in the examples 1 and 3. In this case, it is further assumed that the exposure time is set as 10 microseconds in the example 1 and that the exposure time is set as 50 milliseconds in the example 3. Here, the exposure amount of the example 1 corresponds to the minimum value and the exposure amount of the example 3 corresponds to the maximum value. Under this condition, the exposure amount of the example 3 is about 500,000 times the exposure amount of the example 1. That is, the exposure amount is adjustable within a range approximately of not less than one time to not more than 500,000 times of the minimum value in the examples 1 and 3.

In FIG. 14, each of the examples 2 and 4 shows the signal intensity generated when the exposure time is changed under the condition that the light amount of the illumination light per unit time increases in a form of quadratic function with respect to the time. In the example 2, the timing for starting exposure is set as a point of time at which the increase of the light amount of the illumination light is started. In the example 4, the timing for completing exposure is set as a point of time at which the increase of the light amount of the illumination light is completed. It is assumed that the exposure time is adjustable within the range of not less than 10 microseconds to not more than 50 milliseconds in the examples 2 and 4. In this case, it is further assumed that the exposure time is set as 10 microseconds in the example 2 and that the exposure time is set as 50 milliseconds in the example 4. Here, the exposure amount of the example 2 corresponds to the minimum value and the exposure amount of the example 4 corresponds to the maximum value. Under this condition, the exposure amount of the example 4 is about 5,000,000 times the exposure amount of the example 2. That is, the exposure amount is adjustable within a range approximately of not less than one time to not more than 5,000,000 times of the minimum value in the examples 2 and 4.

As described above, in the method for adjusting the exposure amount in this embodiment, the light amount of the illumination Light per unit time is temporally changed, and thereby making it possible to expand the adjustable range of the exposure amount. A value of one of the timing for starting exposure, the exposure time, and the timing for completing exposure can be found from values of the other two. Thus, it is possible to define the exposure period by two of the timing for starting exposure, the exposure time, and the timing for completing exposure. Further, the exposure period is adjustable provided that the value of at least one of the two by which the exposure period is defined is variable. That is, in the method for adjusting the exposure amount in this embodiment, the adjustable range of the exposure amount can be expanded as follows. That is, the light amount of the illumination light per unit time is temporally changed in the first period, and at least one of the timing for starting exposure, the exposure time, and the timing for completing exposure is adjusted.

In FIG. 11, an explanation will be made about a method for calculating the exposure period. In this embodiment, the target value calculation section 63 calculates, in the step S41, the target value of the exposure amount which is closer to the exposure amount reference value than the statistic of the present taken image (hereinbelow referred to as a target value calculation process). In this embodiment, the target value calculation section 63 obtains, from the exposure amount detection section 60, a ratio of the mode value to the exposure amount reference value of the present taken image. Then, the target value calculation section 63 multiplies the magnification according to the ratio of the mode value of the present taken image to the exposure amount reference value to the exposure amount calculated from timing for starting imaging and the exposure time in the present imaging process; and the multiplication result is set as the target value of the exposure amount in the subsequent imaging process. The magnification is a value which becomes smaller as the ratio of the mode value of the present taken image to the exposure amount reference value is larger. For example, the magnification is a reciprocal of the ratio of the mode value of the present taken image to the exposure amount reference value.

The target value calculation section 63 can calculate the target value of the exposure amount in the subsequent imaging process based on the information indicating the difference between the mode value of the present taken image and the exposure amount reference value. For example, the target value of the exposure amount can be calculated as follows. That is, a correction amount of the exposure amount is expressed as a function of the difference between the mode value of the present taken image and the exposure amount reference value. The target value calculation section 63 calculates the correction amount of the exposure amount by using the function, and then the correction amount is added to the exposure amount in the present imaging process.

The calculation condition determining section 64 of this embodiment determines the calculation condition of the exposure period based on the target value of the exposure amount calculated by the target value calculation section 63 (step S42). In this embodiment, the calculation condition determining section 64 judges as to whether or not the subsequent exposure amount can be substantially coincident with the target value in a case that the subsequent exposure time is set to be the same as the present exposure time. This judgment is performed by a lower limit judgment process and an upper limit judgment process. In a case that the calculation condition determining section 64 judges that the exposure amount can be substantially coincident with the target value without changing the exposure time, the calculation condition determining section 64 determines that the exposure period is calculated under the condition that the exposure time is the constant and the timing for starting exposure is the variable. In a case that the calculation condition determining section 64 judges that the exposure amount can not be substantially coincident with the target value unless the exposure time is changed, the calculation condition determining section 64 determines that the exposure period is calculated under the condition that the timing for starting exposure or the timing for completing exposure is the constant and the exposure time is the variable.

In this embodiment, the lower limit judgment process is a process to judge as to whether or not the target value of the exposure amount is not less than the minimum value of the exposure amount, which is obtained when the exposure time of the subsequent imaging process is set to be the same as the exposure time of the present imaging process. In this embodiment, the calculation condition determining section 64 obtains the exposure time information from the setting information storing section 51; and the exposure time indicated by the exposure time information is set as the present exposure time. Then, the calculation condition determining section 64 calculates the minimum value of the exposure amount obtained when the exposure time of the subsequent imaging process is set to be the same as the exposure time of the present imaging process. Thereafter, the calculation condition determining section 64 compares the calculated minimum value of the exposure amount with the target value of the exposure amount calculated by the target value calculation section 63. For example, in a case that the target value of the exposure amount is smaller than the minimum value of the exposure amount and further that the subsequent exposure time is set to be the same as the present exposure time, the subsequent exposure amount is excessive with respect to the target value.

In this embodiment, in a case that the calculation condition determining section 64 judges that the target value of the exposure amount is less than the minimum value in the lower limit judgment process, a point of time at which the exposure period, in which the exposure amount has the minimum value under the condition that the exposure time of the subsequent exposure process is set to be the same as that of she present exposure process, is started is set as the timing for starting exposure of the subsequent imaging process. In this case, it is determined that the timing for starting exposure is the constant and the exposure time is the variable in the calculation condition of the exposure period.

In this embodiment, the upper limit judgment process is a process to judge as to whether or not the target value of the exposure amount is not more than the maximum value of the exposure amount, which is obtained when the exposure time of the subsequent imaging process is set to be the same as the exposure time of the present imaging process. In this embodiment, the calculation condition determining section 64 calculates the maximum value of the exposure amount in a similar manner to that of the lower limit judgment process; and compares the calculated maximum value of the exposure amount with the target value of the exposure amount calculated in the target value calculation process. For example, in a case that the target value of the exposure amount is larger than the maximum value of the exposure amount and further that the subsequent exposure time is set to be the same as the present exposure time, the subsequent exposure amount is insufficient with respect to the target value.

In this embodiment, in a case that the calculation condition determining section 64 judges that the target value of the exposure amount is greater than the maximum value in the upper limit process, a point of time at which the exposure period, in which the exposure amount has the maximum value under the condition that the exposure time of the subsequent exposure process is sec to be the same as that of the present exposure process, is completed is set as the timing for completing exposure of the subsequent imaging process. In this case, it is determined that the timing for completing exposure is the constant and the exposure time is the variable in the calculation condition of the exposure period.

In this embodiment, in a case that the calculation condition determining section 64 judges that the target value of the exposure amount is not less than the minimum value in the lower limit judgment process and further that the calculation condition determining section 64 judges that the target value of the exposure amount is not more than the maximum value in the upper limit judgment process, the subsequent exposure time is set to be the same as the present exposure time. In this case, it is determined that the timing for starting exposure is the variable and the exposure time is the constant in the calculation condition of the exposure period.

In this embodiment, the exposure period calculation section 65 calculates the exposure period in accordance with the calculation condition determined by the calculation condition determining section 64 (step S43). In this embodiment, the exposure period calculation section 65 obtains the exposure time information from the imaging setting information stored in the setting information storing section 51. In this embodiment, the exposure time indicated by the exposure time information before the first imaging process is performed is set to be relatively short in a range of the exposure time adjustable by the imaging device 9. The exposure time indicated by the exposure time information is set, for example, as the shortest exposure time adjustable by the imaging device 9. In a case that the exposure time is changed, the exposure time information is updated to the information including the information indicating the exposure time after the change.

Further, the exposure period calculation section 65 obtains the information of light-intensity time distribution from the light source setting information stored in the setting information storing section 51. In this embodiment, the light intensity with respect to time defined in the information of light-intensity time distribution is a function in which the time is the variable. That is, the exposure amount is found uniquely by integrating the light intensity with time over the exposure period under the condition that values of at least two of the timing for starting exposure, the exposure time, and the timing for completing exposure are given. In other words, the timing for starting exposure can be calculated by using a function indicating the light-intensity time distribution under the condition that the target value of the exposure amount and the exposure time are given. Similarly, the exposure time can be calculated by using the function indicating the light-intensity time distribution under the condition that the target value of the exposure mount and the timing for starting exposure or the timing for completing exposure are given. In this embodiment, the exposure period calculation section 65 calculates the exposure period in accordance with the calculation condition determined by the calculation condition determining section 64.

In this embodiment, the calculation of the exposure amount in the upper limit judgment process, the lower limit judgment process, etc., is executed by using the function indicating the light-intensity time distribution. The function is expressed in a form of a numerical formula (expression) or a table. For example, the calculation of the exposure amount using the timing for starting exposure and the exposure time is executed by using a two-dimensional table (hereinbelow, referred to as an exposure amount table) in which each of the exposure timing and the exposure time is the variable. The exposure amount table has, for example, data structure as follows. That is, each exposure amount obtained when the exposure timing is discretely changed with respect to a predetermined exposure time Is arranged in one direction of a data array; and each exposure amount obtained when the exposure time is discretely changed with respect to a predetermined timing for starting exposure is arranged in the other direction of the data array. In a case that such a exposure amount table is used, the exposure amount is calculated by reading (loading) data, on the exposure amount table, corresponding to the predetermined timing for starting exposure and the predetermined exposure time. The timing for starting exposure can be calculated, for example, by the function expressed in the form of the numerical formula (expression) or the table or by processing of interpolation calculation for a table value of the function expressed in the form of the table as appropriate. The function expressed in the form of the table can be the exposure amount table.

In this embodiment, the exposure period setting section 62 sets the exposure period based on the calculation result of the exposure period by the exposure period calculation section 65 (step S44). By the way, there is possibility that there are two or more of calculation values of the timing for starting exposure depending on the light-intensity time distribution. For example, in a case that the light-intensity time distribution is expressed by a function having an extreme value, as the calculation values of the timing for starting the exposure, there exist solutions at a point of time before the extreme value of the light-intensity time distribution and a point of time after the extreme value of the light-intensity time distribution. In a case that there are two or more of calculation values of the timing for starting exposure, algorithm to determine that any of the calculation values is adopted is appropriately set in consideration of robustness etc. For example, in the case that there are two or more of calculation values of the timing for starting exposure, the exposure period setting section 62, can adopt, for example, a calculation value closest to the starting time-point of the first period; a calculation value closest to a middle time-point of the first period; or a calculation value closest to the completion time-point of the first period. For example, in a case that the profile measuring apparatus 1 adopts the calculation value closest to the starting time-point of the first period as the timing for starting exposure in the subsequent imaging process, a period of time after the timing for completing exposure in the subsequent imaging process and before the timing for starting exposure in the imaging process after the subsequent imaging process becomes longer. Thus, stability of operation is improved.

Figure 16A:
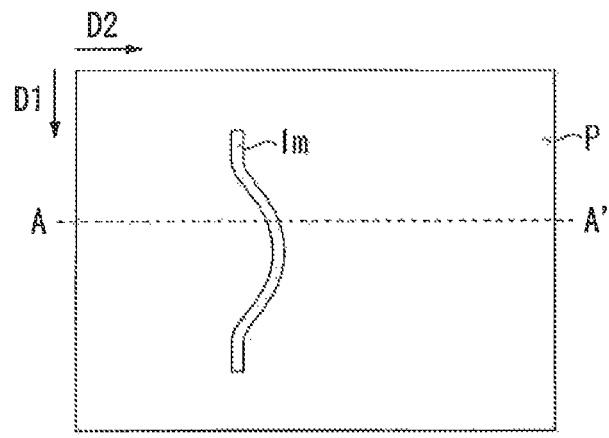
FIGS. 16A to 16C are diagrams each showing the method for obtaining the profile information according to the first embodiment.
Figure 16B:
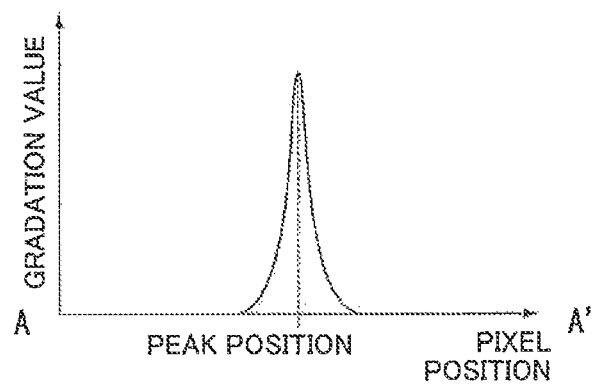
Figure 16C:
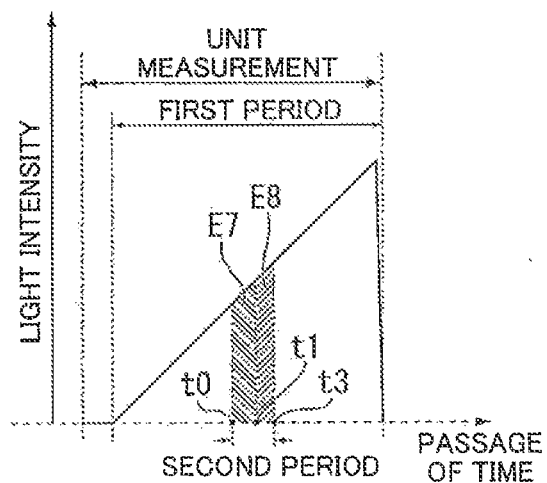

Next, an explanation will be made about a method for obtaining profile information according to this embodiment. FIG. 15 is a flowchart showing the method for obtaining the profile information according to the first embodiment. FIGS. 16A to 16C are diagrams each showing the method for obtaining the profile information according to the first embodiment. In this embodiment, each process of the method for obtaining the profile information as shown in FIG. 15 is executed by the profile information obtaining section 58 as shown in FIG. 8.

In a case that obtaining of the profile information is started, the profile information calculation section 67 obtains, from the image obtaining section 56, imaging result information indicating the image taken in the present imaging process (step S50). Then, the profile information calculation section 67 detects an area, in the taken image, corresponding to the surface of the object, based on the obtained imaging result information (step S51). As shown in FIG. 16A, a pattern image Im which is drawn on the surface of the object Q by the illumination light has a longitudinal direction D1 in a taken image P so as to correspond to the longitudinal direction of the spot of the line light L. The profile information calculation section 67 of this embodiment finds, in the step S51, distribution of brightness (gradation value) with respect to the position of each pixel, as shown in FIG. 16B, for a width direction D2 intersecting with the longitudinal direction D1. Further, the profile information calculation section 67 finds, in the distribution of the gradation value found in the step S51, the position of the pixel (peak position) in which the gradation value is at the maximum. The profile information calculation section 67 calculates the peak position, which is found for each position of the longitudinal direction D1, as information indicating the position of the surface of the object Q.

In a case that the obtaining of the profile information is started, the measurement time-point calculation section 66 calculates a point of time between a timing for starting exposure t0 and a timing for completing exposure t1 as a measurement time-point t2, based on the exposure amount information and the exposure period information. As shown in FIG. 16C, the measurement time-point calculation section 66 of this embodiment calculates the measurement time-point t2 so that a difference (absolute value) between an exposure amount E7 obtained after the timing for starting exposure t0 and before the measurement time-point t2 and an exposure amount E8 obtained after the measurement time-point t2 and before the timing for completing exposure t1 is within a predetermined range. In this embodiment, the measurement time-point calculation section 66 calculates the measurement time-point t2 so that the exposure amount E7 and the exposure amount E8 are substantially the same. In this embodiment, the measurement time-point t2 is a point of time indicating the center (gravity point) with respect to a total exposure amount of the exposure period in the unit measurement period. The measurement time-point calculation section 66 supplies the measurement time-point information indicating the calculated measurement time-point to the position information obtaining section 57.

In this embodiment, the profile information calculation section 67 obtains the representative position information which is supplied by the position information obtaining section 57 depending on the measurement time-point information (step S53). The representative position information is position information indicating the position of the optical probe 3 at the measurement time-point. In this embodiment, the representative position is a position which represents the area to be subjected to the exposure process in each unit measurement.

In this embodiment, the profile information calculation section 67 associates the position of the surface of the object Q detected in the step S51 with the representative position obtained in the step S53 (step S54). The profile information calculation section 67 associates the position of the surface of the portion of the object Q, which is detected in each unit measurement, with the representative position in the present unit measurement to obtain the profile information indicating positions of a plurality of points on the surface of the object Q detected by the plurality of unit measurements.

Figure 17:
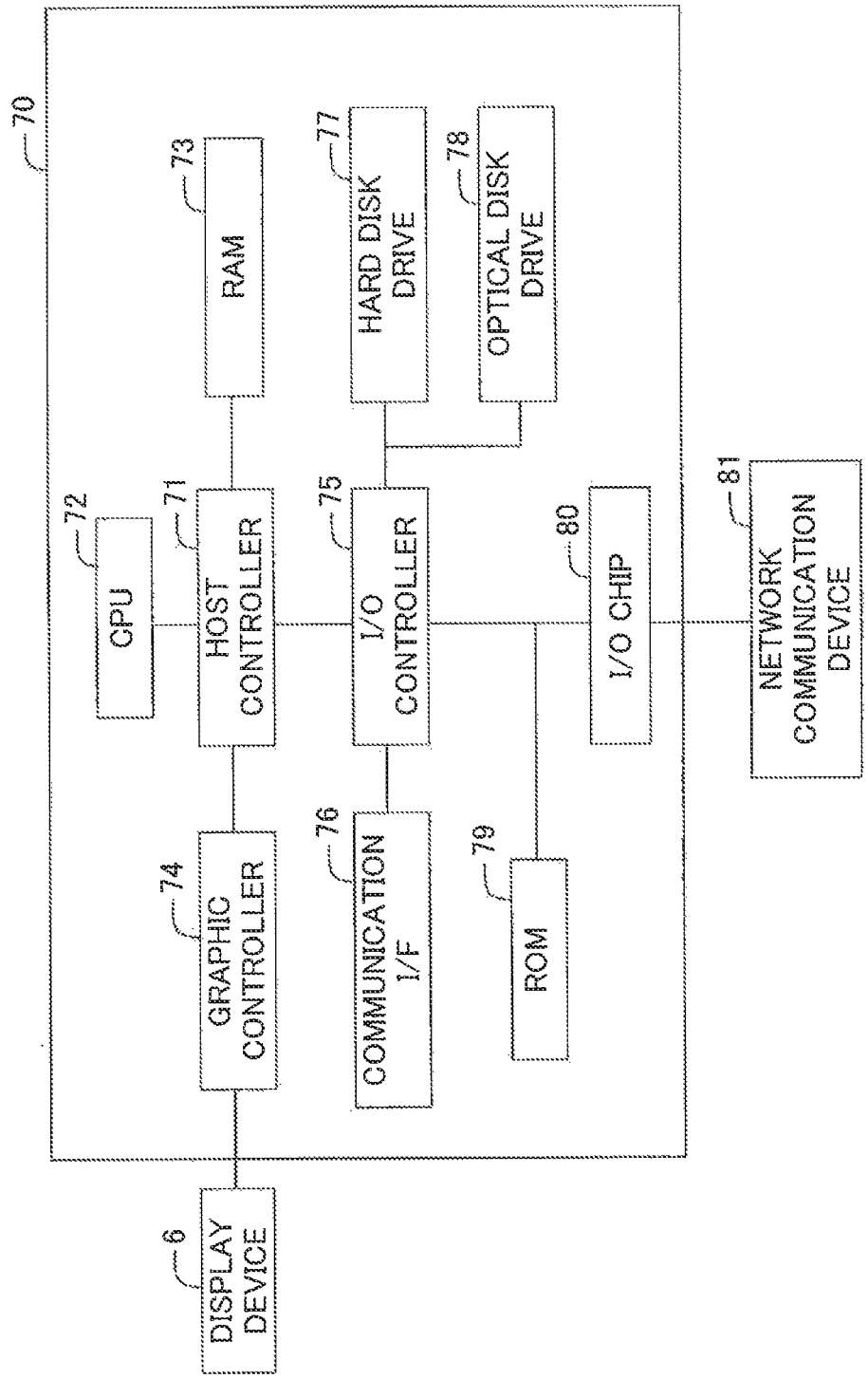
FIG. 17 is a diagram showing an example of a configuration of a computer.

Next, an explanation will be made with reference to FIG. 17 about an example of a configuration of a computer which functions as the controller 5. FIG. 17 is a diagram showing an example of hardware construction in a case that the controller 5 is constructed as an electronic information processing apparatus such as the computer.

A computer 70 as shown in FIG. 17 includes a CPU (Central Processing Unit) peripheral part, an input/output section, and a legacy input/output section. The CPU peripheral part includes a CPU 72, a RAM (Random Access Memory) 73, and a graphic controller 74 which are connected to one another by a host controller 71. The input/output section includes a communication interface 76, a hard disk drive 77, and an optical disk drive 78, those of which are connected to the host controller 71 by an input/output controller 75. The legacy input/output section includes a ROM (Read Only Memory) 79 and an input/output chip 80 which are connected to the input/output controller 75.

The RAM 73, the CPU 72 which accesses the RAM 73 at a high transmission rate, and the graphic controller 74 are connected by the host controller 71. The CPU 72 operates based on the program(s) stored in the ROM 79 and the RAM 73 to control each of the sections. The graphic controller 74 obtains image data generated on frame buffer which is provided in the RAM 73 by the CPU 72 etc.; and displays the image data on the display device 6. Alternatively, the graphic controller 74 can include the frame buffer, in which the image data generated by the CPU 72 etc. is stored therein.

The host controller 71, the hard disk drive 77 which is a relatively high-speed input/output device, the communication interface 76, and the optical disk drive 78 are connected by the input/output controller 75. The program and data used by the CPU 72 are stored in the hard disk drive 77. The communication interface 76 is connected to a network communication device 81 to transmit and receive the program or the data. The optical disk drive 78 reads she program or the data from the optical disc to provide the program or the data to the hard disk drive 77 and the communication interface 76 via the RAM 73.

The ROM 79 and the input/output chip 80 which is a relatively low-speed input/output device are connected to the input/output controller 75. A boot program executed by the controller 5 at the time of startup, a program which depends on a hardware of the controller 5, etc., are stored in the ROM 79. The input/out chip 80 connects various input/output devices to one another via a parallel port, a serial port, a keyboard port, a mouse port, and the like.

The program executed by the CPU 72 is stored in a recording medium such as the optical disk and IC (Integrated Circuit); and the program is provided by a user. The program stored in the recording medium can be compressed or uncompressed. The program is installed on the hard disk drive 77 from the recording medium, is read out to the RAM 73, and is executed by the CPU 72. The program executed by the CPU 72 makes the computer 70 function as the input control section 50, the timing control section 52, the setting information storing section 51, the light source control section 53, the imaging control section 54, the image obtaining section 56, the exposure amount adjustment section 55, the position information obtaining section 57, the profile information obtaining section 58, and the display control section 59, as shown in FIG. 6 etc.

The program as described above can be stored in an external recording medium. In addition to a flexible disk and CD-ROM, an optical recording medium such as DVD (Digital Versatile Disk) and PD (phase Disk), a magneto-optical recording medium such as MD (MiniDisk), a tape medium, a semiconductor memory such as an IC card, and the like can be used as the recording medium. In this embodiment, a non-transitory computer readable recording medium includes a magnetic disk, a magneto-optical disk, CD-ROM, DVD-ROM, the semiconductor memory, and the like. In the computer 70, it is possible to deliver the program by a communication line; and it is possible to execute the program depending on the delivery. Further, at least one of the functional sections of the controller 5 can be constructed of the hardware such as ASIC.

As described above, the profile measuring apparatus 1 of this embodiment changes the light amount of the illumination light in the first period and performs the exposure process in the second period including at least a part of the first period. Since the profile measuring apparatus 1 sets the second period based on the light-intensity time distribution of the illumination light, it is possible to expand the adjustable range (dynamic range) of the exposure amount. Therefore, the profile measuring apparatus 1 is capable of setting the exposure amount depending on a local profile and/or material of the object Q, thereby making it possible to improve the measurement accuracy.

By the way, the area to be subjected to the measurement in each unit measurement is changed depending on the exposure period. The profile measuring apparatus 1 of this embodiment obtains the representative position information as information indicating the position corresponding to the area into which the illumination light comes during the exposure period; and associates the position of the point on the surface of the object Q with the representative position. Thus, an error generated with the change of the exposure period can be decreased. Further, the measurement time-point is calculated so that exposure amounts before and after the measurement time-point in the exposure period are uniform; and the information indicting the position (representative position) of the optical probe 3 at the measurement time-point is obtained. Therefore, it is possible to decrease the error generated with the change of the exposure period significantly.

Further, in this embodiment, each of the unit measurement periods has substantially the same light-intensity time distribution of the illumination light. Therefore, each of the unit measurement periods has substantially the same light amount of the illumination light irradiated to the object Q. Thus, temperature increase for each portion of the object Q due to the illumination light is less likely to be varied in the object Q. As a result, the profile measuring apparatus 1 is capable of reducing measurement error caused, for example, by expansion of the object Q due to the temperature increase. Further, as compared with a case in which the illumination light, the light amount of which is not changed in the unit measurement period, is used, the profile measuring apparatus 1 is capable of raising the maximum value of the light intensity under the condition that the total light amount in each unit measurement period is equal. Therefore, in the profile measuring apparatus 1, it is possible to handle the laser light etc. with ease and usability (user-friendliness) is improved.

An image measuring apparatus of this embodiment is provided with at least the imaging device 9 and the controller 5 of the profile measuring apparatus 1. In the image measuring apparatus, the image is taken by the imaging device 9 while adjusting the exposure amount; and various measurements are performed by using the imaging result. The image measuring apparatus of this embodiment can be a part of or all of an apparatus which performs measurement for any item other than the profile. Also in this case, it is possible to expand the adjustable range of the exposure amount, and thus it is possible to improve the measurement accuracy.

In this embodiment, the exposure period of the exposure process in the present unit measurement process is set based on the imaging result information of the last unit measurement process. However, the exposure period of the exposure process in the present unit measurement process can be set based on the imaging result information (s) of one or two or more of unit measurement process(es) executed before the present unit measurement process. For example, the profile measuring apparatus 1 can compare the target value of the last exposure amount calculated based on the imaging result information of the unit measurement process performed before the last unit measurement process with the last exposure amount detected based on the imaging result information of the last unit measurement process so as to correct the target value calculated based on the imaging result information of the last unit measurement process by using the result of the comparison.

The imaging device 9 of this embodiment adopts a global shutter system. However, the imaging device 9 of this embodiment can adopt a rolling shutter system. Further, in the imaging device 9, the exposure period is variable by an electronic shutter. However, the exposure period can be variable by a mechanical shutter. Further, the imaging device 9 can use the electronic shutter and the mechanical shutter together.

The controller 5 of this embodiment controls the light source device 8, but it is possible that the controller 5 does not control the light source device 8. For example, it is possible that the illumination light, the light intensity of which temporally changes in accordance with a predetermined light-intensity time distribution, is emitted from the light source device 8 and the signal indicating timing at which the light intensity changes is supplied to the controller 5. In this case, the controller 5 can control the imaging device 9 in synchronization with the light source device 8 based on the signal supplied from the light source device 8. Further, the light source device 8 can be an external device of the profile measuring apparatus 1.

The controller 5 of this embodiment can obtain a spacing distance (interval) in the area to be subjected to the measurement in the unit measurement process (hereinafter referred to as a measurement interval) based on the imaging setting information and the scanning setting information stored in the setting information storing section 51. The measurement interval is a value corresponding for example, to a resolution of the measurement. The controller 5 calculates, for example, the measurement interval based on the scanning speed defined in the scanning speed information and the length of the unit measurement period. Further, in a case that the measurement interval is designated, the controller 5 adjusts at least one of the scanning speed and the length of the unit measurement period so that the measurement interval becomes the designated value. For example, in a case that the scanning speed is too fast or that the unit measurement period is too long at the time of setting the measurement interval to be the predetermined value, the controller 5 of this embodiment is capable of outputting information indicating that the measurement interval can not be set to be the predetermined value. This information can be notified to the user by being displayed on the display device 6, and the like.

In this embodiment, the scanning device 4 is a device of a robot hand system, but the scanning device 4 can be a stage-type device etc. The scanning device 4 can change the relative position of the optical probe 3 to the object Q in at least one degree of freedom from among six degrees of freedom including translation along three axes (X Y Z) orthogonal with each other (three degrees of freedom) and rotation around each axis (three degrees of freedom). For example, the scanning device 4 can change a posture (rotation position) of the optical probe 3 with respect to the stage device 2 (object Q). Further, the scanning device 4 can include a deflecting member such as a galvano mirror. In this case, the line light can be scanned on the object Q by deflecting the line light emitted from the light source device 8 using the deflecting member. In this case, the position information can include information indicating a rotation angle of the deflecting member. Further, the scanning device 4 can scan one dimensionally or two dimensionally.

In the embodiment described above, the imaging control section 54 controls the imaging element 20 based on one exposure period information supplied from the exposure amount adjustment section 55. The imaging control section 54, however, can control the imaging element 20 by obtaining the exposure period information from the setting information storing section 51.

Second Embodiment

Next, an explanation will be made about the second embodiment. The components, which are the same as or equivalent to those of the embodiment described above, are designated by the same reference numerals, any explanation of which will be simplified or omitted as appropriate in the second embodiment.

Figure 18:
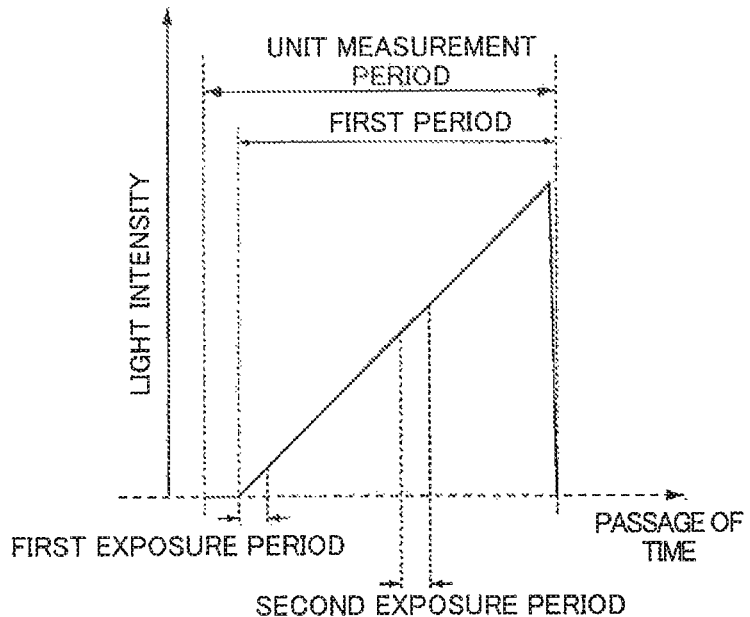
FIG. 18 is a diagram snowing a method for adjusting an exposure amount according to the second embodiment.
Figure 19:
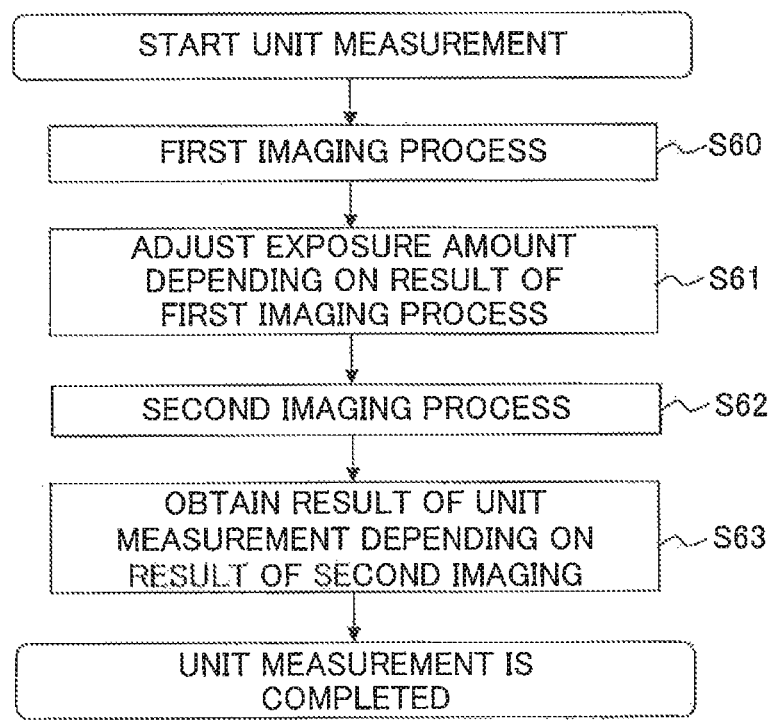
FIG. 19 is a flowchart schematically showing a method for measuring a profile according to the second embodiment.

FIG. 18 is a diagram showing a method for adjusting an exposure amount according to the second embodiment. FIG. 19 is a flowchart schematically showing a method for measuring a profile according to the second embodiment. In this embodiment, each of the processes in the method for measuring the profile as shown in FIG. 19 is carried out by each of the sections of the profile measuring apparatus 1 described in the first embodiment. The unit measurement process is executed a plurality of times by the profile measuring apparatus 1 of this embodiment to obtain the profile information of the object Q.

As shown in FIG. 18, in this embodiment, the unit measurement period includes a first exposure period and a second exposure period. In this embodiment, the method for adjusting the exposure amount includes the imaging in the first exposure period and the setting in the second exposure period based on the imaging result obtained in the first exposure period. In this embodiment, the first exposure period includes a part of the first period. In this embodiment, the second exposure period is set after completion of the first exposure period and includes a part of the first period.

As shown in FIG. 19, in a case that the unit measurement is started in this embodiment, the imaging control section 54 of the controller 5 as shown in FIG. 6 controls the imaging device 9 to execute the first imaging process in the first exposure period (step S60). In this embodiment, the first exposure period is set as a period in which the exposure amount becomes the smallest under the condition that the exposure time is set to be the shortest. In this embodiment, timing for starting the first exposure period is fixed as a point of time at which the increase of the light intensity of the illumination light is started. In this embodiment, a length of the first exposure period is set as a fixed value. In this embodiment, information indicating the timing for starting the first exposure period and information indicating timing for completing the first exposure period are stored in the setting information storing section 51.

The first imaging process is, for example, a process which is the same as or equivalent to the imaging process described in the first embodiment. In this embodiment, the profile information obtaining section 58 does not calculate the profile information based on the imaging result information in the first imaging process. In this embodiment, the imaging result information in the first imaging process is supplied from the imaging device 9 to the exposure amount adjustment section 55 via the taken image obtaining section 56.

The exposure amount adjustment section 55 of this embodiment adjusts the exposure amount in the second exposure period by setting the second exposure period based on the imaging result information in the first imaging process (step S61). The exposure amount adjustment section 55 of this embodiment sets the second exposure period, for example, by the method for adjusting the exposure amount described with reference to FIGS. 7 and 11.

In this embodiment, the imaging control section 54 of the controller 5 controls the imaging device 9 based on the exposure period information indicating the second exposure period set by the exposure amount adjustment section 55 to execute a second imaging process in the second exposure period (step S63). The second imaging process is, for example, a process which is the same as or equivalent to the imaging process described in the first embodiment.

In this embodiment, the profile information obtaining section 58 obtains the result of the unit measurement based on the second imaging process (step S63). In this embodiment, the imaging result information in the second imaging process is supplied from the imaging device 9 to the profile information obtaining section 58 via the image obtaining section 56. The profile information obtaining section 58 obtains the profile information by the method for obtaining the profile information described, for example, with reference to FIGS. 16A to 16C. In this embodiment, the exposure amount adjustment section 55 does not perform the adjustment of the exposure amount based on the result of the second imaging process.

In the profile measuring apparatus 1 of this embodiment as described above, it is possible to expand the adjustable range of the exposure amount for the same reason as the above embodiment. Further, in the profile measuring apparatus 1 of this embodiment, the second exposure period belonging to the same unit measurement period as the first exposure period is set based on the result of the first imaging process. Thus, it is possible to reduce, for example, the error between the target value and the exposure amount in the second exposure period.

In this embodiment, the profile information obtaining section 58 can calculate the profile information based on the imaging result information of the first imaging process. For example, the profile information obtaining section 58 can select any of the imaging result information of the first imaging process and the imaging result information of the second imaging process to calculate the profile information based on the selected imaging result information. In this case, the profile information obtaining section 58 can select the imaging result information, which has the exposure amount closer to the reference value, from among she first imaging process and the second imaging process, to calculate the profile information. Further, in the profile information obtaining section 58, it is possible that the profile information is calculated based on the imaging result information in the first imaging process; the profile information is calculated based on the imaging result information in the second imaging process; and any of the calculated profile information is selected and outputted.

Further, the exposure amount adjustment section 55 can adjust the exposure amount in an imaging process after the second imaging process, based on the imaging result information of the second imaging process. For example, the exposure amount adjustment section 55 can variably set the first exposure period in the subsequent unit measurement process, based on the imaging result information of the second imaging process. In this case, the exposure amount adjustment section 55 can set the subsequent first exposure period based on the imaging result information of the second imaging process so that significant imaging result information can be obtained in the subsequent first imaging process. The significant imaging result information is, for example, information including an imaging result which is distinguishable from a noise. Further, the exposure amount adjustment section 55 can set an exposure period, of the exposure period which is set to obtain the significant imaging result information in the subsequent first imaging process, which has a relatively small exposure amount (for example, minimum), as the subsequent first exposure period.

In the profile measuring apparatus 1, the imaging process to adjust the exposure amount can be executed twice or more during one unit measurement period. Further, in the profile measuring apparatus 1, the imaging process to calculate the profile information can be executed twice or more during one unit measurement period.

Third Embodiment

Next, an explanation will be made about the third embodiment. The components, which are the same as or equivalent to those of the embodiments described above, are designated by the same reference numerals, any explanation of which will be simplified or omitted as appropriate in the third embodiment.

Figure 20:
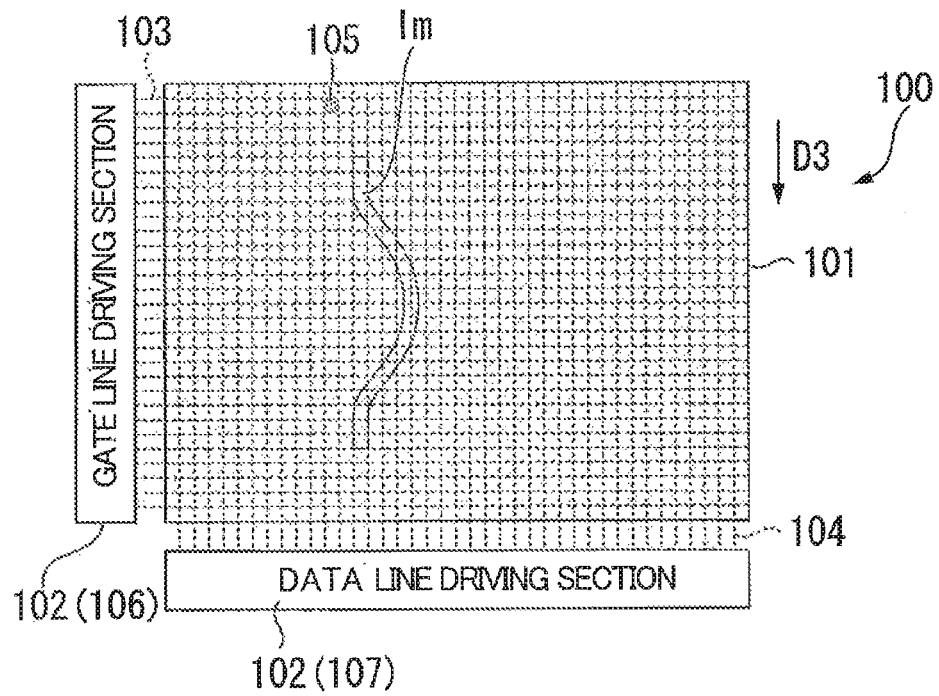
FIG. 20 is a schematic configuration diagram of an imaging device of a profile measuring apparatus according to the third embodiment.
Figure 21:
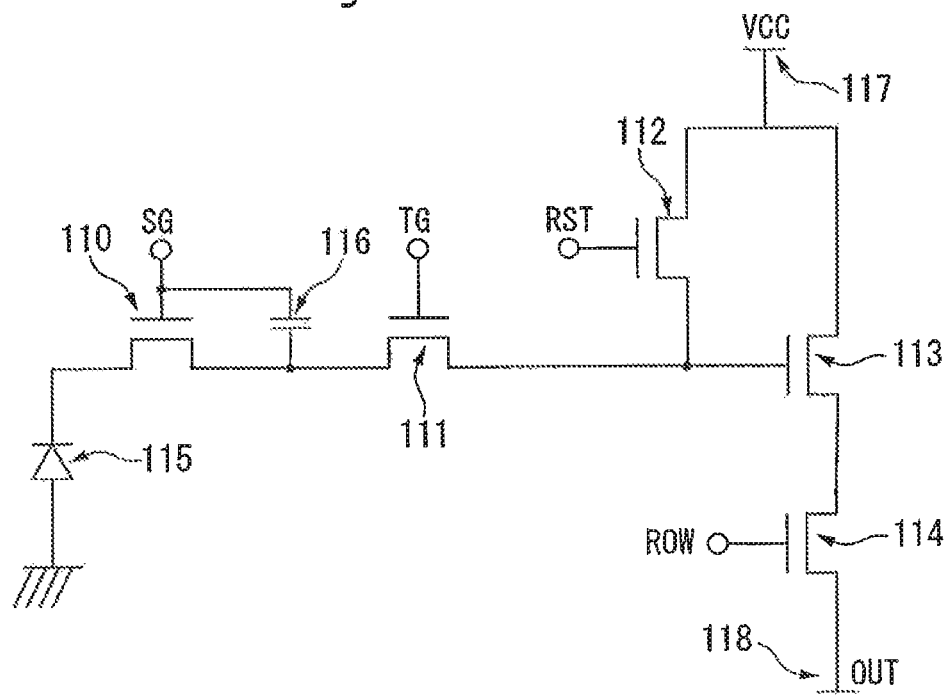
FIG. 21 is a circuit diagram showing a pixel of the imaging device of the profile measuring apparatus according to the third embodiment.

FIG. 20 is a schematic configuration diagram of an imaging device of a profile measuring apparatus according to the third embodiment. FIG. 21 is a circuit diagram showing a pixel of the imaging device of the profile measuring apparatus according to the third embodiment.

The profile measuring apparatus of this embodiment includes an imaging device 100 shown in FIG. 20. The imaging device 100 of this embodiment includes an imaging element 101 and an imaging element driving section 102. The imaging element 101 of this embodiment includes a CMOS image sensor which reads out the electric charge generated in the photodiode by a CMOS. A construction and operation of the CMOS image sensor is disclosed, for example, in U.S. Pat. Nos. 7,443,437 and 7,542,085, contents of which are incorporated herein by reference within a range of permission of law.

In this embodiment, the imaging element 101 includes a plurality of gate lines 103 extending in parallel to each other and a plurality of data lines 104 extending in parallel to each other and intersecting with the gate lines 103. In this embodiment, each area included in the gate lines 103 and the data lines 104 is an area corresponding to one pixel 105. The pixel 105 includes a plurality of switching elements (as will be described later on) as shown in FIG. 21. The gate line 103 is connected to gate electrodes of the switching elements of the pixel 105.

The imaging element 101 actually includes a plurality of series of gate lines. Each of the plurality of series of gate lines is connected to any one of the gate electrodes of the switching elements of the pixel 105. Electric signals which are different from one another are supplied to the plurality of series of gate lines, respectively. In FIG. 20, there is shown so that the plurality of series of gate lines are included in one gate line 103.

In this embodiment, a pattern image Im, on the imaging element 101, which is drawn on the object Q by the illumination light has a longitudinal direction D3 depending on the profile of the spot of the fine light L. In this embodiment, the imaging device 100 is arranged so that the longitudinal direction D3 intersects with (for example, is perpendicular to) each of the gate lines 103. The imaging device 100 can be arranged so that the longitudinal direction D3 is parallel to each of the gate lines 103.

In this embodiment, the imaging element driving section 102 is provided with a gate line driving section 106 and a data line driving section 107. An output terminal of the gate line driving section 106 is connected to each of the gate lines 103. The gate line driving section 106 supplies the electric signal to each of the gate lines 103. The gate line driving section 106 is capable of switching a conducting state and a non-conducting state of each of the switching elements (as will be described later on) of the pixel 105 by supplying the electric signal to each of the gate lines 103. Each of the gate lines 103 is connected to a plurality of pixels 105 aligned in a direction in which each of the gate lines 103 extends. The gate line driving section 106 selects any of the gate lines 103 to drive the plurality of pixels 105 connected to the selected gate line 103 collectively. Further, an output terminal of the data line driving section 107 is connected to each of the data lines 104. The data line driving section 107 supplies the electric signal to each of the data lines 104. The data line driving section 107 can read out the signal charge from each of the pixels 105 by supplying the electric signal to each of the data lines 104. In parallel, the data line driving section 107 can read out the signal from each of the pixels 105 connected to the gate line 103, which is selected by the gate line driving section 106.

As shown in FIG. 21, the pixel 105 of this embodiment includes switching elements such as a shutter transistor 110, a transfer transistor 111, a reset transistor 112, an amplification transistor 113, and a selection transistor 114; a photodiode 115; a capacitor 116; an input terminal 117; and an output terminal 118.

Here, an explanation will be made about a connection relation of respective components of the pixel 105. The first terminal of the photodiode 115 is connected to a ground line which is retained at a reference potential of the imaging element driving section 102. The second terminal of the photodiode 115 is connected to an input terminal (source electrode) of the shutter transistor 110. A control terminal (gate electrode) of the shutter transistor 110 is connected to the gate line driving section 106 via the gate line 103. An output terminal (drain electrode) of the shutter transistor 110 is connected to an input terminal of the transfer transistor 111. The first electrode of the capacitor 116 is connected to a node between the output terminal of the shutter transistor 110 and the input terminal of the transfer transistor 111. The second electrode of the capacitor 116 is connected to the control terminal of the shutter transistor 110. The control terminal of the transfer transistor 111 is connected to the gate line driving section 106 via the gate line 103. The output terminal of the transfer transistor 111 is connected to a control terminal of the amplification transistor 113. The input terminal 117 of the reset transistor 112 is connected to a node between the output terminal of the transfer transistor 111 and the control terminal of the amplification transistor 113. A control terminal of the reset transistor 112 is connected to the gate line driving section 106 via the gate line 103. The output terminal of the reset transistor 112 is connected to a power ware of the data line driving section 107 via the input terminal 117 of the pixel 105. Further, the input terminal 117 of the pixel 105 is connected to an input terminal of the amplification transistor 113. An output terminal of the amplification transistor 113 is connected to an input terminal of the selection transistor 114. A control terminal of the selection transistor 114 is connected to the gate line driving section 106 via the gate line 103. The output terminal 118 of the selection transistor 114 is connected to the output terminal 118 of the pixel 105. The output terminal 118 of the pixel 105 is connected to the data line driving section 107 via the data line 104.

Next, an explanation will be made about operation of each of the components of the pixel 105. The photodiode 115 generates the electric charge depending on the light amount of the light which comes into the pixel 105. A conducting state and a non-conducting state of the shutter transistor 110 are switched by supplying art electric signal SG from the gate line driving section 106 to the control terminal of the shutter transistor 110. A conducting state and a non-conducting state of the transfer transistor 111 are switched by supplying an electric signal TG from the gate line driving section 106 to the control terminal of the transfer transistor 111. A conducting state and a non-conducting state of the reset transistor 112 are switched by supplying an electric signal RST from the gate line driving section 105 to the control terminal of the reset transistor 112. A conducting state and a non-conducting state of the selection transistor 114 are switched by supplying an electric signal ROW from the gate line driving section 106 to the control terminal of the selection transistor 114.

In a case that the shutter transistor 110 is in the conducting state and the transfer transistor 111 is in the non-conducting state, the capacitor 116 is charged by the electric charge from the photodiode 115. In a case that the transfer transistor 111 is in the conducting state, the capacitor 116 is discharged. In a case that the transfer transistor 111 is in the conducting state and that the reset transistor 112 is in the non-conducting state, the electric charge accumulated in the capacitor 116 is allowed to flow to the control terminal of the amplification transistor 113 to raise a pressure of the control terminal of the amplification transistor 113. Accordingly, the amplification transistor 113 becomes in the conducting state. In a case that the transfer transistor 111 is in the conducting state and that the reset transistor 112 in the conducting state, the electric charge accumulated in the control terminal of the capacitor 116 or the amplification transistor 113 is allowed to flow through the power wire of the data line driving section 107 via the reset transistor 112 and the input terminal 117 of she pixel 105. Accordingly, the pressure of the control terminal is lowered and the amplification transistor 113 becomes in the non-conducting state. In a case that the amplification transistor 113 is in the conducting state, it is possible to flow the current depending on the electric potential of the control terminal. In a case that an electric signal VCC is supplied to the input terminal 117 of the pixel 105 from the data line driving section 107 and that the amplification transistor 113 and the selection transistor 114 are in the conducting state, the electric charge flowing through the amplification transistor 113 is allowed to flow to the data, line driving section 107 via the selection transistor 114 and the output terminal 118 of the pixel 105. Accordingly, the signal (electric charge) outputted from the output terminal 113 of the pixel 105 becomes a level depending on the electric potential of the control terminal of the amplification transistor 113. The electric potential of the control terminal of the amplification transistor 113 is a level depending on the electric charge flowing from the capacitor 116 to the control terminal of the amplification transistor 113. That is, the imaging element 101 outputs the signal at a level depending on the electric charge which is generated in the photodiode 115 and is accumulated in the capacitor 116.

The imaging element driving section 102 of this embodiment starts accumulation of the signal charge in a case that the shutter transistor 110 is in the conducting state by the gate line driving section 106 and that the transfer transistor 111 is in the non-conducting state by the gate line driving section 106. Accordingly, the imaging element driving section 102 starts the exposure process of the imaging process. In the imaging element driving section 102, it is possible to reset, for example, the electric charge, which does not contribute to the imaging process, from the capacitor 116 by making the transfer transistor 111 and the reset transistor 112 in the conducting state before the exposure process. Further, in the imaging element driving section 102, in a case that the shutter transistor 110 is in the non-conducting state by the gate line driving section 106 after the exposure process is started, the accumulation of the signal charge is stopped. Accordingly, the exposure process of the imaging process is completed by the imaging element driving section 102. In this embodiment, in the imaging element driving section 102, the exposure process can be started and completed substantially at the same time for each of the pixels 105 used in the imaging process. Further, in the imaging element driving section 102, it is possible to complete the exposure process with respect to a part of the pixels 105 in a state that the exposure process with respect to the other part of the pixels 105 is continued.

Figure 22:
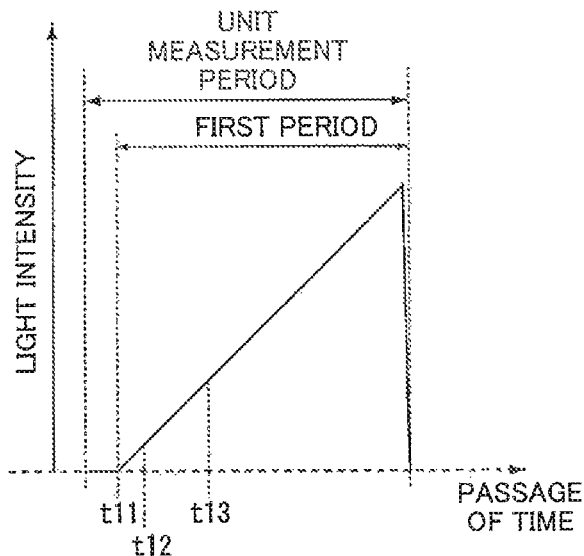
FIG. 22 is a diagram showing a method for adjusting an exposure amount according to the third embodiment.
Figure 23:
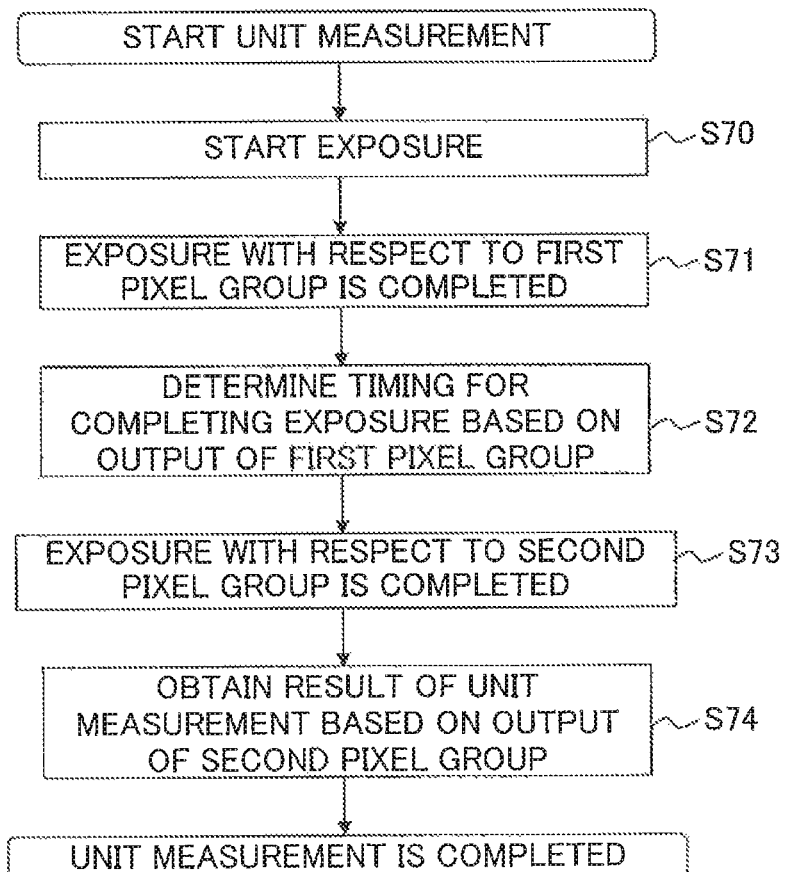
FIG. 23 is a flowchart schematically showing a method for measuring a profile according to the third embodiment.

An explanation will be made about a method for measuring a profile of this embodiment. FIG. 22 is a diagram showing a method for adjusting an exposure amount according to the third embodiment. FIG. 23 is a flowchart schematically showing the method for measuring the profile according to the third embodiment. In this embodiment, each of the processes of the method for measuring the profile as shown in FIG. 23 is executed by each of the sections of the profile measuring apparatus 1. The unit measurement process is executed a plurality of times by the profile measuring apparatus 1 of this embodiment to obtain the profile information of the object Q. In the following description, with respect to the controller 5, see FIGS. 6 to 8 etc., as appropriate.

The method for adjusting the exposure amount of this embodiment includes that the exposure with respect to the first pixel group and the second pixel group of the imaging element 101 is started; that the exposure with respect to the first pixel group is completed and the exposure with respect to the second pixel group is continued; that timing to complete the exposure with respect to the second pixel group is set based on the output from the first pixel group; and that the exposure with respect to the second pixel group is completed.

As shown in FIG. 22, the imaging device 100 of this embodiment starts the exposure with respect to the first pixel group and the second pixel group at the first time-point t11 of the unit measurement period (step S70 of FIG. 23). In the step S70 of this embodiment, the first pixel group includes a plurality of pixels (pixel line) connected to the same gate line 103. The second pixel group includes a plurality of pixels which do not overlap with the first pixel group. The first time-point t11 is set, for example, as a timing at which a period, during which the exposure amount is the smallest under the condition that the exposure time is set to be the shortest, is started. In this embodiment, the first time-point t11 is fixed to a point of time at which the increase of the light intensity of the illumination light is started.

The imaging device 100 of this embodiment completes the exposure with respect to the first pixel group at the second time-point t12 after the first time-point t11 (step S71 of FIG. 23). The signal charge is accumulated in the first pixel group in the first exposure period after the first time-point t11 and before the second time-point t12 (first exposure process). The imaging device 100 of this embodiment drives each of the gate lines 103 connected to the first pixel group successively at point of times after the second time-point t12; and reads out, to the data line driving section 107, the signal charge accumulated in each pixel 105 belonging to the first pixel group. The imaging device 100 supplies the imaging result information indicating the output (signal charge) from the first pixel group to the taken image obtaining section 56 (FIGS. 6 and 7). The imaging device 100 of this embodiment is controlled by the imaging control section 54 of the controller 5 to start the exposure in the step S70 and to complete the exposure in the step S71. The controller 5 controls the timing for starting exposure and the timing for completing exposure with respect to the first pixel group of the imaging device 9. Further, the imaging device 100 of this embodiment is controlled by the imaging control section 54 of the controller 5 to output the imaging result information by the first pixel group.

In this embodiment, the exposure amount adjustment section 55 obtains the imaging result information supplied from the imaging device 100 to the taken image obtaining section 56. The exposure amount adjustment section 55 sets the timing to complete the exposure with respect to the second pixel group based on the obtained imaging result information (step S72 of FIG. 23). In the step S72, the exposure amount adjustment section 55 sets the timing to complete the exposure with respect to the second pixel group by the method for adjusting the exposure amount as shown in FIGS. 7, 11, etc. The exposure amount adjustment section 55 supplies the exposure period information indicating the timing to complete the exposure with respect to the second, pixel group to the imaging control section 54. In this embodiment, the profile information obtaining section 58 does not perform the calculation of the profile information based on the imaging result information in the first imaging process.

As shown in FIG. 22, the imaging device 100 of this embodiment completes the exposure with respect to the second pixel group at the third time-point t13 after the second time-point t12 in the unit measurement period. The signal charge is accumulated in the second pixel group in the second exposure period after the second time-point t12 and before the third time-point t13 (second exposure process). The imaging device 100 of this embodiment is controlled by the imaging control section 54 to complete the exposure with respect to the second pixel group (step S73 of FIG. 23). The imaging control section 54 controls the imaging device 100 based on the exposure period information supplied from the exposure amount adjustment section 55 to control the timing to complete the exposure with respect to the second pixel group. The imaging device 100 is controlled by the imaging control section 54 of the controller 5 to output the imaging result information by the second pixel group.

In this embodiment, the taken image obtaining section 56 of the controller 5 obtains the imaging result information by the second pixel group from the imaging device 100. The profile information obtaining section 58 obtains the imaging result information by the second pixel group from the taken image obtaining section 56; and then obtains the result of the unit measurement based on this imaging result information (step S74 of FIG. 23). The profile measuring apparatus 1 repeatedly executes each unit measurement process as described above. Then, the profile information obtaining section 58 obtains the profile information by the method for obtaining the profile information described, for example, with reference to FIGS. 16A to 16C. In this embodiment, the exposure amount adjustment section 55 does not adjust the exposure amount based on the result of the second imaging process.

In the profile measuring apparatus 1 of this embodiment as described above, if is possible to expand the adjustable range of the exposure amount for the same reason as the above embodiments. Further, in the profile measuring apparatus 1 of this embodiment, the second exposure period belonging to the same unit measurement period as the first exposure period is set based on the result of the first imaging process. Thus, it is possible to reduce, for example, the error between the target value and the exposure amount in the second exposure period.

In the profile measuring apparatus 1 of this embodiment, the subsequent exposure period can be set, based on the result of the present imaging process, under the condition that the imaging process performed in the unit measurement period is one time, as described, for example, in the first embodiment. Further, in the profile measuring apparatus 1 of this embodiment, the second exposure process can be started after completion of the first exposure process, as described, for example, in the second embodiment.

In the profile measuring apparatus 1 of this embodiment, each process described in the second embodiment can be executed in both of a case in which the second exposure process is executed in parallel with the first exposure process and a case in which the second exposure process is started after completion of the first exposure process. For example, the profile measuring apparatus 1 is capable of calculating the profile information based on the imaging result information in the first imaging process; or is capable of setting the timing for starting the first exposure process in the subsequent unit measurement process based on the imaging result information in the second imaging process. Further, in the profile measuring apparatus 1, the first imaging process can be performed a plurality of times in one unit measurement process; or the second imaging process can be performed a plurality of times in one unit measurement process. In the profile measuring apparatus 1, in the case that the second exposure process is executed in parallel with the first exposure process in one unit measurement process, the subsequent first exposure process can be executed after completion of the second exposure process.

In the embodiments described above, the light-intensity time distribution shown in FIG. 10 etc. is distribution in which the light intensity increases substantially monotonically with respect to lapse of time. However, the light-intensity time distribution is not limited thereto. Here, an explanation will be made about examples of the light-intensity time distribution.

Figure 24A:
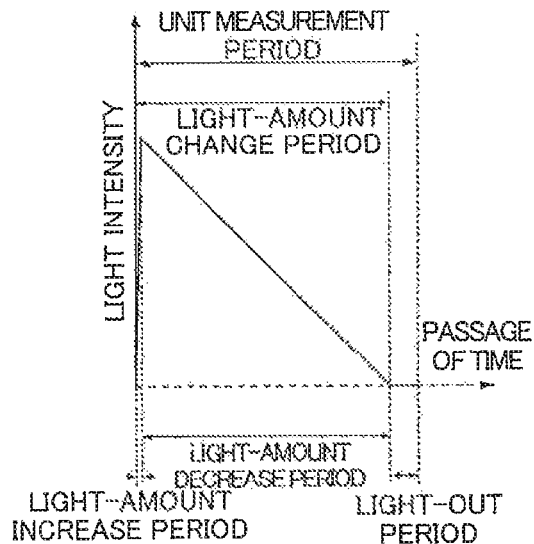
FIGS. 24A to 24F are diagrams each showing an example of light-intensity time distribution.

FIGS. 24A to 24F are diagrams each showing an example of the light-intensity time distribution. In the light-intensity time distribution of a modified example 1 as shown in FIG. 24A, the unit measurement period includes the light-amount increase period, the light-amount decrease period, and the light-out period. In the modified example 1, the light-amount increase period starts substantially at the same time as the unit measurement period. In the modified example 1, the light-amount increase period is a rising time elapsed after the supply of the current to the light source 11 is started; and the light-amount increase period can be substantially ignored. In the modified example 1, the light-amount decrease period is a period continued from the light-amount increase period; and the light intensity is monotonically decreased in the light-amount decrease period. For example, in the light-amount decrease period, the light source driving section 12 continues the supply of the current while decreasing the current supplied to the light source 11. In the modified example 1, the light-out period is a period continued from the light-amount decrease period. In the profile measuring apparatus 1, in a case that the unit measurement time includes the light-out period, temperature control, such as cooling of the light source 11 can be performed easily.

Figure 24B:
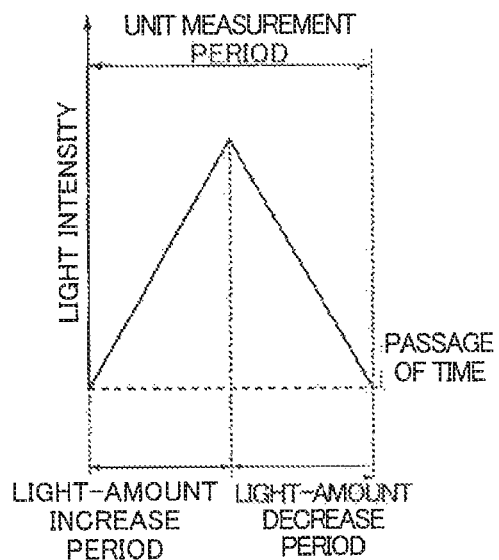

In the light-intensity time distribution of a modified example 2 as shown in FIG. 24B, the unit measurement period includes the light-amount increase period and the light-amount decrease period. In the modified example 2, the light source 11 is lighted for most of the unit measurement period except for the rising of the light intensity. Accordingly, it is possible that the unit measurement period does not include the light-out time substantially. In the modified example 2, the light-amount increase period has a length which is substantially the same as the light-amount decrease period. In the profile measuring apparatus 1, the first exposure process can be executed in the light-amount increase period; and then a period including at least a part of the light-amount decrease period can be set as the exposure period of the second exposure process based on the imaging result information in the first imaging process. The light-amount increase period can be longer or shorter than the light-amount decrease period. For example, in the profile measuring apparatus 1, in a case that the first exposure process and the second exposure process are executed, a period, of the light-amount increase period and the light-amount decrease period, which is started at an earlier timing can be shorter than a period, of the light-amount increase period and the light-amount decrease period, which is started at a later timing. In this case, in the profile measuring apparatus 1, it is possible that the first exposure process is executed during a period, of the light-amount increase period and the light-amount decrease period, which is relatively short; and that the second exposure process is executed during at least a part of a period, of the light-amount increase period and the light-amount decrease period, which is relatively long.

Figure 24C:
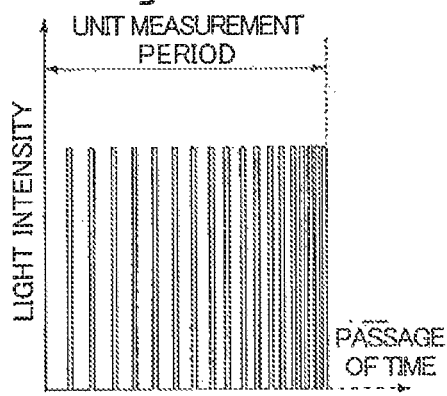

The light-intensity time distribution of a modified example 3 as shown in FIG. 24C is distribution in which the rising and the falling of the light intensity is repeated. In the modified example 3, amplitude of the pulse including one rising and one falling is set as a uniform value in the unit measurement period. A pulse interval in the modified example 3 is set to become short gradually after the start of the unit measurement period. A lighting time of the pulse of the modified example 3 is set as a uniform value in the unit measurement period. In the modified example 3, the light amount of the illumination light per unit time increases with lapse of time, as the number of pulses included in the unit time is gradually increased after the start of the unit measurement period.

Figure 24D:
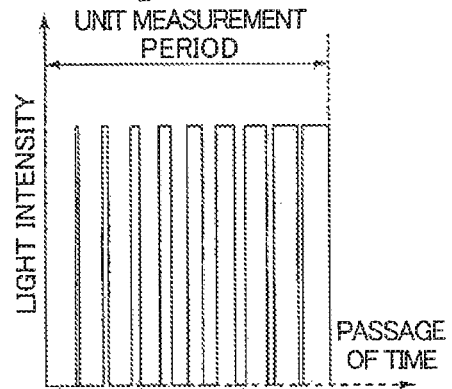

The light-intensity time distribution of a modified example 4 as shown in FIG. 24D is distribution in which the rising and the falling of the light intensity is repeated. In the modified example 4, the amplitude of the pulse including one rising and one falling is set as a uniform value in the unit measurement period. The pulse interval of the modified example 4 is set as a uniform value in the unit measurement period. The lighting time for each pulse of the modified example 4 is set to be increased with the lapse of time after the start of the unit measurement period. In the modified example 4, the light amount of the illumination light per unit time increases with the lapse of time, as the lighting time for each pulse is gradually increased after the start of the unit measurement period.

In the modified example 3 or the modified example 4, the light amount of the illumination light per unit time can temporally change by temporally changing at least one of the amplitude of the pulse, the pulse interval, and the lighting time for each pulse. In a case that the amplitude of the pulse is temporally changed, the light-intensity time distribution approaches distribution in which the light intensity continuously changes with the increase of frequency of the pulse, like the modified example 1 etc. Therefore, it is possible to handle the light-intensity time distribution as distribution in which the light intensity temporally changes in a substantially continuous state by setting a period of the pulse to be, for example, shorter than the exposure time.

Figure 24E:
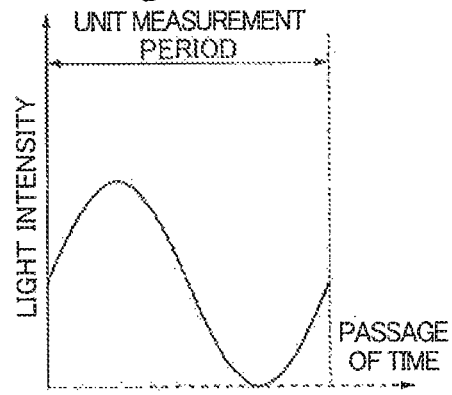

The light-intensity time distribution of a modified example 5 shown in FIG. 24E is distribution in which the light intensity temporally changes like a sine wave. In the modified example 5, a period of the sine wave is substantially the same as a length of the unit measurement period. In the sine wave of the modified example 5, a phase is 0 radian at a point of time at which the unit measurement period is started; and the phase is $2\pi$ radian at a point of time at which the unit measurement period is completed. In the profile measuring apparatus 1, for example, the first exposure process can be executed during a period after the unit measurement period is started and before the light intensity is at the maximum; and the second exposure process can be executed during a period after the light intensity is at the maximum and before the light intensity is at the minimum. The number of waves of the sine wave included in the unit measurement period cam be less than 1 or can be greater than 1. For example, the light-intensity time distribution in the unit measurement period can be a half-wave sine wave. Further, the phase of the sine wave at the point time at which the unit measurement period is started is set as an arbitrary value.

Figure 24F:
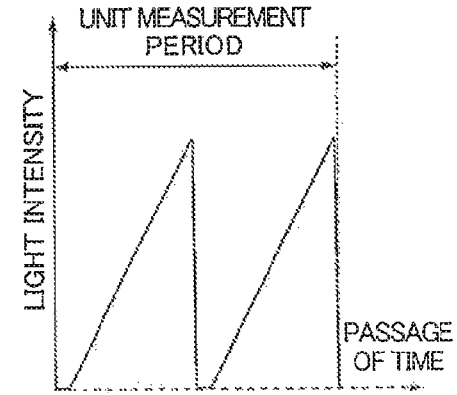

The light-intensity time distribution of the modified example 6 shown in FIG. 24F is distribution including a plurality of periods of triangular waves (two cycles in FIG. 24F). In the modified example 6, the plurality of periods of triangular waves have the same waveform. In the profile measuring apparatus 1, for example, the first exposure process can be executed during the first cycle of the triangular wave; and the second exposure process can be executed during the second cycle of the triangular wave.

The light-intensity time distribution is not limited to the above embodiments and the modified examples. For example, the light-intensity time distribution can be distribution in which the above embodiments and the modified examples are combined. Further, in the above embodiments, the light-intensity time distribution in each unit measurement period is common to the plurality of unit measurement periods. However, the light-intensity time distribution can vary among the plurality of unit measurement periods. For example, the light-intensity time distribution in the first unit measurement period can be different from the light-intensity time distribution in the second unit measurement period. In this case, the light amount of the illumination light in the first unit measurement period can be the same as or different from the light amount of the illumination light in the second unit measurement period.

Fourth Embodiment

Next, an explanation will be made about the fourth embodiment. The components, which are the same as or equivalent to those of the embodiments described above, are designated by the same reference numerals, any explanation of which will be simplified or omitted as appropriate in the fourth embodiment.

Figure 25A:
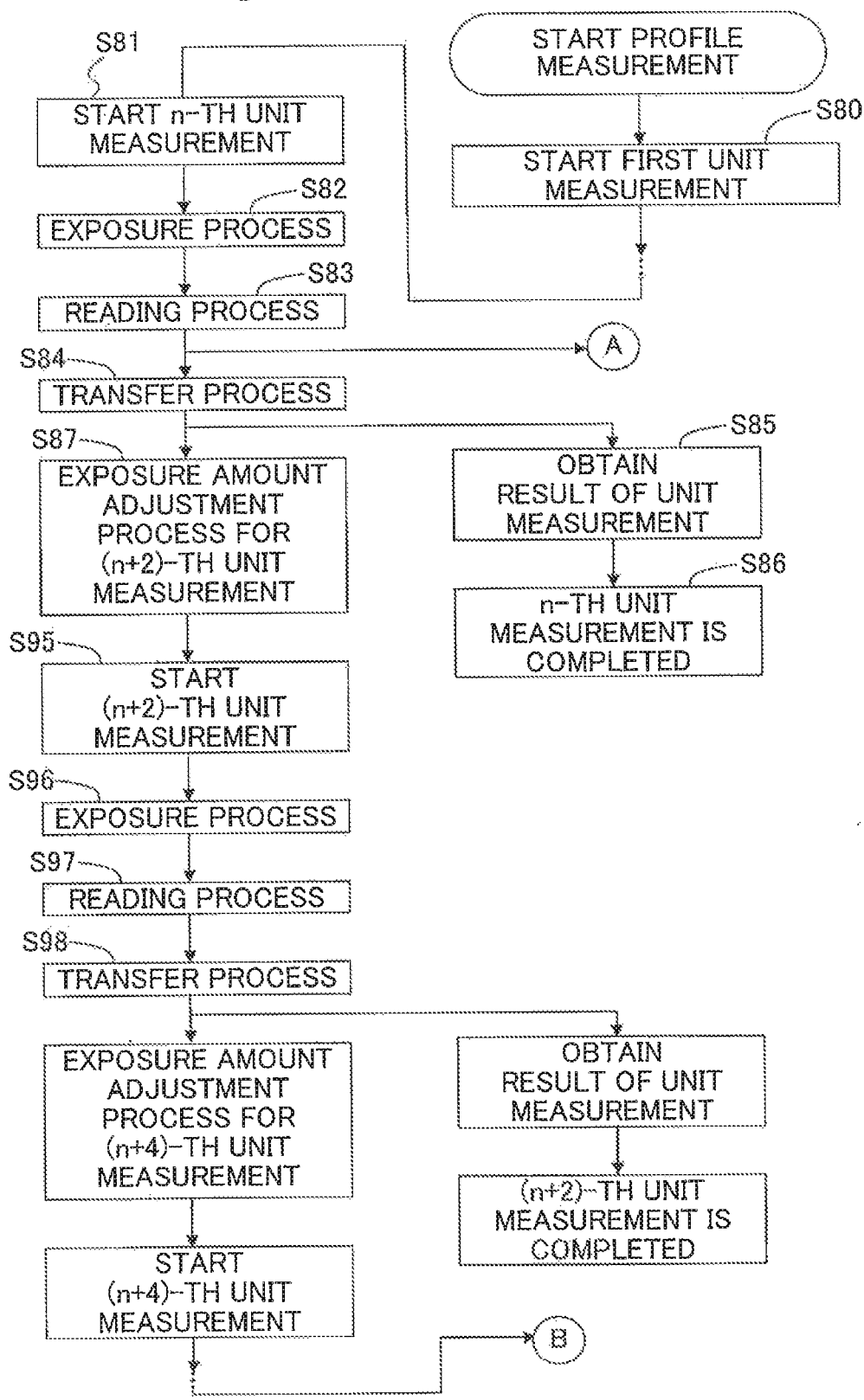
FIGS. 25A and 25B are a flowchart showing a method for measuring a profile according to the fourth embodiment.
Figure 25B:
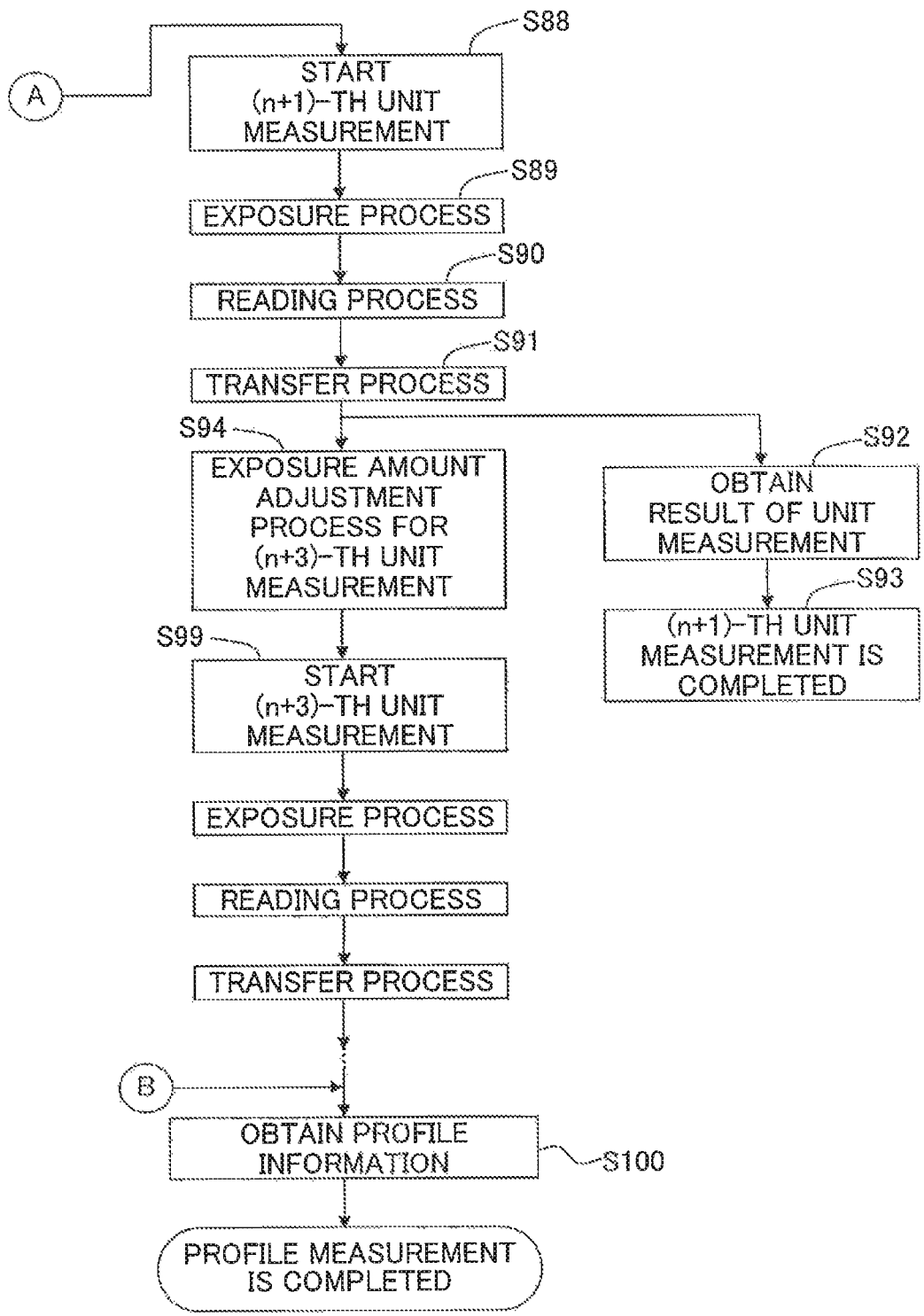

FIGS. 25A and 25B are a flowchart showing a method for measuring a profile according to the fourth embodiment. In this embodiment, each process of the method for measuring the profile as shown in FIGS. 25A and 25B are executed by each of the sections of the profile measuring apparatus 1 described in the above embodiments. In the profile measuring apparatus 1 of this embodiment, the unit measurement process is executed a plurality of times to obtain the profile information of the object Q. In this embodiment, the exposure process, the reading process, and the transfer process in each unit measurement process, the process for obtaining the result of the unit measurement process, and the exposure amount adjustment process are respectively executed in a similar manner to those of the above embodiments.

In this embodiment, the profile measuring apparatus 1 sets the exposure period of the second imaging process in the third unit measurement process performed after the second unit measurement process continued from the first unit measurement process, based on the imaging result information of the first imaging process in the first unit measurement process. Further, in this embodiment, the profile measuring apparatus 1 executes the second unit measurement process in parallel with at least a part of the processes in the first unit measurement process and the third unit measurement process.

As shown in FIGS. 25A and 25B, in the profile measuring apparatus 1 of this embodiment, the first unit measurement, process is started after the profile measurement is started (step S80). The unit measurement process is executed, for example, in a similar manner to those of the above embodiments. In the profile measuring apparatus 1 of this embodiment, the n-th unit measurement process is started after the step S80 (step S81). In this embodiment, n is integer of not less than 2.

In the profile measuring apparatus 1 of this embodiment, the exposure process is executed (step S82) after the n-th unit measurement process is started; and then the reading process (step S83) is executed. In the profile measuring apparatus 1, the transfer process with respect to the signal charge accumulated by the exposure process in the step S81 is executed (step S84) after the reading process of the step S83 is completed. The profile measuring apparatus 1 obtains the result of the n-th unit measurement process (step S85) after the transfer process of the step S84 is completed. Then, the n-th unit measurement process is completed (step S86). Further, after completion of the transfer process in the step S84, the profile measuring apparatus 1 executes the exposure amount adjustment process to adjust the exposure amount of the exposure process in the (n+2)-th unit measurement process based on the imaging result information by the imaging process in the n-th unit measurement process (step S87).

In the profile measuring apparatus 1 of this embodiment, (n+1)-th unit measurement process is started (step S88) after completion of the reading process in the step S83. After the (n+1)-th unit measurement process is started, the profile measuring apparatus 1 executes the exposure process (step S89) and then executes the reading process (step S90). In this embodiment, the exposure process (step S89) in the (n+1)-th unit measurement process is performed in parallel with the transfer process (step S84) in the n-th unit measurement process. Further, the reading process (step S90) in the (n+1)-th unit measurement process is started after the transfer process (step S84) in the n-th unit measurement process is completed.

In the profile measuring apparatus 1 of this embodiment, the transfer process with respect to the signal charge accumulated by the exposure process in the step S89 is executed (step S91) after the reading process in the step S90 is completed. After completion of the transfer process in the step S91, the profile measuring apparatus 1 obtains the result of the (n+1)-th unit measurement process (step S92) and completes the (n+1)-th unit measurement process (step S93). Further, after completion of the transfer process in the step S91, the profile measuring apparatus 1 executes the exposure amount adjustment process to adjust the exposure amount of the exposure process in the (n+3)-th unit measurement process based on the imaging result information by the imaging process in the (n+1)-th unit measurement process (step 99).

In the profile measuring apparatus 1 of this embodiment, the (n+2)-th unit measurement process is started (step S95) after completion of the reading process (step S90) of the (n+1)-th unit measurement process. After the (n+2)-th unit measurement process is started, the profile measuring apparatus 1 executes the exposure process (step S96) and then executes the reading process (step S97). The exposure process (step S96) of the (n+2)-th unit measurement process is started after completion of the reading process (step S90) of the (n+1)-th unit measurement process. The reading process (step S97) of the (n+2)-th unit measurement process is started after completion of the transfer process (step S91) of the (n+1)-th unit measurement process. After completion of the reading process (step S97) of the (n+2)-th unit measurement process, the profile measuring apparatus 1 executes the transfer process (step S98) and further starts the (n+3)-th unit measurement process (step S99). The profile measuring apparatus 1 obtains the profile information based on the results of the plurality of unit measurement processes (step S100) after each of the unit measurement processes is repeatedly executed in a similar manner.

As described above, the profile measuring apparatus 1 of this embodiment executes the exposure process (step S89) of the present (for example, (n+1)-th) unit measurement process in parallel with the transfer process (step S84) of the last (for example, n-th) unit measurement process. Further, the profile measuring apparatus 1 executes the exposure amount adjustment process (step S87) to adjust the exposure amount of the exposure process in the subsequent (for example, (n+2)-th) unit measurement process in parallel with the transfer process (step S91) of the present (for example, (n+1)-th unit measurement process.

In the profile measuring apparatus 1 of this embodiment as described above, it is possible to expand the adjustable range of the exposure amount for the same reason as the above embodiments. Further, in the profile measuring apparatus 1 of this embodiment, a part of the present unit measurement process is executed in parallel with a part of the last unit measurement process. Thus, the measurement can be performed efficiently. Further, in the profile measuring apparatus 1 of this embodiment, the exposure period of the exposure process in the subsequent unit measurement process after the present unit measurement process is set based on the imaging result information of the imaging process in the last unit measurement process. Thus, it becomes easy to secure a time required for the process to calculate the exposure period. Therefore, in the profile measuring apparatus 1, it is possible to suppress, for example, occurrence of situation in which the exposure adjustment process is not completed by a point of time at which the exposure process in the unit measurement process is started.

Fifth Embodiment

Next, an explanation will be made about the fifth embodiment. The components, which are the same as or equivalent to those of the embodiments described above, are designated by the same reference numerals, any explanation of which will be simplified or omitted as appropriate in the fifth embodiment.

Figure 26:
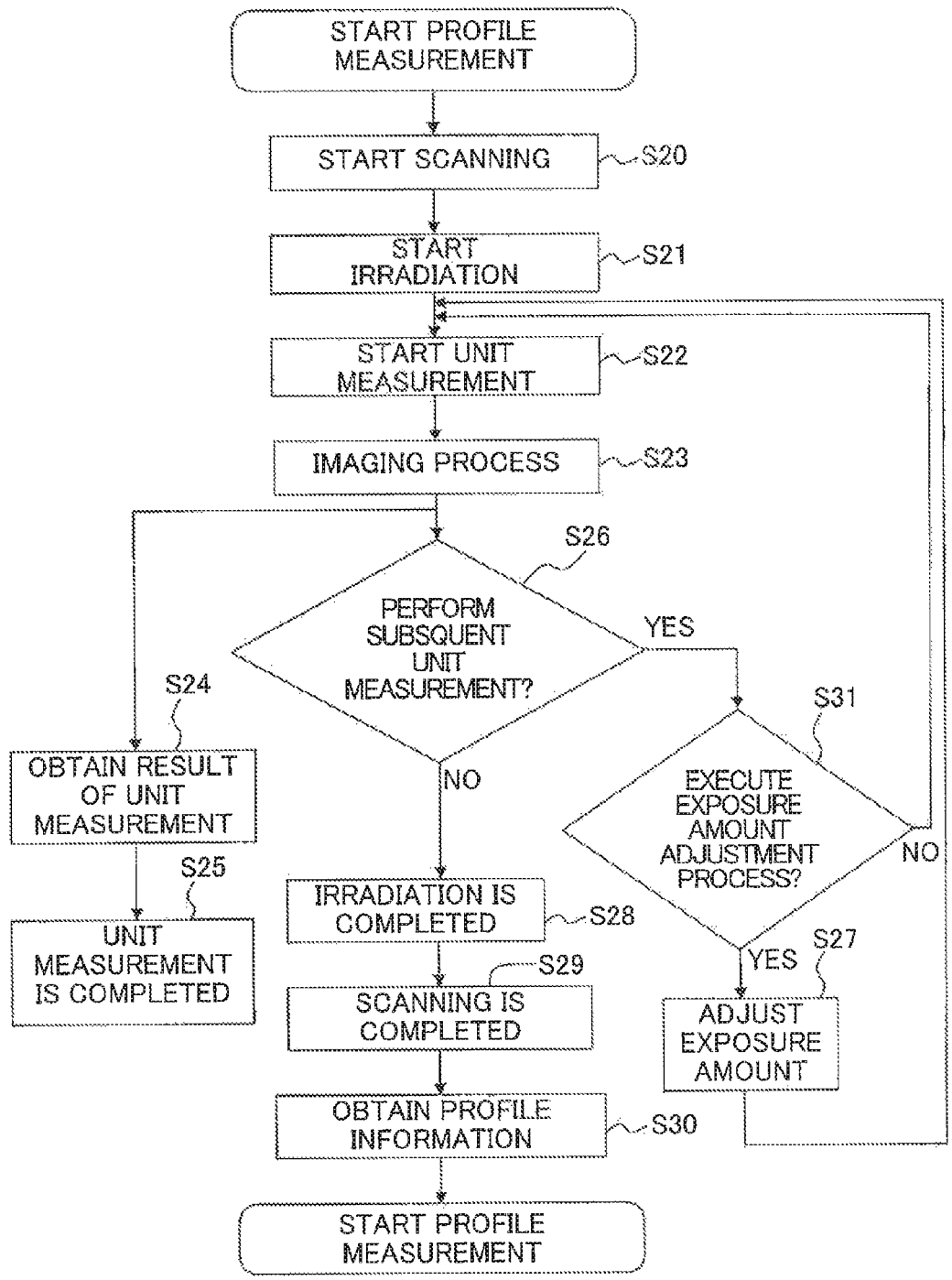
FIG. 26 is a flowchart showing a method for measuring a profile according to the fifth embodiment.

FIG. 26 is a flowchart showing a method for measuring a profile according to the fifth embodiment. In this embodiment, each process of the method for measuring the profile as shown in FIG. 26 is executed by each of the sections of the profile measuring apparatus 1 described in the above embodiments.

As shown in FIG. 26, the method for measuring the profile of this embodiment includes to judge as to whether or not the exposure adjustment process is executed (step S31). In the method for measuring the profile of this embodiment, the processes other than the process in the step S31 are the same as those of the method for measuring the profile in the first embodiment.

In the profile measuring apparatus 1 of this embodiment, the scanning process is started in the step S20 after the profile measurement is started; and the unit measurement process is started in the step S22 after the radiation process is started in the step S21. Further, in the profile measuring apparatus 1, it is judged in the step S26 as to whether or not the subsequent unit measurement process is executed after the imaging process is executed in the step S23. In the profile measuring apparatus 1, in a case that it is judged in the step S26 chat the subsequent unit measurement process is executed (step 326; Yes), it is judged as to whether or not the exposure adjustment process to adjust the exposure amount of the exposure process in the subsequent unit measurement process is executed (step S31).

The controller 5 of this embodiment includes an execution judgment section which judges as to whether or not the exposure amount adjustment process to adjust the exposure amount of the exposure process in the subsequent unit measurement process is executed. In this embodiment, the execution judgment section judges as to whether or not a comparison value indicating the magnitude relation between the last exposure amount and the reference value is within a pre-set acceptable range. In a case that the comparison value is within the acceptable range, the execution judgment section judges that the exposure amount adjustment process is not executed. In a case that the comparison value is not within the acceptable range, the execution judgment section judges that the exposure amount adjustment process is executed. The execution judgment section calculates an absolute value of the difference between the last exposure amount and the reference value as the comparison value, based on the imaging result information of the imaging process in the last unit measurement process. Then, the execution judgment section judges as to whether or not the difference between the last exposure amount and the reference value is within the acceptable range by judging as to whether or not the calculated comparison value is smaller than she pre-set value.

In a case that the execution judgment section judges in the step S31 that the exposure amount adjustment process is executed (step S31: Yes), the profile measuring apparatus 1 of this embodiment starts the subsequent unit measurement process after the exposure amount adjustment process is executed in the step S27. Further, in the profile measuring apparatus 1 of this embodiment, in a case that the execution judgment section judges in the step S31 than the exposure amount adjustment process is not executed (step S31: No), the subsequent unit measurement process is started without executing the exposure amount adjustment process.

In the profile measuring apparatus 1 of this embodiment as described above, it is possible to expand the adjustable range of the exposure amount for the same reason as the above embodiments. Further, in the profile measuring apparatus 1 of this embodiment, the exposure amount adjustment process is not executed in a case that it is judged that the exposure amount adjustment process to adjust the exposure amount of the subsequent unit measurement process is not executed. Thus, it is possible to reduce a load required for the exposure amount adjustment process.

The process to judge as to whether or not the exposure amount adjustment process is executed can be executed by the exposure amount adjustment section 55. For example, it is possible that the target value calculation section 63 calculates the ratio of the last exposure amount to the reference value as the comparison value; outputs a flag indicating that the exposure amount adjustment process is not executed in a case that the comparison value is within the acceptable range; and calculates the target value based on the comparison value in a case that the comparison value is not within the acceptable range. Further, the profile measuring apparatus 1 can judge as to whether or not the exposure amount adjustment process is executed depending on a condition other than the magnitude relation between the last exposure amount and the reference value. For example, the profile measuring apparatus 1 can judge as to whether or not the exposure amount adjustment process is executed based on the number of times of the unit measurement processes executed continuously without executing the exposure amount adjustment process.

Sixth Embodiment

Next, an explanation will be made about the sixth embodiment. The components, which are the same as or equivalent to those of the embodiments described above, are designated by the same reference numerals, any explanation of which will be simplified or omitted as appropriate in the sixth embodiment.

Figure 27A:
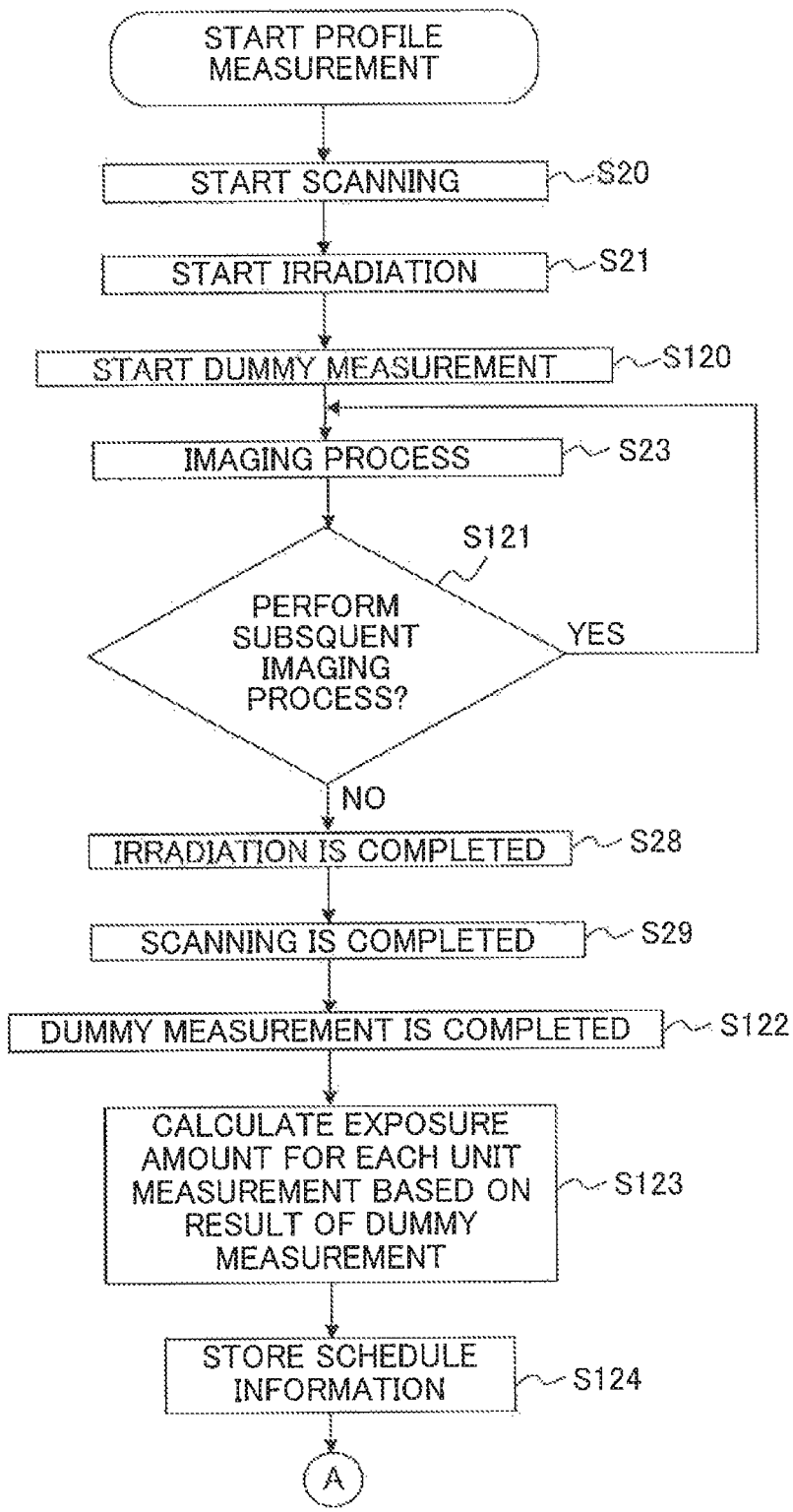
FIGS. 27A, 27B and 27C are a flowchart showing a method for measuring a profile according to the sixth embodiment.
Figure 27B:
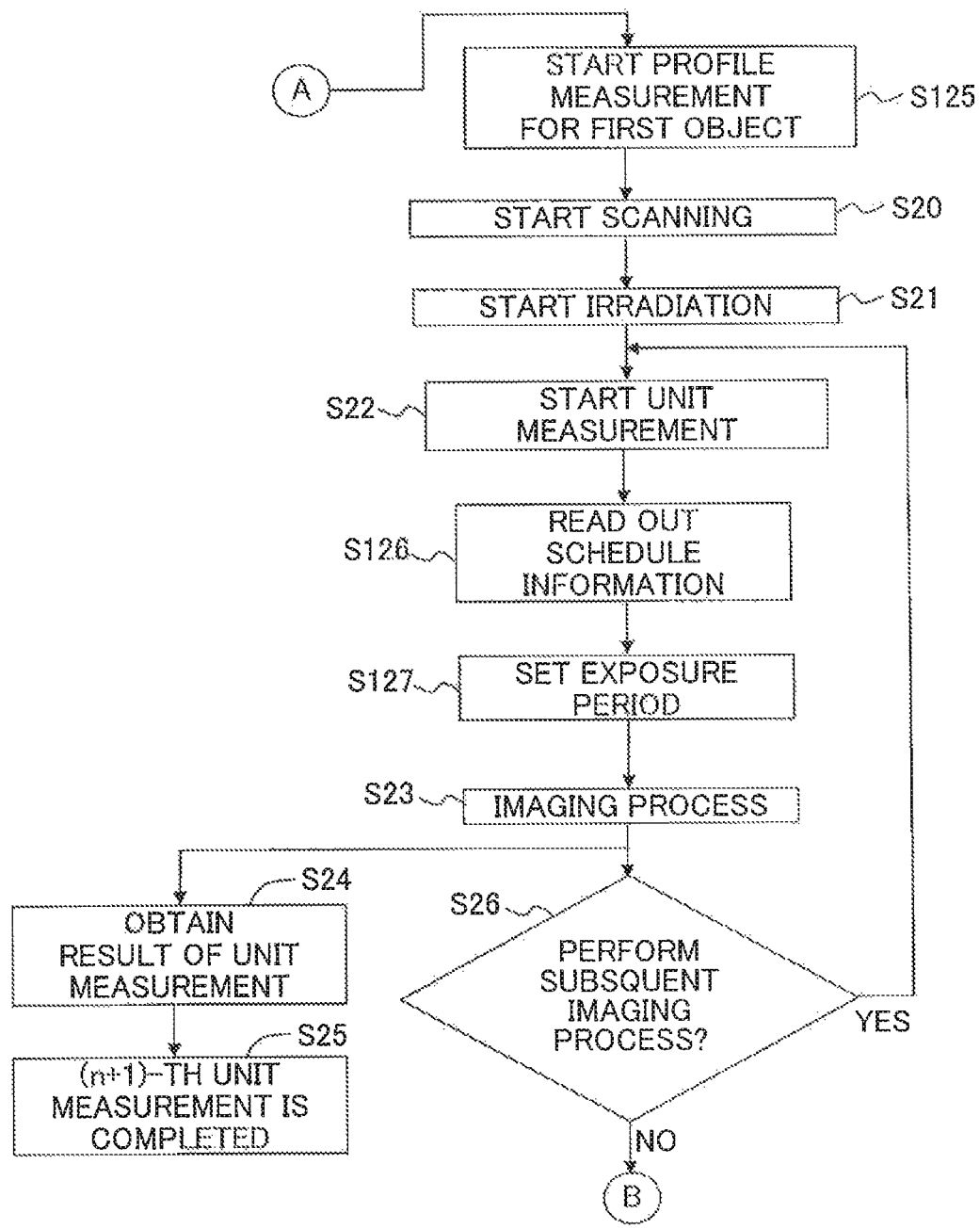
Figure 27C:
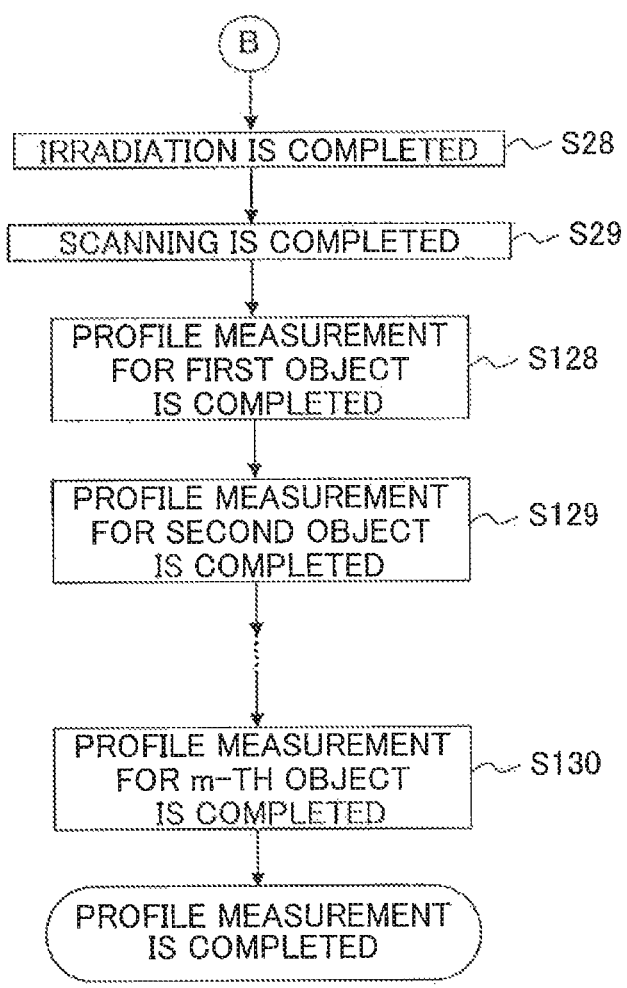

FIGS. 27A, 27B and 27C are a flowchart showing a method for measuring a profile according to the sixth embodiment. In this embodiment, each process of the method for measuring the profile as shown in FIGS. 27A, 27B and 27C is executed by each of the sections of the profile measuring apparatus 1 described in the above embodiments.

By the way, in a case that the measurement for an industrial product and the like is performed, a plurality of objects, which have substantially the same profile and/or substantially the same material for each portion, are measured successively in some cases. The profile measuring apparatus 1 of this embodiment takes the image of the object while scanning a dummy object, which corresponds to the object, by the illumination light. Then, schedule information indicating respective exposure periods of the plurality of unit measurement processes is calculated based on the imaging result, and then is stored in the profile measuring apparatus 1. For example, in a case that the object is measured, the profile measuring apparatus 1 of this embodiment reads out the schedule information to set the exposure period in each unit measurement process as a period indicated by the schedule information.

In the profile measuring apparatus 1 of this embodiment, the profile measurement is started in a state that the dummy object is arranged in a measurement area of the stage device 2 etc. As shown in FIGS. 27A, 27B and 27C, the profile measuring apparatus 1 of this embodiment starts the scanning process in the step S20 after the profile measurement is started. The profile measuring apparatus 1 starts a dummy measurement process (step S120) after the radiation process is started in the step S21. After the dummy measurement process is started and further after the imaging process is executed in the step S23, the profile measuring apparatus 1 of this embodiment judges as to whether or not the subsequent imaging process is executed (step S121). In this embodiment, the profile measuring apparatus 1 judges as to whether or not the subsequent imaging process is executed in a similar manner to the judgment, described in the first embodiment, as to whether or not the subsequent unit measurement process is executed. In a case that it is judged in the step S121 that the subsequent imaging process is executed (step S121: Yes), the profile measuring apparatus 1 executes the imaging process. In a case that it is judged in the step S121 that the subsequent imaging process is not executed (step S121: No), the profile measuring apparatus 1 completes the irradiation process in the step S28. Then, the profile measuring apparatus 1 completes the dummy measurement process (step S122) after the scanning process is completed in the step S29. The imaging result information indicating respective results of the plurality of imaging processes in the dummy measurement process is supplied from the imaging device 9 to the taken image obtaining section 56.

The profile measuring apparatus 1 of this embodiment calculates the exposure amount of each unit measurement process (step S123), based on the results of the imaging processes in the dummy measurement process, after completion of the dummy measurement process. In this embodiment, the exposure amount adjustment section 55 obtains the imaging result information of each imaging process in the dummy measurement process from the taken image obtaining section 56. The exposure amount adjustment section 55 calculates the exposure period of the exposure process in the unit measurement process corresponding to each imaging process, based on the imaging result information of each imaging process. In this embodiment, the unit measurement process corresponding to the imaging process of the dummy measurement process is a unit measurement process for an area on the object corresponding to an area on the dummy object to which the illumination light is radiated in the imaging process of the dummy measurement process.

The profile measuring apparatus 1 of this embodiment stores in the setting information storing section 51, the schedule information including the exposure period information of each of the unit measurement processes included in the profile measurement with respect to one object, based on the result calculated in the step S123 (step S124).

In this embodiment, the profile measurement with respect to the object which is the same as or equivalent to the dummy object is started in a state that the dummy object is removed from the measurement area of the stage device 2 etc. and that the object is disposed on tire measurement area. In this embodiment, a relative position of the object to the measurement area is controlled.

In the profile measuring apparatus 1 of this embodiment, the scanning process is started in the step S20 after the profile measurement for the first object is started (S125), and then the radiation process is started in the step S21. The profile measuring apparatus 1 starts the unit measurement process (step S22) after the scanning process and the radiation process are started. The profile measuring apparatus 1 of this embodiment obtains the schedule information stored in the setting information storing section 51 (step S126) after the unit measurement process is started. The profile measuring apparatus 1 sets the exposure period of the imaging process in the present unit measurement process (step S127) based on the exposure period information of the schedule information obtained in the step S126, which corresponds to the present unit measurement process. The profile measuring apparatus 1 executes the imaging process in the step S23 after the exposure period is set.

In the profile measuring apparatus 1 of this embodiment, the unit measurement process is completed in the step S25 after the result of the unit measurement is obtained in the step S24. Further, the profile measuring apparatus 1 judges, in the step S26, as to whether or not the subsequent unit measurement process is executed after the imaging process is executed in the step S23. In a case that it is judged in the step S26 that the subsequent unit measurement process is executed (step S26: Yes), the profile measuring apparatus 1 executes the unit measurement process repeatedly. Further, in a case that it is judged in the step S26 that the subsequent unit measurement process is not executed (step S26: No), the profile measuring apparatus 1 completes the irradiation process in the step S23; and completes the scanning process in the step S29. After the irradiation process and the scanning process in the profile measurement for the first object are completed, the profile measuring apparatus 1 obtains the profile information of the first object; and the profile measurement for the first object is completed (step S128).

After the profile measurement for the first object is completed, the profile measuring apparatus 1 of this embodiment starts the profile measurement for the second object (step S129) in a state that the first object is removed from the measurement area and that the second object is disposed on the measurement area. The profile measuring apparatus 1 executes the profile measurement of the second object in a similar manner to the profile measurement for the first object; and repeats the profile measurement for each object in a similar manner. After the profile measurement for the m-th object is completed (m is integer of not less than 2), the profile measuring apparatus 1 completes a series of profile measurements with respect to the plurality of objects.

In the profile measuring apparatus 1 of this embodiment as described above, it is possible to expand the adjustable range of the exposure amount for the same reason as the above embodiments. Further, in the profile measuring apparatus 1, the exposure period information of the present exposure process is obtained from the schedule information before the imaging process in the present unit measurement process. Thus, for example, it is possible to reduce a load required for calculating the exposure period during the unit measurement process.

In the profile measuring apparatus 1, instead of performing the dummy measurement with respect to the dummy object, it is possible that the profile measurement with respect to the first object is executed, for example, in a similar manner to that described in the first embodiment and that the information including the exposure period information calculated at the time of the profile measurement for the first object is used as the schedule information. In the profile measuring apparatus 1, it is possible chat the profile measurement with respect to the second object is executed subsequently to the profile measurement with respect to the first object; or it is possible that the profile measurement with respect to the second object is executed after arbitrary time is elapsed after the profile measurement with respect to the first object was completed. Further, in the profile measuring apparatus 1, it is possible that a positron of the object on the measurement area is detected and the unit measurement process is started in a state that the object and the optical probe 3 are in a predetermined relative position. Further, in the profile measuring apparatus 1, it is possible that the imaging process is executed repeatedly after the scanning process and the irradiation process are started and before the unit measurement process is started; it is judged that as to whether or not the optical probe 3 and the object are in the predetermined relative position based on the imaging result information; and that the unit measurement process is started based on the judgment result.

Seventh Embodiment

Next, an explanation will be made about the seventh embodiment. The components, which are the same as or equivalent to those of the embodiments described above, are designated by the same reference numerals, any explanation of which will be simplified or omitted as appropriate in the seventh embodiment.

Figure 28:
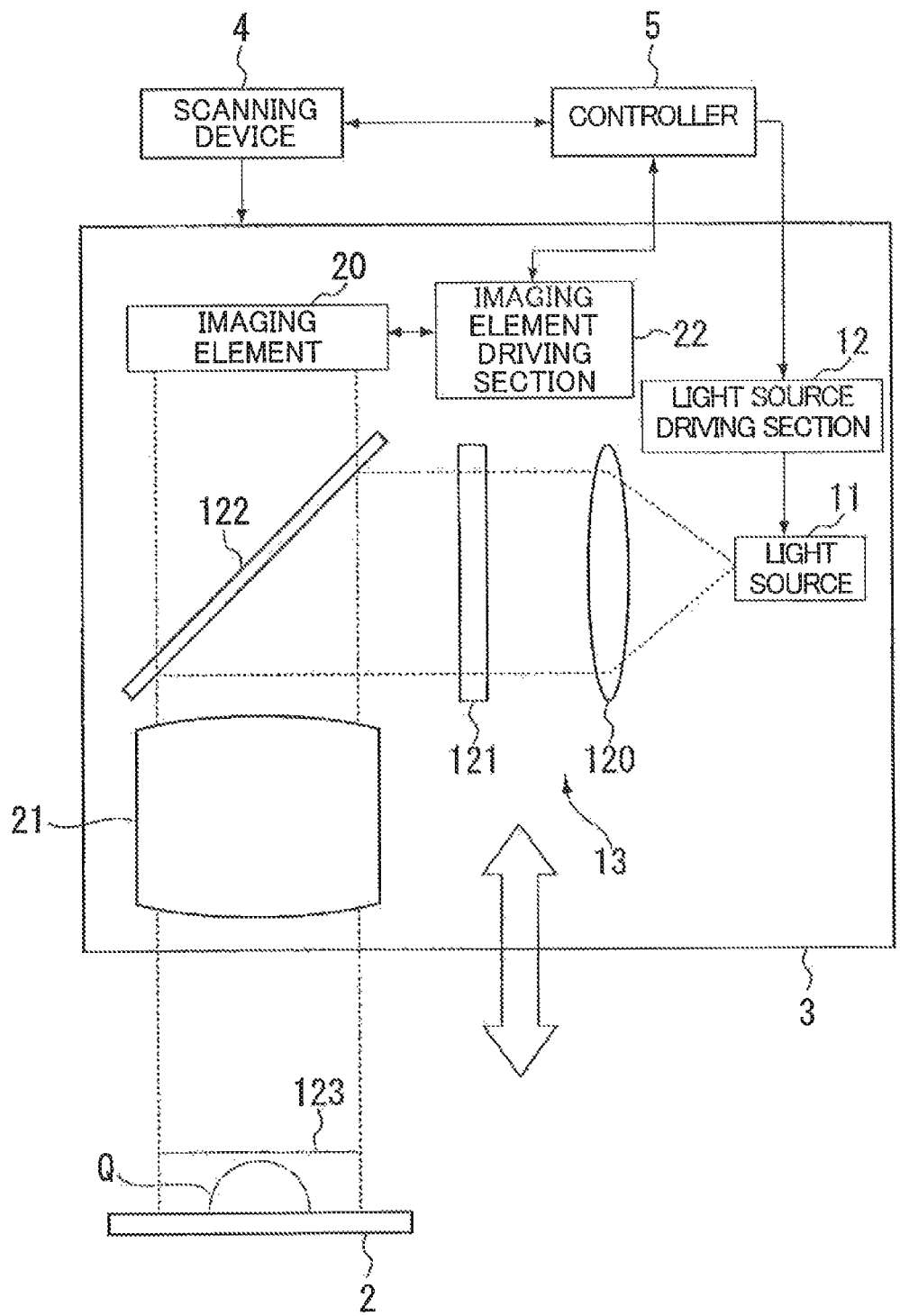
FIG. 28 shows a construction of a profile measuring apparatus according to the seventh embodiment.

FIG. 28 shows a construction of a profile measuring apparatus according to the seventh embodiment. The profile measuring apparatus 1 of this embodiment shown in FIG. 28 is capable of obtaining the profile information with respect to the profile of the object Q by using SFF (Shape From Focus) method.

The profile measuring apparatus 1 of this embodiment includes the stage device 2, the optical probe 3, the scanning device 4, and the controller 5. The optical probe 3 of this embodiment includes the light source 11, the light source driving section 12, the illumination optical system 13, the imaging optical system 21, the imaging element 20, and the imaging element driving section 22.

The light source 11 of this embodiment includes the light-emitting diode (LED). The light source 11 is driven by the light source driving section 12 to emit the light. The illumination optical system 13 of this embodiment includes a condenser lens 120, a projection pattern 121, and a hall mirror 122. The condenser lens 120 makes the light emitted from the light source 11 parallel to each other. The projection pattern 121 is arranged at a position at which the light emitted from the light source 11 and passing through the condenser lens 120 comes into the projection pattern 121. The projection pattern 121 is, for example, a photomask and includes a light transmission portion through which the light from the condenser lens 120 passes and a light-shielding portion which shields the light from the condenser lens 120. Each of the light transmission portion and the light-shielding portion is formed as a predetermined pattern. The light, of the light which comes into the projection pattern 121 from the condenser lens 120, which passes through the projection pattern 121, becomes a pattern light which has the spatial light-intensity distribution corresponding to the predetermined pattern. The half mirror 122 is arranged at a position at which the pattern light emitted from the projection pattern 121 comes into the half mirror 122. At least of a part of the pattern light, which comes into the half mirror 122 from the projection pattern 121, is reflected at the half mirror 122.

The imaging optical system 21 is arranged at a position at which the pattern light reflected at the half mirror 122 comes into the imaging optical system 21. The imaging optical system 21 forms an image of the projection pattern 121 on a conjugate plate 123 which is conjugate with the projection pattern 121. The pattern light emitted from the imaging optical system 21 is irradiated to the object Q on the stage device 2. The pattern light radiated to the object Q is reflected and scattered on the surface of the object Q; and at least a part of the pattern light (measuring light) comes into the imaging optical system 21. The measuring light which comes into the imaging optical system 21 from the object Q comes into the half mirror 122 after passing through the imaging optical system 21. At least a part of the light, which comes into the half mirror 122 from the imaging optical system 21, comes into the imaging element 20 after passing through the half mirror 122. The imaging element 20 is disposed on a position which is conjugate with respect to the conjugate plate 123. That is, the light emitted from one point on the conjugate plate 123 is collected on substantially one point of the light-receiving surface of the imaging element 20.

The scanning device 4 of this embodiment changes the relative position of the optical probe 3 to the stage device 2. The scanning device 4 moves the conjugate plate 123 with respect to the object Q on the stage device 2 by moving the optical probe 3 with respect to the stage device 2. In this embodiment, the scanning device 4 moves (scans) the conjugate plate 123 in a direction intersecting with the conjugate plate 123 by moving the optical probe 3. By doing so, a position of a line, of the conjugate plate 123, intersecting with the object Q changes on the object Q. The light, of the pattern light radiated from the imaging optical system 21 to the object Q, which is reflected at each point on the line on which the conjugate plate 123 intersects with the object Q, is collected on substantially one point of the light-receiving surface of the imaging element 20. That is, the imaging optical system 21 forms, on the light-receiving surface of the imaging element 20, an image of the pattern which is drawn, on the line on which the surface of the object Q intersects with the conjugate plate 123, by the pattern light radiated from the imaging optical system 21.

In the profile measuring apparatus 1 of this embodiment, the pattern light is radiated to the object Q via the illumination optical system 13 and the imaging optical system 21 in the irradiation process. The profile measuring apparatus 1 changes the position of the line on which the conjugate plate 123 intersects with the object Q in the scanning process. In the profile measuring apparatus 1, the (controller 5 controls the imaging element driving section 22 to make the imaging element 20 execute the imaging process in a state that the irradiation process and the scanning process are performed. The controller 5 detects an image of the line on which the conjugate plate 123 intersects with the object Q based on the taken image by the imaging process. Accordingly, the profile measuring apparatus 1 obtains a part of the position information on the surface of the object Q. The profile measuring apparatus 1 executes such a unit measurement process repeatedly while changing the relative position of the conjugate plate 123 to the object Q. As described in the above embodiments, the profile measuring apparatus 1 sets the exposure period of the imaging process in the subsequent unit measurement process based on the imaging result information of the imaging process in the present unit measurement process. The profile measuring apparatus 1 obtains the profile information indicating the profile of the object by associating the position of the surface of the object Q detected by each unit measurement process with the relative position of the conjugate plate 123 to the object Q in each unit measurement process. In the profile measuring apparatus 1 of this embodiment as described above, it is possible to expand the adjustable range of the exposure amount for the same reason as the above embodiments.

Eighth Embodiment

Next, an explanation will be made about the eighth embodiment. The components, which are the same as or equivalent to those of the embodiments described above, are designated by the same reference numerals, any explanation of which will be simplified or omitted as appropriate in the eighth embodiment.

Figure 29:
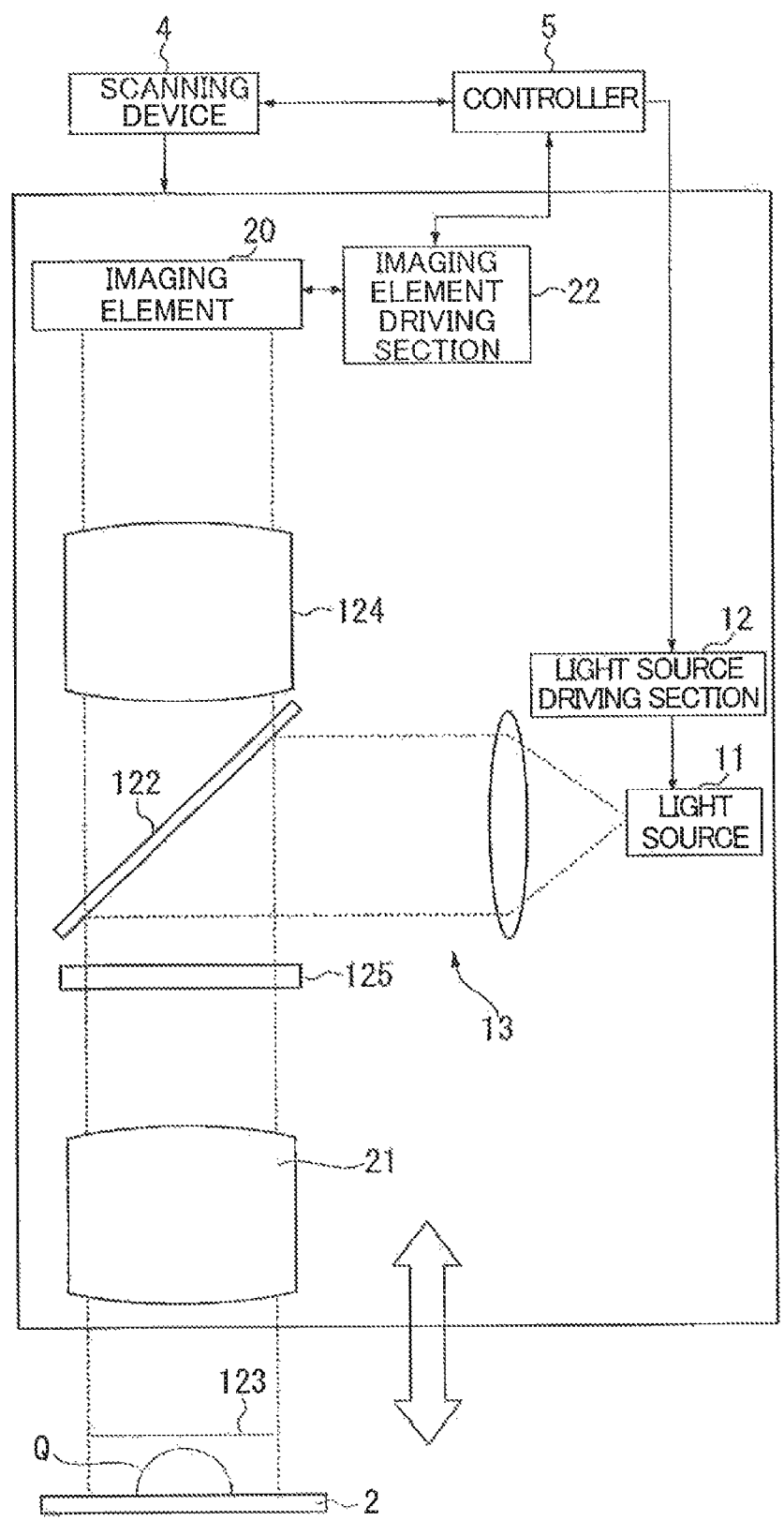
FIG. 29 shows a construction of a profile measuring apparatus according to the eighth embodiment.

FIG. 29 shows a construction of a profile measuring apparatus according to the eighth embodiment. The profile measuring apparatus 1 of this embodiment as shown in FIG. 29 is capable of obtaining the profile information with respect to the profile of the object Q by using a confocal method.

The profile measuring apparatus 1 of this embodiment includes the stage device 2, the optical probe 3, the scanning device 4, and the controller 5. The optical probe 3 of this embodiment includes the light source 11, the light source driving section 12, the illumination optical system 13, the imaging optical system 21, a relay optical system 124, the imaging element 20, and the imaging element driving section 22.

The light source 11 of this embodiment includes the light-emitting diode (LED). The light source 11 is driven by the light source driving section 12 to emit the light. The illumination optical system 13 of this embodiment includes the condenser lens 120, the half mirror 122, and a diaphragm member 125. The condenser lens 120 makes the light emitted from the light source 11 parallel to each other. The half mirror 122 is arranged at a position at which the light emitted from the light source 11 and passing through the condenser lens 120 comes into the half mirror 122. At least of a part of the light, which comes into the half mirror 122 from the condenser lens 120, is reflected at the half mirror 122. The diaphragm member 125 is disposed on a position at which the light passing through the condenser lens 120 and reflected at the half mirror 122 comes into the diaphragm member 125. The diaphragm member 125 is a disk-shaped member in which openings through which the light is allowed to pass are partially provided. The diaphragm member 125 is, for example, a so-called Nipkow disk in which pinholes (openings) are regularly arranged. In this embodiment, the diaphragm member 125 is rotationally driven around an axis parallel to the optical axis of the imaging optical system 21 by an unillustrated driving section.

The imaging optical system 21 is disposed on a position at which the light passing through the opening(s) of the diaphragm member 125 comes into the imaging optical system 21. The imaging optical system 21 forms an image of the diaphragm member 125 on the conjugate plate 123 which is conjugate with the diaphragm member 125. The pattern light emitted from the imaging optical system 21 is irradiated to the object Q on the stage device 2. The pattern light irradiated to the object Q is reflected and scattered on the surface of the object Q and at least a part of the pattern light (measuring light) comes into the imaging optical system 21. The measuring light, which comes into the imaging optical system 21 from the object Q, comes into the diaphragm member 125 after passing through the imaging optical system 21. Since the conjugate plate 123 is arranged at a position conjugate with the diaphragm member 125, the light, of the illumination light coming into the object Q, which is reflected at each point on the line on which the conjugate plate 123 intersects with the object Q, passes through the imaging optical system 21; is collected on substantially one point of the diaphragm member 125; and passes through the opening (s). The light, which is reflected at the object Q to pass through the imaging optical system 21 and the opening (s) of the diaphragm member 125, comes into the half mirror 122; and at least of a part of the light passes through the half mirror 122.

The relay optical system 124 is disposed on a position at which the light, which is reflected at the object Q to pass through the half mirror 122, comes into the relay optical system 124. The relay optical system 124 forms a plane which is conjugate with the diaphragm member 125 on the light-receiving surface of the imaging element 20. That is, the light which is reflected at each point on the line on which the conjugate plate 123 intersects with the object Q is collected on substantially one point on the diaphragm member 125; passes through the relay optical system 124; and is collected on substantially one point of the light-receiving surface of the imaging element 20.

The scanning device 4 of this embodiment moves (scans) the conjugate plate 123 in a direction intersecting with the conjugate plate 123 by changing the relative position of the optical probe 3 to the stage device 2, in a similar manner to that described in the seventh embodiment. By doing so, the position of the line, of the conjugate plate 123, intersecting with the object Q changes on the object Q.

In the profile measuring apparatus 1 of this embodiment, the pattern light is irradiated to the object Q via the illumination optical system 13 and the imaging optical system 21 in the irradiation process. The profile measuring apparatus 1 changes the position of the line on which the conjugate plate 123 intersects with the object Q in the scanning process. In the profile measuring apparatus 1, the controller 5 controls the imaging element driving section 22 to make the imaging element 20 execute the imaging process in a state that the irradiation process and the scanning process are performed. The controller 5 detects the image of the line on which the conjugate plate 123 intersects with the object Q based on the taken image by the imaging process. Accordingly, the profile measuring apparatus 1 obtains a part of the position information on the surface of the object Q. The profile measuring apparatus 1 executes such a unit measurement process repeatedly while changing the relative position of the conjugate plate 123 to the object Q. As described in the above embodiments, the profile measuring apparatus 1 sets the exposure period of the imaging process in the subsequent unit measurement process based on the imaging result information of the imaging process in the present unit measurement process. The profile measuring apparatus 1 obtains the profile information indicating the profile of the object by associating the position of the surface of the object Q detected by each unit measurement process with the relative position of the conjugate plate 123 to the object Q in each unit measurement process. In the profile measuring apparatus 1 of this embodiment as described above, it is possible to expand the adjustable range of the exposure amount for the same reason as the above embodiments.

Structure Manufacturing System

Next, an explanation will be made about a structure manufacturing system and a method for manufacturing a structure.

Figure 30:
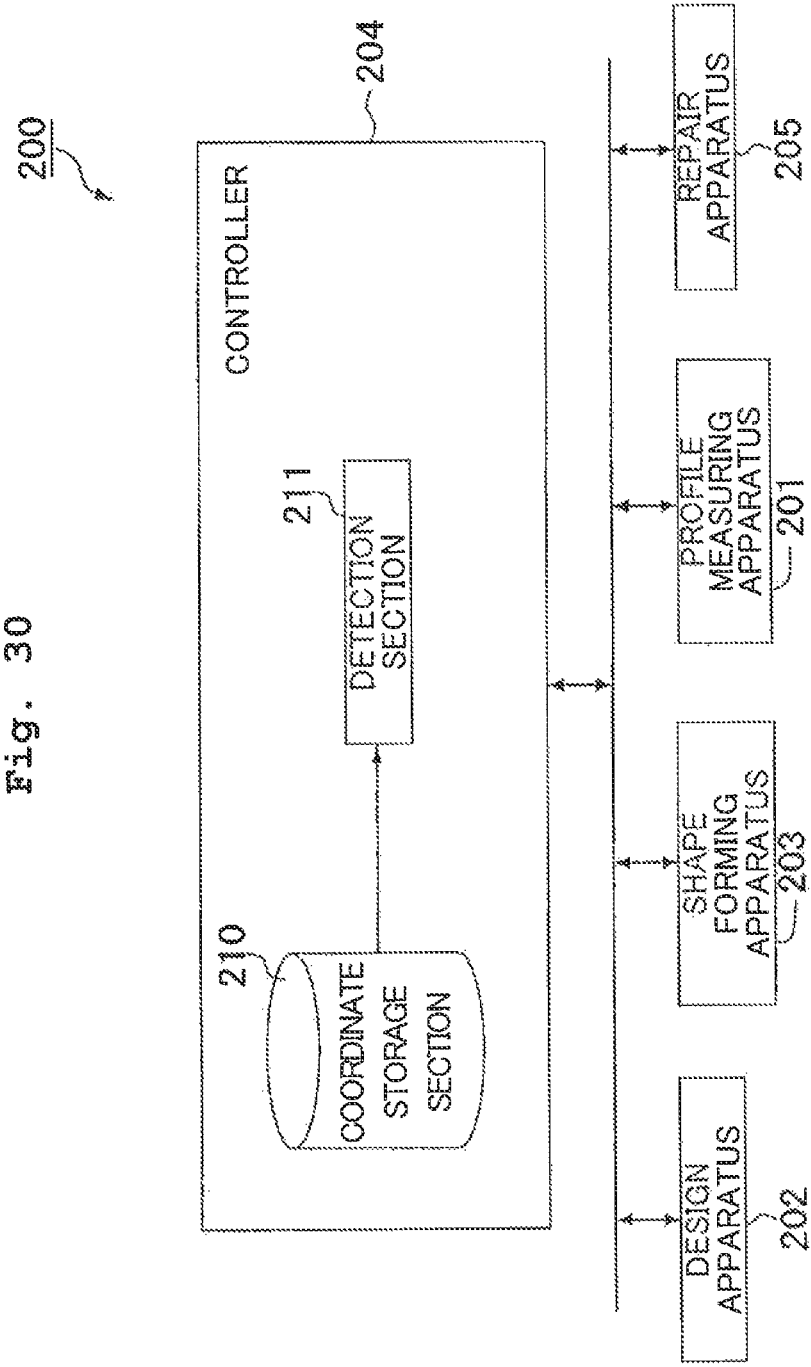
FIG. 30 shows a configuration of a structure manufacturing system according to this embodiment.

FIG. 30 shows a configuration of a structure manufacturing system 200 according to this embodiment. The structure manufacturing system 200 of this embodiment includes a profile measuring apparatus 201 as described in the above embodiments, a design apparatus 202, a shape forming apparatus 203, a controller (detection apparatus) 204, and a repair apparatus 205. The controller 204 includes a coordinate storage section 210 and a detection section 211.

The design apparatus 202 creates design information with respect to the profile of the structure; and transmits the created design information to the shape forming apparatus 203. Further, the created design information is stored in the coordinate storage section 210 of the controller 204 by the design apparatus 202. The design information includes information indicating the coordinate of each position of the structure.

The shape forming apparatus 203 creates the structure based on the design information inputted from the design apparatus 202. The shape-forming of the shape forming apparatus 203 includes, for example, casting, forging, and cutting. The profile measuring apparatus 201 measures the coordinate of the created structure (measurement objective) to transmit information (profile information) indicating the measured coordinate to the controller 204.

The design information is stored in the coordinate storage section 210 of the controller 204. The detection section 211 of the controller 204 reads out the design information from the coordinate storage section 210. The detection section 211 compares information (profile information) indicating the coordinate received from the profile measuring apparatus 201 with the design information read from the coordinate storage section 210. The detection section 211 judges as to whether or not the structure is created in accordance with the design information based on the comparison result. In other words, the detection section 21 judges as to whether or not the created structure is a nondefective structure. In a case that the structure is not created in accordance with the design information, the detection section 211 judges as to whether or not the structure is repairable. In a case that the structure is repairable, the detection section 211 calculates a defective portion and a repair amount based on the comparison result to transmit, to the repair apparatus 205, information indicating the defective portion and information indicating the repair amount.

The repair apparatus 205 processes the defective portion of the structure based on the information indicating the defective portion and the information indicating the repair amount received from the controller 204.

FIG. 31 is a flowchart showing the method for manufacturing the structure according to this embodiment. In this embodiment, each process of the method for manufacturing the structure as shown in FIG. 31 is executed by each of the sections of the structure manufacturing system 200.

At first, in the structure manufacturing system 200, the design apparatus 202 creates the design information with respect to the profile of the structure (step S200). Next, the shape forming apparatus 203 creates the structure based on the design information (step S201). Next, the profile measuring apparatus 201 measures the profile of the created structure (step S202). Next, the detection section 211 of the controller 204 detects as to whether or not the structure is created in accordance with the design information by comparing the profile information obtained from the profile measuring apparatus 201 with the design information (step S203).

Next, the detection section 211 of the controller 204 judges as to whether or not the created structure is nondefective (step S204). In a case that the detection section 211 judges that the created structure is nondefective (step S204; Yes), the structure manufacturing system 200 completes the process. In a case that the detection section 211 judges that the created structure is defective (step S204: No), the detection section 211 judges as to whether or not the created structure is repairable (step S205).

In the structure manufacturing system 200, in a case that the detection section 211 judges that the created structure is repairable (step S205: Yes), the repair apparatus 205 executes reprocessing of the structure (step S206) and then the process is returned to the step S202. In a case that the detection section 211 judges that the created structure is not repairable (step S205: No), the structure manufacturing system 200 completes the process.

In the structure manufacturing system 200 of this embodiment, since the profile measuring apparatus 201 of the above embodiment is capable of measuring the coordinate of the structure accurately, it can be judged as to whether or not the created structure is nondefective. In a case that the structure is defective, the structure manufacturing system 200 can execute the reprocessing of the structure to repair the structure.

The repair process executed by the repair apparatus 205 in this embodiment can be replaced by a process in which the shape forming apparatus 203 re-executes a shape forming process. In that case, in a case that the detection section 211 of the controller 204 judges that the structure is repairable, the shape forming apparatus 203 re-executes the shape forming process (casting, cutting, and the like). In particular, for example, the shape forming apparatus 203 cuts a portion, which should be cut in the structure and is not yet cut. Accordingly, the structure manufacturing system 200 can create the structure accurately.

A technical range of the present teaching is not limited to the above embodiments and modified embodiments. For example, one or more elements described in the embodiments and the modified embodiments is/are omitted in some cases. Further, it is possible to combine the elements described in the embodiments and the modified embodiments as appropriate.

What is claimed is:

1. A profile measuring apparatus which measures a profile of an object, comprising:
    a light source device configured to irradiate a projection light to the object, the projection light having a light amount changing with lapse of time in a first period and having a predetermined spatial distribution;
    an imaging element which is displaced at a different position from the light source and is configured to take an image of the object to which the projection light is irradiated;
    a second period setting section configured to set a second period including at least a part of the first period; and
    a profile information obtaining section which is communicatably connected with the imaging element so that the profile information obtaining section obtains an information with respect to the profile of the object based on an image data taken by the imaging element in the second period;
    wherein the second period setting section is configured to set the second period based on a light amount of a light which comes into the imaging element at the time of an imaging performed before the imaging performed in the second period, and based on a light amount change pattern of the projection light changing with lapse of time in the first period.

2. The profile measuring apparatus according to claim 1, further comprising an imaging control section configured to control the imaging element to execute the imaging in the second period to generate the image data supplied to the profile information obtaining section.

3. The profile measuring apparatus according to claim 1, wherein the second period setting section includes an exposure period calculation section configured to calculate a timing for starting the second period or a timing for completing the second period in a case that a length of the second period is given.

4. The profile measuring apparatus according to claim 1, wherein the second period setting section includes an exposure period calculation section which is configured to calculate a length of the second period in a case that a timing for starting the second period or a timing for completing the second period is given.

5. The profile measuring apparatus according to claim 1, wherein, in a case that a timing for starting the second period or a timing for completing the second period is unable to set based on a setting value of a length of the second period so that a light amount which comes into the imaging element in the second period approaches or is the same as a reference value, the second period setting section sets the length of the second period as another value different from the setting value of the length of the second period.

6. The profile measuring apparatus according to claim 1, wherein the first period includes a plurality of first periods; and
    the profile measuring apparatus further includes a scanning section configured to scan a surface of the object by the projection light in the plurality of first periods.

7. The profile measuring apparatus according to claim 6, wherein the scanning section temporally changes a positional relation between the light source device and the object.

8. The profile measuring apparatus according to claim 7, wherein the positional relation includes at least one of a relative position and a relative posture between the light source device and the object.

9. The profile measuring apparatus according to claim 7, wherein the profile information obtaining section detects a surface of the object based on the image data taken in the second period; obtains a position information indicating the positional relation at a point of time at which the imaging is performed in the second period; and associates an information of the surface detected by the profile information obtaining section with the position information.

10. The profile measuring apparatus according to claim 7, wherein the profile information obtaining section obtains an information indicating the positional relation at a point of time between a timing for starting the second period and a timing for completing the second period.

11. The profile measuring apparatus according to claim 10, wherein the profile information obtaining section obtains an information indicating the positional relation at a point of time at which a light, which comes into the imaging element in the second period, comes into the imaging element in an amount of a predetermined ratio.

12. The profile measuring apparatus according to claim 6, wherein a period during which the light source device is turned off is included between the second period in a former first period in the first periods and the second period in a latter first period in the first periods, after the former first period.

13. The profile measuring apparatus according to claim 6, wherein a light amount of a light irradiated to the object periodically changes in the first periods.

14. The profile measuring apparatus according to claim 6, wherein each of the first periods has the same light amount change pattern.

15. The profile measuring apparatus according to claim 6, wherein based on a result obtained in an imaging by the imaging element in one first period of the plurality of the first periods, the second period setting section sets the second period in another first period after the one first period.

16. The profile measuring apparatus according to claim 15, wherein the another first period is a first period after the one first period of the plurality of the first periods.

17. The profile measuring apparatus according to claim 15, further comprising an imaging control section configured to control the imaging element to execute an imaging in the second period to generate the image data supplied to the profile information obtaining section,
wherein the imaging control section controls the imaging element to execute, in the same first period, an imaging executed in a period before the second period and the imaging executed in the second period.

18. The profile measuring apparatus according to claim 17, wherein the imaging control section controls the imaging element to receive, in the same first period, a light by the imaging executed in the second period after completion of the imaging executed in the period before the second period.

19. The profile measuring apparatus according to claim 17, wherein the imaging element includes a first pixel group and a second pixel group; and
the imaging control section controls the first pixel group of the imaging element to execute the imaging performed in the period before the second period and controls the second pixel group of the imaging element to execute the imaging in the second period.

20. The profile measuring apparatus according to claim 19, wherein the imaging control section starts an exposure with respect to the first pixel group simultaneously with an exposure with respect to the second pixel group; and
the second period setting section sets a timing for completing the exposure with respect to the second pixel group based on a result of the imaging by the first pixel group.

21. The profile measuring apparatus according to claim 1, wherein the light amount of the projection light irradiated from the light source device to the object temporally changes depending on a temporal change of a light intensity of the projection light.

22. The profile measuring apparatus according to claim 1, wherein the light source device emits a pulse light to the object; and
the light amount of the projection light irradiated from the light source device to the object temporally changes depending on a temporal change of a light emission time or a light emission interval of the pulse light.

23. The profile measuring apparatus according to claim 1, further comprising a light source control section configured to control the light source device so that the project light is irradiated from the light source device in accordance with the light amount change pattern of the projection light changing with the lapse of time.

24. The profile measuring apparatus according to claim 1, further comprising an imaging control section configured to control the imaging element to execute the imaging in the second period to generate the image data supplied to the profile information obtaining section,
wherein the imaging control section controls the imaging element in synchronization with the light source device.

25. A structure manufacturing system comprising:
a design apparatus configured to create a design information with respect to a profile of a structure;
a shape forming apparatus which creates the structure based on the design information;
the profile measuring apparatus as defined in claim 1 which is configured to measure the profile of the structure created by the shape forming apparatus; and
a detection apparatus configured to compare a profile information obtained by the measurement with the design information.

26. A method for measuring a profile of an object, comprising:
irradiating a projection light to the object, the projection light having a light amount changing with lapse of time in a first period and having a predetermined spatial distribution;
imaging the object to which the projection light is irradiated;
setting a second period which includes at least a part of the first period;
executing an exposure of the imaging in the second period; and
obtaining an information with respect to the profile of the object based on a result of the imaging in the second period,
wherein setting the second period includes setting the second period based on a light amount of a light which comes into an imaging element in an imaging executed before the second period, and a light amount change pattern of the projection light changing with lapse of time in the first period.

27. A method for manufacturing a structure, comprising:
creating a design information with respect to a profile of the structure;
creating the structure based on the design information;
measuring the profile of the created structure by using the method for measuring the profile of the object as defined in claim 26; and
comparing a profile information obtained by the measurement with the design information.

28. A non-transitory computer readable medium storing a program which allows a computer to execute a control of a profile measuring apparatus, the control of the profile measuring apparatus comprising:
irradiating a projection light to the object, the projection light having a light amount changing with lapse of time in a first period and having a predetermined spatial distribution;
imaging the object to which the pattern light is irradiated;
setting a second period which includes at least a part of the first period;
executing an exposure of the imaging in the second period; and
obtaining an information with respect to a profile of the object based on a result of the imaging in the second period,
wherein setting the second period includes setting the second period based on a light amount of a light which comes into the imaging element in an imaging executed before the second period, and a light amount change pattern of the projection light changing with lapse of time in the first period.

* * * * *